US012499468B2

(12) United States Patent
Sheppard et al.

(10) Patent No.: US 12,499,468 B2
(45) Date of Patent: *Dec. 16, 2025

(54) METHODS AND APPARATUS TO PERFORM COMPUTER-BASED MONITORING OF AUDIENCES OF NETWORK-BASED MEDIA BY USING INFORMATION THEORY TO ESTIMATE INTERMEDIATE LEVEL UNIONS

(71) Applicant: The Nielsen Company (US), LLC, New York, NY (US)

(72) Inventors: Michael R. Sheppard, Holland, MI (US); DongBo Cui, New York, NY (US); David Forteguerre, Brooklyn, NY (US); Jessica Lynn White, Plant City, FL (US); Edward Murphy, North Stonington, CT (US)

(73) Assignee: The Nielsen Company (US), LLC, New York, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 18/366,001

(22) Filed: Aug. 7, 2023

(65) Prior Publication Data

US 2024/0104586 A1    Mar. 28, 2024

Related U.S. Application Data

(63) Continuation of application No. PCT/US2022/015516, filed on Feb. 7, 2022.
(Continued)

(51) Int. Cl.
*G06Q 30/0251* (2023.01)
*G06Q 30/0201* (2023.01)
(Continued)

(52) U.S. Cl.
CPC ..... *G06Q 30/0254* (2013.01); *G06Q 30/0201* (2013.01); *G06Q 30/0218* (2013.01); *G06Q 30/0246* (2013.01)

(58) Field of Classification Search
None
See application file for complete search history.

(56) References Cited

U.S. PATENT DOCUMENTS 610,637 A    9/1898 Powell
3,070,139 A    12/1962 Witschi et al.
(Continued)

FOREIGN PATENT DOCUMENTS

JP    2015529870 A    10/2015
JP    2015529970 A    10/2015
(Continued)

OTHER PUBLICATIONS

United States Patent and Trademark Office, "Notice of Allowance", issued in connection with U.S. Appl. No. 16/893,129, on Jul. 29, 2021, 5 pages.
(Continued)

Primary Examiner — Omar S Parra

(57) ABSTRACT

Methods, apparatus, systems, and articles of manufacture to perform computer-based monitoring of audiences of network-based media using information theory to estimate intermediate level unions are disclosed. An example apparatus to determine a deduplicated, census-based audience metric of media includes panel union calculator circuitry to calculate a threshold statistic corresponding to an intermediate union of a panel hierarchy, and census union calculator circuitry to calculate a deduplicated audience value corresponding to the intermediate union of the census hierarchy based on the threshold statistic.

20 Claims, 29 Drawing Sheets

Related U.S. Application Data

(60) Provisional application No. 63/146,856, filed on Feb. 8, 2021.

(51) Int. Cl.
   *G06Q 30/0217* (2023.01)
   *G06Q 30/0242* (2023.01)

(56) References Cited

U.S. PATENT DOCUMENTS

| | | |
|---|---|---|
| 5,956,692 A | 9/1999 | Foley |
| 6,029,045 A | 2/2000 | Picco et al. |
| 6,108,637 A | 8/2000 | Blumenau |
| 6,460,025 B1 | 10/2002 | Fohn et al. |
| 6,775,663 B1 | 8/2004 | Kim |
| 7,197,472 B2 | 3/2007 | Conkwright et al. |
| 7,746,272 B2 | 6/2010 | Vollath |
| 7,865,916 B2 | 1/2011 | Beser et al. |
| 7,954,120 B2 | 5/2011 | Roberts et al. |
| 8,087,041 B2 | 12/2011 | Fu et al. |
| 8,112,301 B2 | 2/2012 | Harvey et al. |
| 8,149,162 B1 | 4/2012 | Pauls |
| 8,171,032 B2 | 5/2012 | Herz |
| 8,185,456 B2 | 5/2012 | LeClair et al. |
| 8,200,693 B2 | 6/2012 | Steele et al. |
| 8,214,518 B1 | 7/2012 | Bertz |
| 8,370,489 B2 | 2/2013 | Mazumdar et al. |
| 8,423,406 B2 | 4/2013 | Briggs |
| 8,453,173 B1 | 5/2013 | Anderson et al. |
| 8,619,652 B2 | 12/2013 | Singh et al. |
| 8,619,892 B2 | 12/2013 | Vetter et al. |
| 8,874,652 B1 | 10/2014 | Pecjak et al. |
| 8,913,023 B2 | 12/2014 | Li et al. |
| 8,930,701 B2 | 1/2015 | Burbank et al. |
| 8,973,023 B1 | 3/2015 | Rao et al. |
| 9,070,139 B2 | 6/2015 | Zhang |
| 9,094,710 B2 | 7/2015 | Lee et al. |
| 9,111,186 B2 | 8/2015 | Blasinski et al. |
| 9,224,094 B2 | 12/2015 | Oliver et al. |
| 9,236,962 B2 | 1/2016 | Hawkins et al. |
| 9,237,138 B2 | 1/2016 | Bosworth et al. |
| 9,420,320 B2 | 8/2016 | Doe |
| 9,529,836 B1 | 12/2016 | Hale |
| 10,045,057 B2 | 8/2018 | Shah et al. |
| 10,070,166 B2 | 9/2018 | Chaar et al. |
| 10,313,752 B2 | 6/2019 | Nagaraja Rao et al. |
| 10,382,818 B2 | 8/2019 | Sheppard et al. |
| 10,491,696 B2 | 11/2019 | Gierada |
| 10,602,224 B2 | 3/2020 | Sullivan et al. |
| 10,609,451 B2 | 3/2020 | de Andrade |
| 10,681,414 B2 | 6/2020 | Sheppard et al. |
| 10,728,614 B2 | 7/2020 | Sheppard et al. |
| 10,743,064 B2 | 8/2020 | Berezowski et al. |
| 10,856,027 B2 | 12/2020 | Sheppard et al. |
| 11,115,710 B2 | 9/2021 | Sheppard et al. |
| 11,140,449 B2 | 10/2021 | Sullivan et al. |
| 11,216,834 B2 | 1/2022 | Sheppard et al. |
| 11,323,772 B2 | 5/2022 | Sheppard et al. |
| 11,425,458 B2 | 8/2022 | Sheppard et al. |
| 11,438,662 B2 | 9/2022 | Sullivan et al. |
| 11,481,802 B2 | 10/2022 | Sheppard et al. |
| 11,483,606 B2 | 10/2022 | Sheppard et al. |
| 11,523,177 B2 | 12/2022 | Sheppard et al. |
| 11,553,226 B2 | 1/2023 | Sheppard et al. |
| 2002/0123928 A1 | 9/2002 | Eldering et al. |
| 2003/0037041 A1 | 2/2003 | Hertz |
| 2004/0001538 A1 | 1/2004 | Garrett |
| 2004/0049549 A1 | 3/2004 | Slattery et al. |
| 2004/0059549 A1 | 3/2004 | Kropaczek et al. |
| 2006/0190318 A1 | 8/2006 | Downey et al. |
| 2007/0087756 A1 | 4/2007 | Hoffberg |
| 2008/0028006 A1 | 1/2008 | Liu et al. |
| 2008/0228543 A1 | 9/2008 | Doe |
| 2008/0300965 A1 | 12/2008 | Doe |
| 2008/0301746 A1 | 12/2008 | Wiser et al. |
| 2008/0313017 A1 | 12/2008 | Totten |
| 2010/0161385 A1 | 6/2010 | Karypis et al. |
| 2010/0191723 A1 | 7/2010 | Perez et al. |
| 2011/0015992 A1 | 1/2011 | Liffiton et al. |
| 2011/0196733 A1 | 8/2011 | Li et al. |
| 2012/0023522 A1 | 1/2012 | Anderson et al. |
| 2012/0025930 A1 | 2/2012 | Gilliland et al. |
| 2012/0052930 A1 | 3/2012 | McGucken |
| 2012/0066410 A1 | 3/2012 | Stefanakis et al. |
| 2012/0072940 A1 | 3/2012 | Fuhrer |
| 2012/0110027 A1 | 5/2012 | Falcon |
| 2012/0254911 A1 | 10/2012 | Doe |
| 2013/0138743 A1 | 5/2013 | Amento et al. |
| 2013/0198125 A1 | 8/2013 | Oliver et al. |
| 2013/0254787 A1 | 9/2013 | Cox et al. |
| 2013/0290233 A1 | 10/2013 | Ferren et al. |
| 2013/0339991 A1 | 12/2013 | Ricci |
| 2013/0346033 A1 | 12/2013 | Wang et al. |
| 2014/0101685 A1 | 4/2014 | Kitts et al. |
| 2014/0112557 A1 | 4/2014 | Santamaria-Pang et al. |
| 2014/0278933 A1 | 9/2014 | McMillan |
| 2014/0280891 A1 | 9/2014 | Doe |
| 2014/0337104 A1 | 11/2014 | Splaine et al. |
| 2014/0358676 A1 | 12/2014 | Srivastava et al. |
| 2015/0032310 A1 | 1/2015 | Zettel et al. |
| 2015/0095138 A1 | 4/2015 | Rao et al. |
| 2015/0179953 A1 | 6/2015 | Mujica-Fernaud et al. |
| 2015/0180989 A1 | 6/2015 | Seth |
| 2015/0186403 A1 | 7/2015 | Srivastava et al. |
| 2015/0193813 A1 | 7/2015 | Toupet et al. |
| 2015/0332310 A1 | 11/2015 | Cui et al. |
| 2015/0332317 A1 | 11/2015 | Cui et al. |
| 2016/0012314 A1 | 1/2016 | Ramamurthy et al. |
| 2016/0086208 A1 | 3/2016 | Oliver et al. |
| 2016/0134934 A1 | 5/2016 | Jared et al. |
| 2016/0162955 A1 | 6/2016 | O'Kelley et al. |
| 2016/0165277 A1 | 6/2016 | Kirillov et al. |
| 2016/0232563 A1 | 8/2016 | Perez et al. |
| 2016/0233563 A1 | 8/2016 | Oshima et al. |
| 2016/0249098 A1 | 8/2016 | Pecjak et al. |
| 2016/0269783 A1 | 9/2016 | Mowrer et al. |
| 2016/0323616 A1 | 11/2016 | Doe |
| 2016/0373820 A1 | 12/2016 | Meyer et al. |
| 2016/0379246 A1 | 12/2016 | Sheppard et al. |
| 2017/0006342 A1 | 1/2017 | Nagaraja Rao et al. |
| 2017/0034594 A1 | 2/2017 | Francis et al. |
| 2017/0155956 A1 | 6/2017 | Nagaraja Rao et al. |
| 2017/0187478 A1 | 6/2017 | Shah et al. |
| 2017/0213243 A1 | 7/2017 | Dollard |
| 2017/0300911 A1 | 10/2017 | Alnajem |
| 2018/0073933 A1 | 3/2018 | Keskin et al. |
| 2018/0189950 A1 | 7/2018 | Norouzi et al. |
| 2018/0225709 A1 | 8/2018 | Ferber et al. |
| 2018/0249208 A1 | 8/2018 | Sheppard et al. |
| 2018/0249210 A1 | 8/2018 | Sheppard et al. |
| 2018/0249211 A1 | 8/2018 | Sheppard et al. |
| 2018/0249214 A1 | 8/2018 | Sullivan et al. |
| 2018/0315060 A1 | 11/2018 | Sheppard et al. |
| 2018/0332177 A1 | 11/2018 | Shah et al. |
| 2018/0376198 A1 | 12/2018 | Sheppard et al. |
| 2019/0147461 A1 | 5/2019 | Sheppard et al. |
| 2019/0289363 A1 | 9/2019 | Nagaraja Rao et al. |
| 2019/0289863 A1 | 9/2019 | Bruggeman |
| 2019/0354574 A1 | 11/2019 | Wick et al. |
| 2019/0356950 A1 | 11/2019 | Sheppard et al. |
| 2019/0370860 A1 | 12/2019 | Morovati Lopez et al. |
| 2020/0120387 A1 | 4/2020 | Sheppard et al. |
| 2020/0175546 A1 | 6/2020 | Perez et al. |
| 2020/0204863 A1 | 6/2020 | Sullivan et al. |
| 2020/0294069 A1 | 9/2020 | Sheppard et al. |
| 2020/0296441 A1 | 9/2020 | Sheppard et al. |
| 2020/0359090 A1 | 11/2020 | Sheppard et al. |
| 2021/0014564 A1 | 1/2021 | Sheppard et al. |
| 2021/0058659 A1 | 2/2021 | Sheppard et al. |
| 2021/0065230 A1 | 3/2021 | Flynn |
| 2021/0133773 A1 | 5/2021 | Sheppard et al. |
| 2021/0158377 A1 | 5/2021 | Sheppard et al. |
| 2021/0319002 A1 | 10/2021 | Ryan et al. |
| 2021/0319474 A1 | 10/2021 | Sheppard et al. |

(56) References Cited

U.S. PATENT DOCUMENTS

| | | |
|---|---|---|
| 2021/0400341 A1 | 12/2021 | Sheppard et al. |
| 2022/0038781 A1 | 2/2022 | Sullivan et al. |
| 2022/0056667 A1 | 2/2022 | Saitoh et al. |
| 2022/0058667 A1 | 2/2022 | Sheppard et al. |
| 2022/0058688 A1 | 2/2022 | Sheppard et al. |
| 2022/0122104 A1 | 4/2022 | Sheppard et al. |
| 2022/0159326 A1 | 5/2022 | Sheppard et al. |
| 2022/0264179 A1 | 8/2022 | Sheppard et al. |
| 2022/0264187 A1 | 8/2022 | Sheppard et al. |
| 2022/0408154 A1 | 12/2022 | Sheppard et al. |
| 2023/0042879 A1 | 2/2023 | Sheppard et al. |
| 2023/0070980 A1 | 3/2023 | Sullivan et al. |
| 2023/0111617 A1 | 4/2023 | Sheppard et al. |

FOREIGN PATENT DOCUMENTS

| | | |
|---|---|---|
| KR | 10-2016-0087263 | 7/2016 |
| WO | 2008127737 A1 | 10/2008 |
| WO | 2014210597 A1 | 12/2014 |

OTHER PUBLICATIONS

United States Patent and Trademark Office, "Notice of Allowance", issued in connection with U.S. Appl. No. 16/939,996, on Mar. 11, 2022, 8 pages.

United States Patent and Trademark Office, "Notice of Allowance", issued in connection with U.S. Appl. No. 15/635,153, dated Jul. 8, 2019, 2 pages.

United States Patent and Trademark Office, "Notice of Allowance", issued in connection with U.S. Appl. No. 16/676,158, on Apr. 14, 2023, 10 pages.

United States Patent and Trademark Office, "Notice of Allowance", issued in U.S. Appl. No. 16/526,747, mailed on May 10, 2021, 3 pages.

United States Patent and Trademark Office, "Supplemental Notice of Allowability", issued in connection with U.S. Appl. No. 17/099,510, dated Dec. 16, 2022, 2 pages.

United States Patent and Trademark Office, "Supplemental Notice of Allowability", issued in connection with U.S. Appl. No. 17/493,653, on May 26, 2022, 2 pages.

Phillip S. Kott, "An Introduction to Calibration Weighting for Establishment Surveys", 2012, accessed from <https://ww2.amstat.org/meetings/ices/2012/papers/302286.pdf>, 12 pages.

United States Patent and Trademark Office, "Corrected Notice of Allowability", issued in connection with U.S. Appl. No. 16/657,652, on Jul. 29, 2022, 3 pages.

Bourguignon et al., "On the Construction of Synthetic Panels", Oct. 2015, 42 pages.

Charles L. Byrne, "Applied Iterative Methods", Jan. 23, 2007, 396 pages.

Charles L. Byrne, "Iterative Algorithms in Inverse Problems", Apr. 25, 2006, 347 pages.

Esch et al., "Appendix 8 Numerical Methods for Solving Nonlinear Equations", Asset and Risk Management: Risk Oriented Finance, published 2005 by John Wiley & Sons Ltd., 7 pages.

Golub et al., "Linear Least Squares and Quadratic Programming", Technical Report No. CS 134, Stanford University, Computer Science Department, May 1969, 38 pages.

Haggin, Patience et al., "Google Nears a Long-Tipped Limit on Tracking "Cookies"", in Blow to Rivals", The Wall Street Journal, May 6, 2019, obtained from https://www.wsj.com/articles/googles-new-privacy-tools-to-make-cookies-crumble-competitors-stumble-11557151913, 3 pages.

Huckett et al., "Combining Methods to Create Synthetic Microdata: Quantile Regression, Hot Deck, and Rank Swapping", Research Gate, Apr. 2008, 11 pages.

Sheppard et al. "Reach Estimate using Information Theory", Jul. 14, 2020, 13 pages.

International Bureau, "International Preliminary Report", issued in connection with International Application No. PCT/US2021/026010, Oct. 6, 2022, 7 pages.

"International Preliminary Report on Patentability", received in PCT Application No. PCT/US2022/015516, issued on Aug. 3, 2023, 5 pages.

International Searching Authority, "International Preliminary Report on Patentability", issued in connection with application No. PCT/US2020/022436 on Sep. 16, 2021, 5 pages.

International Searching Authority, "International Preliminary Report on Patentability", issued in connection with application No. PCT/US2020/022438 on Sep. 16, 2021, 6 pages.

International Searching Authority, "International Search Report & Written issued Opinion", in connection with application No. PCT/US21/26010, on Jul. 26, 2021, 8 pages.

International Searching Authority, "International Search Report & Written Opinion", in connection with application No. PCT/US2020/022436 on Jul. 6, 2020, 9 pages.

United States Patent and Trademark Office, "Non-Final Office", action issued in connection with U.S. Appl. No. 15/445,530, filed Apr. 11, 2018, 9 pages.

International Searching Authority, "International Search Report & Written Opinion", issued in connection with application No. PCT/US2020/022438 on Jul. 6, 2020, 10 pages.

Marno Verbeek, "Pseudo-Panels and Repeated Cross-Sections", The Econometrics of Panel Data, Springer-Verlag Berlin Heidelberg 2008, 15 pages.

P.J.G. Teunissen, "Least-Squares Estimation of the Integer GPS Ambiguities", Delft University of Technology, Department of the Geodetic Engineering, Aug. 1993, 16 pages.

United States Patent and Trademark Office, "Advisory Action", issued in connection with U.S. Appl. No. 16/676,158, filed Oct. 6, 2022, 3 pages.

United States Patent and Trademark Office, "Corrected Notice of Allowability", issued in connection with U.S. Appl. No. 16/939,996, filed Aug. 26, 2022, 3 pages.

United States Patent and Trademark Office, "Final Rejection", issued in connection with U.S. Appl. No. 17/408,208, filed Dec. 8, 2022, 10 pages.

United States Patent and Trademark Office, "Non-Final Rejection", issued in connection with U.S. Appl. No. 16/843,650, filed Dec. 2, 2022, 43 pages.

United States Patent and Trademark Office, "Non-Final Rejection", issued in connection with U.S. Appl. No. 17/408,208, filed Aug. 15, 2022, 24 pages.

United States Patent and Trademark Office, "Non-Final Rejection", issued in connection with U.S. Appl. No. 17/465,567, filed Nov. 16, 2022, 12 pages.

United States Patent and Trademark Office, "Non-Final Rejection", issued in connection with U.S. Appl. No. 17/567,710, filed Oct. 14, 2022, 8 pages.

United States Patent and Trademark Office, "Non-Final Rejection", issued in connection with U.S. Appl. No. 17/734,792, filed Oct. 13, 2022, 6 pages.

United States Patent and Trademark Office, "Notice of Allowance and Fee(s) Due", issued in connection with U.S. Appl. No. 17/099,510, filed Aug. 24, 2022, 7 pages.

United States Patent and Trademark Office, "Supplemental Notice of Allowability", issued in connection with U.S. Appl. No. 17/099,510, filed Sep. 7, 2022, 2 pages.

United States Patent and Trademark Office, "Advisory Action", issued in connection with U.S. Appl. No. 16/657,652, filed Aug. 19, 2021, 4 pages.

United States Patent and Trademark Office, "Advisory Action", issued in connection with U.S. Appl. No. 17/408,208, filed Mar. 3, 2023, 3 pages.

United States Patent and Trademark Office, "Corrected Notice of Allowability", issued in connection with U.S. Appl. No. 15/445,530, filed May 21, 2019, 2 pages.

United States Patent and Trademark Office, "Corrected Notice of Allowability", issued in connection with U.S. Appl. No. 15/635,153, filed Apr. 8, 2019, 2 pages.

(56) References Cited

OTHER PUBLICATIONS

United States Patent and Trademark Office, "Corrected Notice of Allowability", issued in connection with U.S. Appl. No. 16/355,386, filed Dec. 9, 2021, 2 pages.
United States Patent and Trademark Office, "Corrected Notice of Allowability", issued in connection with U.S. Appl. No. 16/526,747, filed Aug. 11, 2021, 3 pages.
United States Patent and Trademark Office, "Corrected Notice of Allowability", issued in connection with U.S. Appl. No. 16/893,129, filed Apr. 8, 2022, 2 pages.
United States Patent and Trademark Office, "Corrected Notice of Allowability", issued in connection with U.S. Appl. No. 16/893,129, filed Dec. 22, 2021, 2 pages.
United States Patent and Trademark Office, "Corrected Notice of Allowability", issued in connection with U.S. Appl. No. 16/676,158, on Apr. 27, 2023, 2 pages.
United States Patent and Trademark Office, "Final Office Action", issued in connection with U.S. Appl. No. 15/445,543, filed Aug. 3, 2018, 16 pages.
United States Patent and Trademark Office, "Final Office Action", issued in connection with U.S. Appl. No. 15/445,543, filed Jul. 18, 2019, 12 pages.
United States Patent and Trademark Office, "Final Office Action", issued in connection with U.S. Appl. No. 15/445,557, filed Dec. 27, 2018, 9 pages.
United States Patent and Trademark Office, "Final Office Action", issued in connection with U.S. Appl. No. 15/619,257, filed Jan. 18, 2019, 18 pages.
United States Patent and Trademark Office, "Final Office Action", issued in connection with U.S. Appl. No. 16/355,386, filed May 4, 2021, 10 pages.
United States Patent and Trademark Office, "Final Office Action", issued in connection with U.S. Appl. No. 16/526,747, filed Dec. 30, 2020, 8 pages.
United States Patent and Trademark Office, "Final Office Action", issued in connection with U.S. Appl. No. 16/657,652, filed May 14, 2021, 19 pages.
United States Patent and Trademark Office, "Final Office Action", issued in connection with U.S. Appl. No. 16/676,158, filed Jul. 29, 2022, 30 pages.
United States Patent and Trademark Office, "Final Office Action", issued in connection with U.S. Appl. No. 16/843,650, filed Dec. 17, 2021, 33 pages.
United States Patent and Trademark Office, "Final Office Action", issued in connection with U.S. Appl. No. 16/939,996, filed Dec. 16, 2021, 19 pages.
United States Patent and Trademark Office, "Final Office Action", issued in connection with U.S. Appl. No. 17/408,208, filed Apr. 20, 2022, 26 pages.
United States Patent and Trademark Office, "Final Office Action", issued in connection with U.S. Appl. No. 16/843,650, filed Apr. 10, 2023, 40 pages.
International Search Report and Written Opinion for International Patent Application No. PCT/US2022/015516, May 26, 2022, 7 pages.
United States Patent and Trademark Office, "Non-Final Office action", issued in connection with U.S. Appl. No. 15/635,153, filed Feb. 5, 2018, 8 pages.
United States Patent and Trademark Office, "Non-Final Office action", issued in connection with U.S. Appl. No. 15/445,543, filed Jan. 11, 2018, 19 pages.
United States Patent and Trademark Office, "Non-Final Office Action", issued in connection with U.S. Appl. No. 15/445,543, filed Jan. 8, 2019, 15 pages.
United States Patent and Trademark Office, "Non-Final Office Action", issued in connection with U.S. Appl. No. 15/445,557, filed Jun. 29, 2018, 11 pages.
United States Patent and Trademark Office, "Non-Final Office Action", issued in connection with U.S. Appl. No. 15/619,257, filed Jun. 15, 2018, 15 pages.
United States Patent and Trademark Office, "Non-Final Office Action", issued in connection with U.S. Appl. No. 16/355,386, filed Nov. 9, 2020, 8 pages.
United States Patent and Trademark Office, "Non-Final Office Action", issued in connection with U.S. Appl. No. 16/526,747, filed Jul. 23, 2020, 7 pages.
United States Patent and Trademark Office, "Non-Final Office Action", issued in connection with U.S. Appl. No. 16/657,652, filed Oct. 18, 2021, 22 pages.
United States Patent and Trademark Office, "Non-Final Office Action", issued in connection with U.S. Appl. No. 16/657,652, filed Oct. 27, 2020, 18 pages.
United States Patent and Trademark Office, "Non-Final Office Action", issued in connection with U.S. Appl. No. 16/676,158, filed Mar. 18, 2022, 29 pages.
United States Patent and Trademark Office, "Non-Final Office Action", issued in connection with U.S. Appl. No. 16/676,158, filed Nov. 29, 2021, 24 pages.
United States Patent and Trademark Office, "Non-Final Office Action", issued in connection with U.S. Appl. No. 16/843,650, filed Jul. 29, 2022, 36 pages.
United States Patent and Trademark Office, "Non-Final Office Action", issued in connection with U.S. Appl. No. 16/843,650, filed May 26, 2021, 26 pages.
United States Patent and Trademark Office, "Non-Final Office Action", issued in connection with U.S. Appl. No. 16/893,129, filed Apr. 13, 2021, 8 pages.
United States Patent and Trademark Office, "Non-Final Office Action", issued in connection with U.S. Appl. No. 16/939,996, filed Jun. 24, 2021, 15 pages.
United States Patent and Trademark Office, "Non-Final Office Action", issued in connection with U.S. Appl. No. 17/093,460, filed Oct. 22, 2021, 5 pages.
United States Patent and Trademark Office, "Non-Final Office Action", issued in connection with U.S. Appl. No. 17/099,510, filed Mar. 29, 2022, 6 pages.
United States Patent and Trademark Office, "Non-Final Office Action", issued in connection with U.S. Appl. No. 17/408,208, filed Jan. 5, 2022, 21 pages.
United States Patent and Trademark Office, "Non-Final Office Action", issued in connection with U.S. Appl. No. 17/666,359, filed Aug. 18, 2022, 8 pages.
United States Patent and Trademark Office, "Non-Final Office Action", issued in connection with U.S. Appl. No. 17/666,359, filed Nov. 18, 2022, 9 pages.
United States Patent and Trademark Office, "Non-Final Office Action", issued in connection with U.S. Appl. No. 17/408,164, dated Mar. 29, 2023, 14 pages.
United States Patent and Trademark Office, "Non-Final Office Action", issued in connection with U.S. Appl. No. 17/408,208, dated May 10, 2023, 9 Pages.
United States Patent and Trademark Office, "Non-Final Rejection", issued in connection with U.S. Appl. No. 17/902,612, filed Jan. 6, 2023, 5 pages.
United States Patent and Trademark Office, "Notice of Allowance and Fee(s) Due", issued in connection with U.S. Appl. No. 15/445,557, filed Nov. 5, 2019, 9 pages.
United States Patent and Trademark Office, "Notice of Allowance and Fee(s) Due", issued in connection with U.S. Appl. No. 15/445,530, filed Sep. 25, 2019, 5 pages.
United States Patent and Trademark Office, "Notice of Allowance and Fee(s) Due", issued in connection with U.S. Appl. No. 16/657,652, filed Apr. 12, 2022, 8 pages.
United States Patent and Trademark Office, "Notice of Allowance and Fee(s) Due", issued in connection with U.S. Appl. No. 16/939,996, filed Aug. 5, 2022, 8 pages.
United States Patent and Trademark Office, "Notice of Allowance and Fee(s) Due", issued in connection with U.S. Appl. No. 17/093,460, dated Jun. 10, 2022, 9 pages.
United States Patent and Trademark Office, "Notice of Allowance and Fee(s) Due", issued in connection with U.S. Appl. No. 17/093,460, dated Mar. 1, 2022, 9 pages.

(56) References Cited

OTHER PUBLICATIONS

United States Patent and Trademark Office, "Notice of Allowance and Fee(s) Due", issued in connection with U.S. Appl. No. 17/493,653, filed Apr. 29, 2022, 8 pages.

United States Patent and Trademark Office, "Notice of Allowance and Fee(s) Due", issued in connection with U.S. Appl. No. 17/567,710, filed Feb. 10, 2023, 7 pages.

United States Patent and Trademark Office, "Notice of Allowance and Fee(s) Due", issued in connection with U.S. Appl. No. 17/465,567, dated Mar. 10, 2023, 7 pages.

United States Patent and Trademark Office, "Notice of Allowance and Fees Due", issued in connection with U.S. Appl. No. 17/666,359, filed Jul. 20, 2023, 5 pages.

United States Patent and Trademark Office, "Notice of Allowance and Fees Due", issued in connection with U.S. Appl. No. 17/666,359, filed Jun. 12, 2023, 8 pages.

United States Patent and Trademark Office, Notice of Allowance and Fees(s) Due, issued in connection with U.S. Appl. No. 17/734,792, filed Feb. 13, 2023, 8 pages.

United States Patent and Trademark Office, "Notice of Allowance", issued in connection with U.S. Appl. No. 15/619,257, filed Mar. 17, 2020, 8 pages.

United States Patent and Trademark Office, "Notice of Allowance", issued in connection with U.S. Appl. No. 15/635,153, filed Jul. 23, 2018, 8 pages.

United States Patent and Trademark Office, "Notice of Allowance", issued in connection with U.S. Appl. No. 15/619,257, dated Nov. 5, 2019, 8 pages.

United States Patent and Trademark Office, "Notice of Allowance", issued in connection with U.S. Appl. No. 15/445,530, filed Jan. 2, 2019, 7 pages.

United States Patent and Trademark Office, "Notice of Allowance", issued in connection with U.S. Appl. No. 15/445,530, filed Jan. 31, 2020, 10 pages.

United States Patent and Trademark Office, "Notice of Allowance", issued in connection with U.S. Appl. No. 15/445,530, filed May 3, 2019, 5 pages.

United States Patent and Trademark Office, "Notice of Allowance", issued in connection with U.S. Appl. No. 15/445,557, filed Jul. 26, 2019, 7 pages.

United States Patent and Trademark Office, "Notice of Allowance", issued in connection with U.S. Appl. No. 15/635,153, filed Mar. 21, 2019, 7 pages.

United States Patent and Trademark Office, "Notice of Allowance", issued in connection with U.S. Appl. No. 15/635,153, filed Oct. 17, 2018, 5 pages.

United States Patent and Trademark Office, "Notice of Allowance", issued in connection with U.S. Appl. No. 16/355,386, filed Aug. 30, 2021, 7 pages.

United States Patent and Trademark Office, "Notice of Allowance", issued in connection with U.S. Appl. No. 16/355,393, filed Jul. 8, 2020, 8 pages.

United States Patent and Trademark Office, "Notice of Allowance", issued in connection with U.S. Appl. No. 16/526,747, filed Apr. 28, 2021, 8 pages.

United States Patent and Trademark Office, "Notice of Allowance", issued in connection with U.S. Appl. No. 16/805,361, filed Feb. 18, 2021, 8 pages.

United States Patent and Trademark Office, "Notice of Allowance", issued in connection with U.S. Appl. No. 16/805,361, filed Jun. 3, 2021, 8 pages.

United States Patent and Trademark Office, "Notice of Allowance", issued in connection with U.S. Appl. No. 16/893,129, filed Dec. 14, 2021, 5 pages.

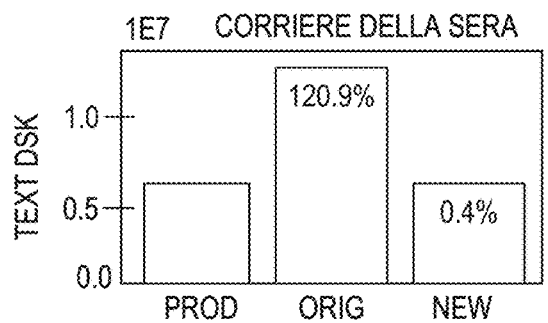
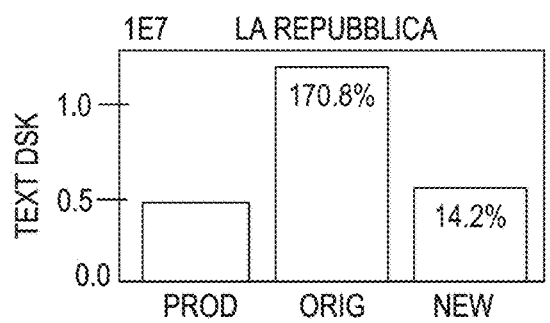
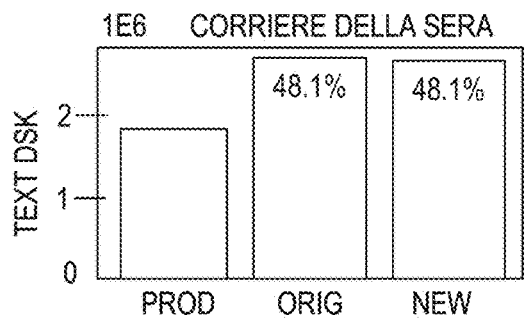
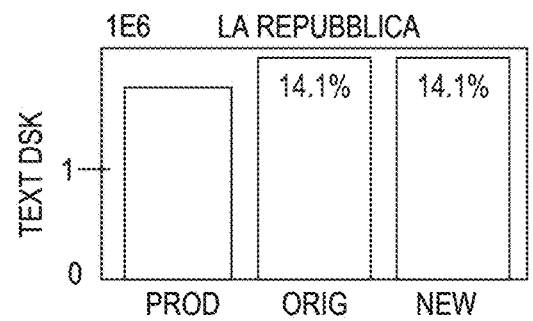
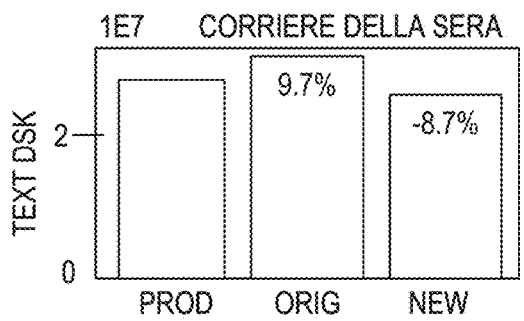
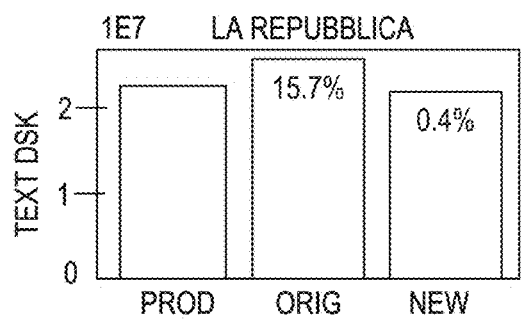
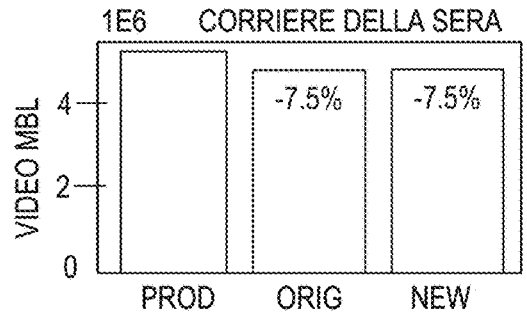
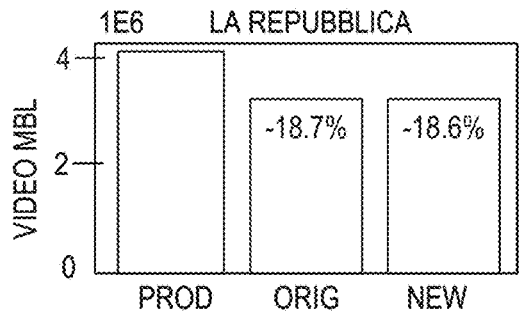
FIG. 9D

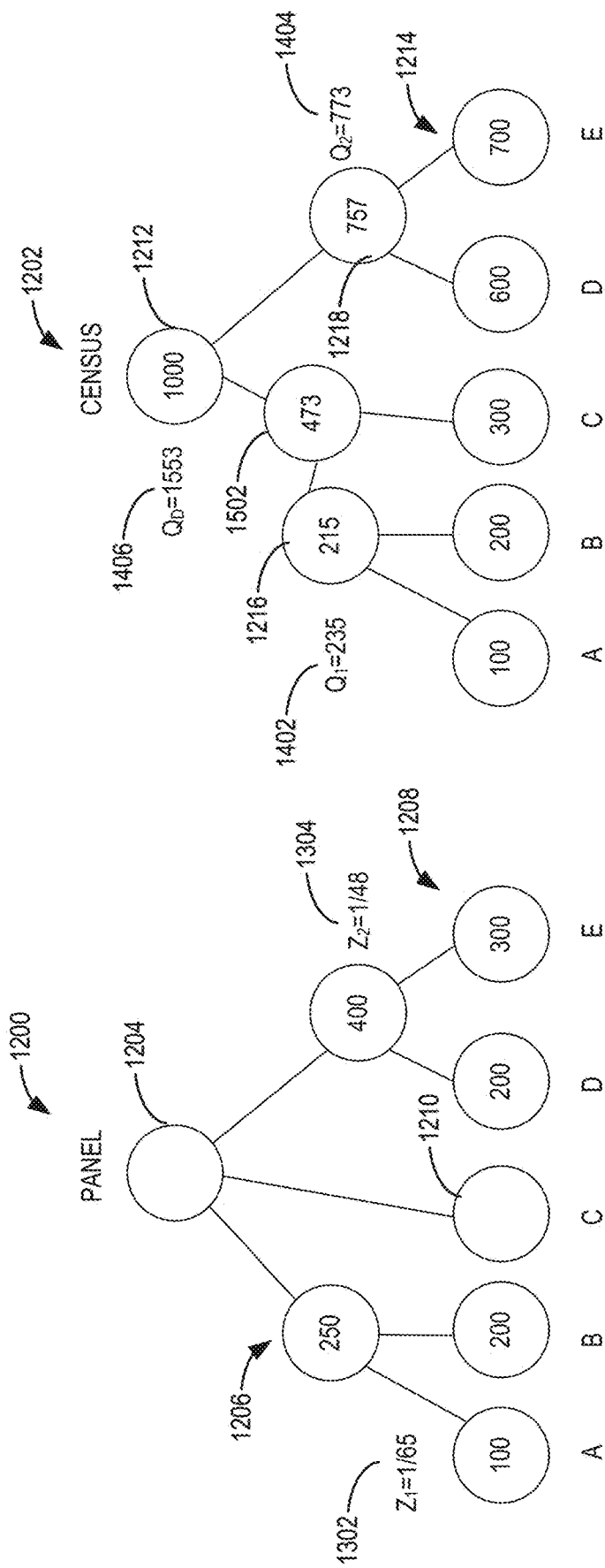

| LABEL | PLATFORM | PANEL MARGINAL | PANEL SUB-UNION | CENSUS MARGINAL | CENSUS TOTAL UNION |
|---|---|---|---|---|---|
| A | TEXT | 100 | 250 | 100 | 1000 |
| B | TEXT | 200 | 250 | 200 | 1000 |
| C | TEXT | | | 300 | 1000 |
| D | VIDEO | 200 | 400 | 600 | 1000 |
| E | VIDEO | 300 | 400 | 700 | 1000 |

FIG. 16A

| LABEL | PLATFORM | Z | FLAG | CENSUS MARGINAL | CENSUS TOTAL UNION |
|---|---|---|---|---|---|
| A | TEXT | 1/65 | 1 | 100 | 1000 |
| B | TEXT | 1/65 | 1 | 200 | 1000 |
| C | TEXT | 1/48 | 0 | 300 | 1000 |
| D | VIDEO | 1/48 | 1 | 600 | 1000 |
| E | VIDEO | 1/48 | 1 | 700 | 1000 |

| LABEL | PLATFORM | Z | FLAG | CENSUS MARGINAL | CENSUS TOTAL UNION |
|---|---|---|---|---|---|
| A,B | TEXT | 1/65 | 1 | [100, 200] | 1000 |
| C | TEXT |  | 0 | 300 | 1000 |
| D,E | VIDEO | 1/48 | 1 | [600, 700] | 1000 |

FIG. 17B (1702)

| LABEL | PLATFORM | Z | CENSUS MARGINAL | CENSUS OTHER | CENSUS TOTAL UNION |
|---|---|---|---|---|---|
| A,B | TEXT | 1/65 | [100, 200] | [300] | 1000 |
| D,E | VIDEO | 1/48 | [600, 700] | [0] | 1000 |

FIG. 17C (1706)

| LABEL | PLATFORM | Z | CENSUS MARGINAL | CENSUS OTHER | CENSUS TOTAL UNION | $XD_K$ | $QX_K$ | $Q_D$ |
|---|---|---|---|---|---|---|---|---|
| A,B | TEXT | 1/65 | [100, 200] | [300] | 1000 | 215 | 235 | 1553 |
| D,E | VIDEO | 1/48 | [600, 700] | [0] | 1000 | 757 | 773 | 1553 |

FIG. 18A

| LABEL | PLATFORM | FLAG | CENSUS MARGINAL | $QX_K$ | $Q_D$ |
|---|---|---|---|---|---|
| A | TEXT | 1 | 100 | 235 | 1553 |
| B | TEXT | 1 | 200 | 235 | 1553 |
| C | TEXT | 0 | 300 | 235 | 1553 |
| D | VIDEO | 1 | 600 | 773 | 1553 |
| E | VIDEO | 1 | 700 | 773 | 1553 |

FIG. 18B

| LABEL | PLATFORM | CENSUS SUB-UNION | $QX_K$ | $Q_D$ |
|---|---|---|---|---|
| A,B | TEXT | [1- (1- (1-100/235) (1-200/235))] × 235 = 215 | 235 | 1553 |
| D,E | VIDEO | [1- (1- (1-600/773) (1-700/773))] × 773 = 757 | 773 | 1553 |
| C | TEXT | 300 | 235 | 1553 |

FIG. 18C

| LABEL | PLATFORM | CENSUS SUB-UNION | $QX_K$ | $Q_D$ |
|---|---|---|---|---|
| (A,B), C | TEXT | [1- (1- (1-215/1553) (1-300/1553))] × 1553 = 473 | 235 | 1553 |
| D,E | VIDEO | 757 | 773 | 1553 |

METHODS AND APPARATUS TO PERFORM COMPUTER-BASED MONITORING OF AUDIENCES OF NETWORK-BASED MEDIA BY USING INFORMATION THEORY TO ESTIMATE INTERMEDIATE LEVEL UNIONS

RELATED APPLICATION

This disclosure is a continuation of International Patent Application No. PCT/US22/015516, filed Feb. 7, 2022, which claims the benefit of U.S. Provisional Patent Application No. 63/146,856, filed on Feb. 8, 2021, each of which is hereby incorporated by reference in its entirety.

FIELD OF THE DISCLOSURE

This disclosure relates generally to computer-based audience monitoring and, more particularly, to methods and apparatus to perform computer-based monitoring of audiences of network-based media using information theory to estimate intermediate level unions.

BACKGROUND

Tracking user access to digital media has been used by broadcasters and advertisers to determine viewership information for the digital media. Digital media is also known as Internet-accessible media. Tracking viewership of digital media can present useful information to broadcasters and advertisers when determining placement strategies for digital advertising. The success of advertisement placement strategies is dependent on the accuracy that technology can achieve in generating audience metrics.

BRIEF DESCRIPTION OF THE DRAWINGS

FIGS. 9A-9E illustrate example graphs of universe audience sizes from production, original universe audience size estimates, and new universe audience size estimates in accordance with teachings of this disclosure.

FIG. 15A illustrates the example panel hierarchy of FIGS. 12A, 13A, and 14A including example estimated, deduplicated audience size values corresponding to the intermediate unions in accordance with teachings of this disclosure, and FIG. 15B illustrates the example census hierarchy of FIGS. 12B, 13B, and 14B including example estimated, deduplicated audience size values corresponding to the intermediate unions in accordance with teachings of this disclosure.

FIGS. 16A and 16B illustrate example tables including platform data, panel data, and census data to implement the enhanced MUG methodology in accordance with teachings of this disclosure.

FIGS. 17A-17C illustrate example tables including the data from the example tables of FIGS. 16A and 16B and aggregated data in accordance with teachings of this disclosure.

FIGS. 18A-18C illustrate example tables including the data from the example tables of FIGS. 16A-17C and estimated universe audience size data in accordance with teachings of this disclosure.

In general, the same reference numbers will be used throughout the drawing(s) and accompanying written description to refer to the same or like parts. The figures are not to scale.

Figure 1:
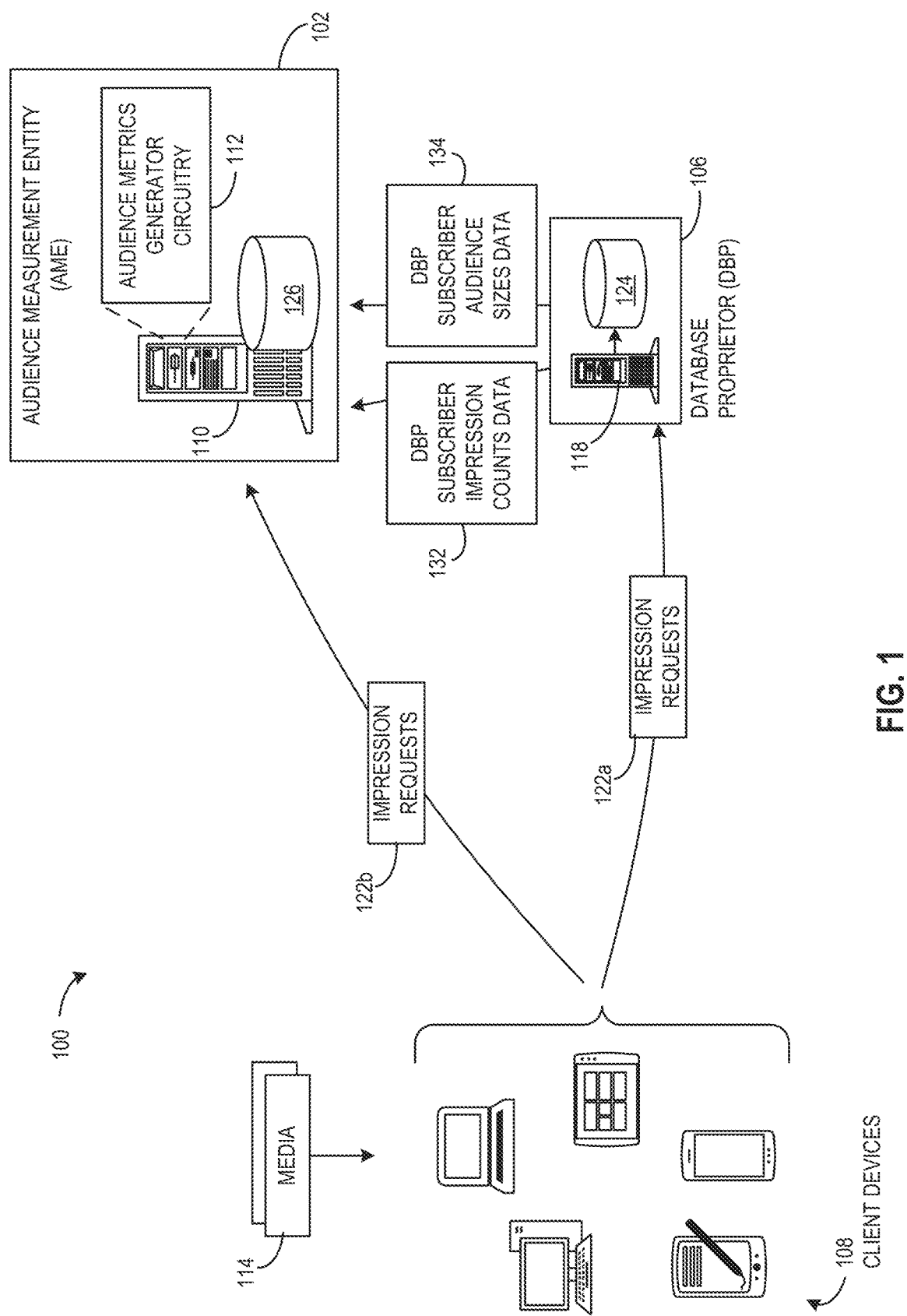
FIG. 1 is an example system to log impressions of media accessed via client devices.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media, digital advertisement ratings (DAR), and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population or audience members (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching a particular television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. As used herein, an audience size is a quantity of unique audience members of particular events (e.g., exposed to particular media, etc.). That is, an audience size is a number of deduplicated or unique audience members exposed to a media item of interest of audience metrics analysis. A deduplicated or unique audience member is one that is counted only once as part of an audience size. Thus, regardless of whether a particular person is detected as accessing a media item once or multiple times, that person is only counted once as the audience size for that media item. In this manner, impression performance for particular media is not disproportionately represented when a small subset of one or more audience members is exposed to the same media an excessively large number of times while a larger number of audience members is exposed fewer times or not at all to that same media. Audience size may also be referred to as unique audience or deduplicated audience. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous subscriber information (without revealing personally identifiable information (PII)) across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets is generated.

Audience measurement entities (AMEs) may use television (TV) and digital measurements (e.g., measurements obtained from a panel of the AME or another party), to monitor audiences of media. In some cases, a single unique audience member may be exposed to an item of media via more than one platform (e.g., desktop and mobile devices), thus creating an overlap between those platforms. Deduplication is a process that is used to adjust cross-platform media exposures by deduplicating multiple logged impressions attributed to the same audience member so that an individual audience member exposed to the same media via more than one platform is counted only once for purposes of determining a unique audience (e.g., a deduplicated audience). A unique audience can then be used to determine the reach of the media. Prior techniques to determine unique audience sizes and demographic distributions of audiences of media involve AMEs using third-party cookies to leverage demographic impression information logged by database proprietors based on media accessed by subscribers of those database proprietors. However, measurements based on such third-party cookies may be limited or may cease in some or all online markets.

A marginal union graphs (MUG) approach to determine deduplicated census audience size uses information included in the lowest level and the highest level of a media brand hierarchy to infer overlaps between audiences and thereby estimate a unique audience. In examples disclosed herein, a brand refers to a product brand and/or service brand. A brand may be represented using an identifier such as a product brand identifier and/or a service brand identifier included in media. For example, a brand identifier may be included in an advertisement for a product and/or service (e.g., Colgate toothpaste, Tesla automobiles, wireless carrier services, etc.). Additionally or alternatively, a brand identifier may be included in content (e.g., a movie, a television program, a radio program, etc.) in which a product or service is mentioned/displayed (e.g., product placement advertising in content). In some examples, the MUG approach implements principles of maximum entropy to estimate a unique audience for an intermediate level of a hierarchy. For example, MUG may implement the maximum entropy approach to infer which correlations in the intermediate level make the highest-level values and the lowest-level values true. However, the maximum entropy approach may produce overall correlations that are subject to a regression to the mean (e.g., the overall correlations produced may be too high for one set of signals or too low for another set of signals). Thus, in some examples, the MUG methodology may produce inaccurate audience estimates.

Examples disclosed herein may be used to enhance the MUG deduplication approach with panel data to further calibrate the media brand hierarchy and improve the accuracy of audience size estimates. In some examples, panel information/data may be used to estimate missing census information. In some examples, not all of the panel information/data is known at the bottom level of the media brand hierarchy and the top node (e.g., total universe audience size of the panel) in the panel information hierarchy is unknown. In some examples, all nodes in the bottom level of the media brand hierarchy for the census information/data is known, and the top node (e.g., total universe audience size of the census) in the census information hierarchy is known. In some examples, all nodes (e.g., audience sizes) in the intermediate level of the media brand hierarchy for the census information are unknown. In some examples, some numbers are the same between the panel information and census information, but that in general is not always the case. In some examples, the structures themselves between the panel information hierarchy and the census information hierarchy may be different, and the unknown intermediate nodes in the census may not be included in the structure of the panel information. In some examples, the panel information supplies prior audience information to estimate the missing intermediate level in the hierarchy of the census information. In examples disclosed herein, prior audience information is audience sizes data for intermediate nodes in the panel and some or all of the nodes at the bottom level of the media brand hierarchy for the panel.

In examples disclosed herein, the panel information hierarchy and the census information hierarchy include nodes at different levels that are representative of different audience size information. In examples disclosed herein, a top node is called the root and bottom nodes are called the leaves. The children of a node are all lower level nodes that connect to that node, and the parent of a node is the next higher node. All leaves in the hierarchy have a parent but no children, and the root node has children but no parent. In examples disclosed herein, the nodes in the panel information hierarchy and the census information hierarchy are indexed by subscript in a consistent manner, usually $\{1, \ldots, n\}$, and the root node may also be designated by a bullet or dot in the subscript to designate it as the overall deduplicated audience and not a sub-union or leaf. In examples disclosed herein, the parent of node k in labelled Par(k) which maps node k to the node value of its parent. The children of node k is an array of indices given by Ch(k) which maps node k to the node values of all its children. One such consistent labelling, used in the example later, is nodes {1, ..., 5} are the leaves, nodes {6, 7} for two intermediate value, and node 8 the total audience. In that case Par(1)=6 and Ch(8)={6, 3, 8}.

For either the panel information hierarchy or the census information hierarchy, the bottom nodes represent the audience of media items or entities visited, accessed, or viewed, such as websites, stores, or television shows. For example, techniques disclosed herein can be used to deduplicate audience members who visited across five different websites. In examples disclosed herein, the nodes going up in levels of the panel information hierarchy and the census information hierarchy are the deduplicated audience of those nodes below. For example, in a panel information hierarchy where 100 people are known to be members of a first entity, 200 people are known to be members of a second entity, but there are only 250 unique individuals across the two entities, examples disclosed herein estimate the deduplicated audience size of only the unique individuals across the entities (e.g., the 250 individuals).

In some examples, a deduplicated census audience is estimated using an intermediate level of known unions in a panel hierarchy. For example, panel information of audience sizes may be used to determine intermediate level audience size estimates (e.g., intermediate unions) of the census hierarchy. In some examples, the panel hierarchy and census hierarchy are aligned so that the panel hierarchy may be used as an indicator that a calibration should be performed when census information is missing or incomplete. In some examples, the use of a single intermediate level reduces complexity and increases scalability of estimating deduplicated census audiences while increasing the accuracy of overall audience estimates.

Examples disclosed herein are used to estimate a deduplicated census audience size using panel information. Examples disclosed herein determine sufficient statistics for the panel information which remain invariant quantities for the equivalent same hierarchy structure in the census information. Examples disclosed herein solve a system of equations for unknown intermediate unions/nodes for the census information using known audience sizes across all leaves and the root of the census information and the determined sufficient statistics for the panel information. In some examples, the structure of the census information is different from the panel information, and examples disclosed herein update the nodes of the census information to the new structure while maintaining logical consistency of the deduplication audiences determined for the intermediate unions/nodes of the census information.

FIG. 1 shows an example operating environment 100 that includes an example audience measurement entity (AME) 102, an example database proprietor A 106, and example client devices 108. The example AME 102 includes an example AME computer 110 that implements example audience metrics generator circuitry 112 to estimate total unique audience sizes based on census-level media impressions logged by the AME 102 and/or census-level total audience sizes logged by the AME 102 and based on database proprietor (DBP) aggregate subscriber-based audience metrics information provided by the database proprietor 106. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, and/or any other type of device that may be connected to the Internet and capable of presenting media.

As used herein, a media impression is defined as an occurrence of access and/or exposure to media 114 (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietor 106. For example, the database proprietor 106 includes a database proprietor server 118 that can serve media 114 to its corresponding subscribers via the client devices 108. Examples disclosed herein can be used to generate audience metrics data that measures audience sizes of media served by the database proprietor 106 and/or any other entity. For example, the database proprietor 106 may use such audience metrics data to promote its online media serving services (e.g., ad server services, media server services, etc.) to prospective clients. By showing audience metrics data indicative of audience sizes drawn by the database proprietor 106, the database proprietor 106 can sell its media serving services to customers interested in delivering online media to users.

The media 114 is then presented via the client devices 108. When the media 114 is accessed by the client devices 108, the client devices 108 send impression requests 122a to the database proprietor server 118 to inform the database proprietor server 118 of the media accesses. In this manner, the database proprietor server 118 can log media impressions in impression records of a database proprietor audience metrics database 124. In some examples, the client devices 108 also send impression requests 122b to the AME 102 so that the AME 102 can log census impressions in an AME audience metrics database 126. In the illustrated example of FIG. 1, the database proprietor 106 logs demographic impressions corresponding to accesses by the client devices 108 to the media 114. Demographic impressions are impressions logged in association with demographic information collected by the database proprietor 106 from registered subscribers of its services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the AME computer 110 also logs census-level audience size(s) corresponding to accesses by client device 108 to media 114. A census-level audience size (e.g., census audiences) indicates a quantity of audience members attributable to the census impressions regardless of whether demographic information is known for those audience members. In some examples, the AME computer 110 deduplicates the census-level audience size (e.g., an audience member corresponding to multiple impressions in the census impressions is counted only once in the census-level audience size regardless of the number of impressions attributable to that audience member).

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include a program name (or program identifier), season number, and episode number. When the media 114 includes content and/or advertisements. The advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of media monitoring (e.g., web pages, movies, television programs, etc.).

In some examples, the media 114 of the illustrated example is tagged or encoded to include monitoring instructions or tag instructions, which are computer executable instructions (e.g., Java, java script, or any other computer language or script) that are executed by web browsers that access the media 114 via, for example, the Internet. Execution of the monitoring instructions causes the web browser to send the impression requests 122*a,b* (e.g., also referred to as tag requests) to one or more specified servers of the AME 102 and/or the database proprietor 106. As used herein, tag requests 122*a,b* are used by the client devices 108 to report occurrences of media impressions caused by the client devices 108 accessing the media 114. In the illustrated example, the tag requests 122*a* include user-identifying information that the database proprietor 106 can use to identify the subscriber that accessed the media 114. For example, when a subscriber of the database proprietor 106 logs into a server of the database proprietor 106 via a client device 108, that server of the database proprietor 106 sets a database proprietor cookie on the client device 108 and maps that cookie to the subscriber's identity/account information at the database proprietor server 118. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other personal information provided by subscribers in exchange for services from the database proprietor 106. By having such PII information mapped to database proprietor cookies, the database proprietor 106 can subsequently identify the subscriber based on the database proprietor cookie to determine when that user accessed different media 114 and to log an impression in association with demographics and/or other PII information of that user. In the illustrated example of FIG. 1, the impression requests 122*a* include database proprietor cookies of the client devices 108 to inform the database proprietor 106 of the particular subscribers that accessed the media 114. In some examples, the AME 102 also sets AME cookies in the client devices 108 to identify users that are enrolled in an AME panel of the AME 102 such that the AME 102 collects PII information of people that enroll in the panel by agreeing to having their internet activities monitored by the AME 102.

The tag requests 122*a,b* may be implemented using HTTP requests. However, whereas HTTP requests are network communications that traditionally identify web pages or other resources to be downloaded, the tag requests 122*a,b* of the illustrated example are network communications that include audience measurement information (e.g., ad campaign identification, media identifier, and/or user identification information) as their payloads. The server (e.g., the AME computer 110 and/or the database proprietor server 118) to which the tag requests 122*a,b* are directed is programmed to log occurrences of impressions reported by the tag requests 122*a,b*. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector (e.g., a software program or library to collect data) in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122*a,b* to report the access to the media 114. In such examples, the data collector can obtain user identifiers and/or device identifiers stored in the client devices 108 and send them in the impression requests 122*a,b* to enable the database proprietor 106 and/or the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietor 106 collaborates with the AME 102 so that the AME 102 can operate as an independent party that measures and/or verifies audience measurement information pertaining to the media 114 accessed by the subscribers of the database proprietor 106. However, the database proprietor 106 does so while protecting the privacies of its subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietor 106 processes its collected subscriber-level audience metrics information to generate database proprietor aggregate subscriber-based audience metrics information. In the example of FIG. 1, database proprietor aggregate subscriber-based audience metrics information is shown as example database proprietor subscriber impression counts data 132 and example database proprietor subscriber audience sizes data 134. The example database proprietor subscriber impression counts data 132 includes impression counts in the aggregate (e.g., no user-identifying PII data) per demographic category (e.g., a demographic group) for one or more media items of interest. The example database proprietor subscriber audience sizes data 134 includes unique audience sizes in the aggregate (e.g., no user-identifying PII data) per demographic category for one or more media items of interest.

Figure 2:
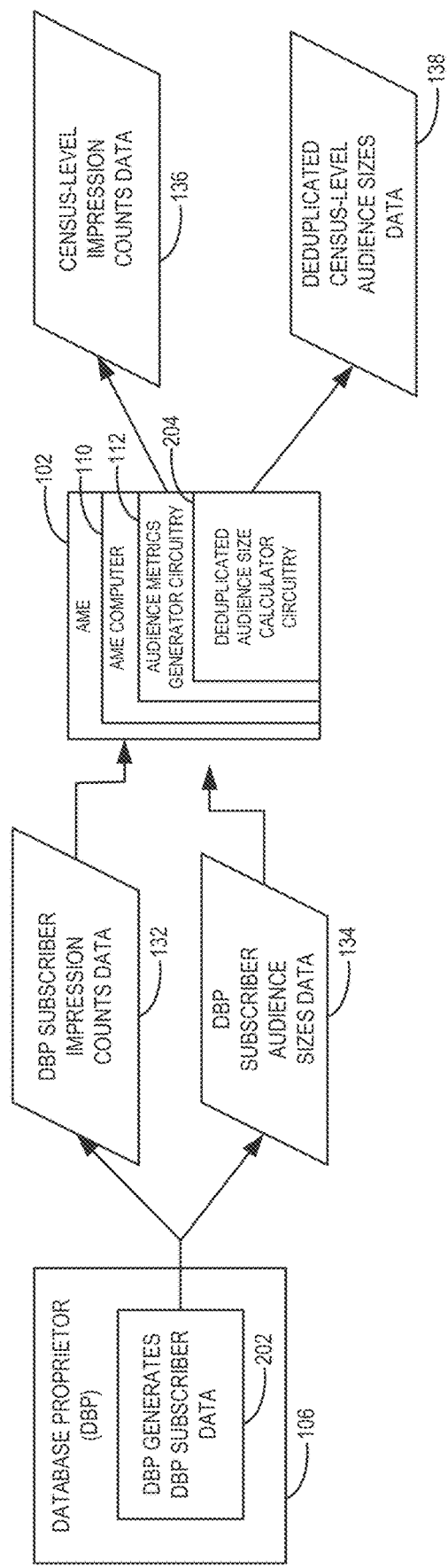
FIG. 2 is a schematic illustration of an example process flow of a database proprietor and an audience measurement entity to estimate deduplicated census audience sizes based on panel-level data and census-level data.

FIG. 2 is an example process flow of the database proprietor 106 and the AME 102 of FIG. 1 to estimate census-level impression counts and census-level unique audience sizes for media across multiple demographic categories based on the database proprietor subscriber impression counts data 132 and the database proprietor subscriber audience sizes data 134. The example process flow of FIG. 2 begins when the database proprietor 106 generates database proprietor subscriber-level audience metrics data 202 based on logging impressions of the media 114 (FIG. 1) accessed by subscribers of the database proprietor 106. The example database proprietor 106 then anonymizes the subscriber-level audience metrics data 202 by aggregating it by demographic category to generate the database proprietor subscriber impression counts data 132 and the database proprietor subscriber audience sizes data 134. In this example, the database proprietor 106 sends the database proprietor subscriber impression counts data 132 and the database proprietor subscriber audience sizes data 134 to the example audience metrics generator circuitry 112 of the AME 102.

In some examples, the example audience metrics generator circuitry 112 utilizes the database proprietor subscriber impression counts data 132 and the database proprietor subscriber audience sizes data 134 as inputs to estimate census-level impression counts data 136 and census-level audience sizes data. In some examples, the audience metrics generator circuitry 112 performs MUG analysis on the census-level audience sizes data for the census data without associated panel data. In some examples, the audience metrics generator circuitry 112 determines deduplicated census audience size using the MUG approach with information included in the lowest level and the highest level of a DCR brand hierarchy to infer overlaps between audiences and thereby estimate a unique audience. In some examples, the audience metrics generator circuitry 112 implements the maximum entropy approach to infer for which correlations in the intermediate level of the census data make the highest-level values and the lowest-level values true. However, the audience metrics generator circuitry 112 may not produce accurate deduplicated audience estimates since the maximum entropy approach may produce overall correlations that are subject to a regression to the mean.

In some examples, the audience metrics generator circuitry 112 includes an example deduplicated audience size calculator circuitry 204 that utilizes the census-level audience sizes data determined by the audience metrics generator circuitry 112 as an input to estimate example deduplicated census-level audience sizes data 138 using audience sizes from a hierarchy of panel data. In some examples, the deduplicated audience size calculator circuitry 204 performs an enhanced MUG analysis on the census data with panel data. The example deduplicated audience size calculator circuitry 204 improves the accuracy of audience estimates from the example audience metrics generator circuitry 112. In some examples, the deduplicated audience size calculator circuitry 204 uses the panel data to supply prior audience information to estimate the missing intermediate level in the hierarchy of the census data. An example implementation of the deduplicated audience size calculator circuitry 204 is described in further detail below in connection with FIG. 3. In some examples, after the deduplicated audience size calculator circuitry 204 performs the enhanced MUG analysis on the census data with associated panel data to determine deduplicated audience sizes for intermediate nodes of the census data, the example audience metrics generator circuitry 112 concatenates the results from the MUG analysis and the enhanced MUG analysis performed by the example deduplicated audience size calculator circuitry 204.

Figure 3:
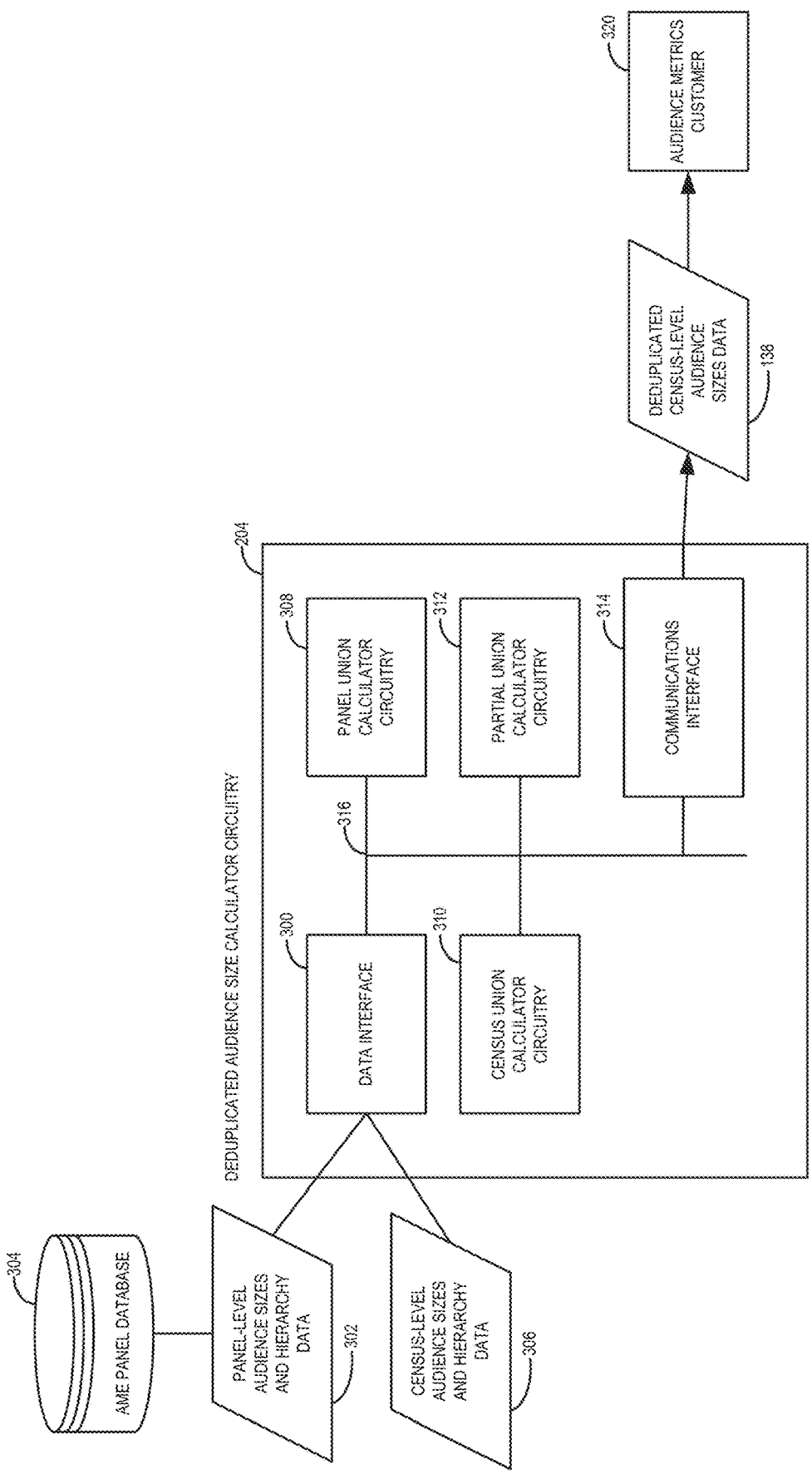
FIG. 3 is a block diagram of the example deduplicate audience size calculator circuitry of FIG. 2 to deduplicate census audience sizes in accordance with teachings of this disclosure.

FIG. 3 is a block diagram of the example deduplicated audience size calculator circuitry 204 of FIG. 2 to estimate deduplicated census audience sizes in accordance with teachings of this disclosure. The example deduplicated audience size calculator circuitry 204 of FIG. 3 may be instantiated (e.g., creating an instance of, bring into being for any length of time, materialize, implement, etc.) by processor circuitry such as a central processor unit executing instructions. Additionally or alternatively, the example deduplicated audience size calculator circuitry 204 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example deduplicated audience size calculator circuitry 204 is provided with an example data interface 300 to access example panel-level audience sizes and hierarchy data 302 and example census-level audience sizes and hierarchy data 306 (e.g., in memory and/or in one or more network communications). For example, the data interface 300 accesses the example panel-level audience sizes and hierarchy data 302 from an example AME panel database 304. In some examples, the data interface 300 access the example census-level audience sizes and hierarchy data 306 from audience metrics generator circuitry 112 determined from the example database proprietor subscriber audience sizes data 134 of FIGS. 1 and 2.

In some examples the panel-level audience sizes and hierarchy data 302 includes audience size values for nodes included in data of a panel hierarchy. In some examples, the panel-level audience sizes and hierarchy data 302 includes audience size values for the nodes included in the intermediate/sub-union level in the panel hierarchy and audience size values for some or all of the leaf nodes included in the bottom/lowest level in the panel hierarchy. In some examples, the census-level audience sizes and hierarchy data 306 include audience size values for nodes included in data of a census hierarchy. In some examples, the census-level audience sizes and hierarchy data 306 include audience size values for the parent node included in the top/highest level in the census hierarchy (e.g., total unique audience size included in the census) and the audience size values for the leaf nodes included in the bottom/lowest level in the census hierarchy.

The example deduplicated audience size calculator circuitry 204 is provided with example panel union calculator circuitry 308 to calculate threshold statistic(s) (e.g., sufficient statistic(s)) corresponding to intermediate union(s)/node(s) of the panel hierarchy. In some examples, a threshold statistic (e.g., a sufficient statistic) is a statistic that remains an invariant quantity for an equivalent structure in the census data. In some examples, the panel union calculator circuitry 308 calculates the threshold/sufficient statistics based on the panel-level audience sizes and hierarchy data 302. For example, the panel union calculator circuitry 308 calculates the threshold/sufficient statistics based on a plurality of audience metrics (e.g., audience size values) corresponding to bottom unions (e.g., nodes in a bottom/lowest level) of the panel hierarchy. In some examples, to calculate the threshold/sufficient statistics, the panel union calculator circuitry 308 determine pseudo-universe estimates ($Q_k$) for each of the intermediate union(s)/node(s) of the panel hierarchy. For example, for a node k in an intermediate union with audience $A_k$, the panel union calculator circuitry 308 determines a pseudo-universe estimate ($Q_k$) using example Equation 1 below. In such examples, the product on the right side of the example Equation 1 below is across all children of node k.

$$1 - \frac{A_k}{Q_k} = \prod_{i \in Ch(k)} \left(1 - \frac{A_i}{Q_k}\right)$$ (Equation 1)

The solution to $Q_k$ for each of the intermediate union(s)/node(s) of the panel hierarchy can be solved by fixed-point iteration or other techniques. After the example panel union calculator circuitry 308 determines $Q_k$ for each of the intermediate union(s)/node(s), the example panel union calculator circuitry 308 calculates sufficient statistics for each of the unions ($z_k$). The example panel union calculator circuitry 308 calculates the sufficient statistics using example Equation 2 below, which remains invariant when solving the census estimates.

$$z_k = \frac{Q_k - A_k}{Q_{Par(k)} - A_k}$$ (Equation 2)

In some examples, the deduplicated audience size calculator circuitry 204 includes means for calculating a threshold statistic corresponding to an intermediate union. For example, the means for calculating a threshold statistic may be implemented by panel union calculator circuitry 308. In some examples, the panel union calculator circuitry 308 may be instantiated by processor circuitry such as the example processor circuitry 2112 of FIG. 21. For instance, the panel union calculator circuitry 308 may be instantiated by the example general purpose processor circuitry 2200 of FIG. 22 executing machine executable instructions such as that implemented by at least block 2002 of FIG. 20A and at least block 2006 of FIG. 20B. In some examples, panel union calculator circuitry 308 may be instantiated by hardware logic circuitry, which may be implemented by an ASIC or the FPGA circuitry 2300 of FIG. 23 structured to perform operations corresponding to the machine readable instructions. Additionally or alternatively, the panel union calculator circuitry 308 may be instantiated by any other combination of hardware, software, and/or firmware. For example, the panel union calculator circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example deduplicated audience size calculator circuitry 204 is provided with example census union calculator circuitry 310 to calculate deduplicated audience size value(s) corresponding to intermediate union(s)/node(s) of the census hierarchy based on the threshold statistic(s) (e.g., sufficient statistic(s)). In some examples, the census union calculator circuitry 310 manages the census-level audience sizes and hierarchy data 306. In some examples, the census union calculator circuitry 310 flags rows of census data that include panel data (e.g., flagged as "1") and census data that does not include panel data (e.g., flagged as "0"). The example census union calculator circuitry 310 aggregates the census data based on the flags. The example census union calculator circuitry 310 identifies the census data that is flagged as including panel data (e.g., flagged as "1") and selects that census data to perform the enhanced marginal union graph (IMUG)/enhanced MUG analysis to determine the deduplicated audience size value(s) corresponding to intermediate union(s)/node(s) of the census hierarchy. The example census union calculator circuitry 310 determines the deduplicated audience size value(s) corresponding to intermediate union(s)/node(s) of the census hierarchy that is flagged as including panel data. The example census union calculator circuitry 310 determines the deduplicated audience size value(s) using an enhanced MUG analysis for the census data including panel data. For all other census data included in the census-level audience sizes and hierarchy data 306 that are flagged as not including panel data, the example audience metrics generator circuitry 112 determine the deduplicated audience size value(s) using the original MUG analysis, as described above in connection with FIG. 2. In some examples, the deduplicated audience value(s) are representative of accesses to media by unique audience members via network-connected devices (e.g., the example client devices 108 of FIG. 1).

In some examples, the census union calculator circuitry 310 calculates the a deduplicated audience value(s) corresponding to intermediate union(s)/node(s) of the census hierarchy with panel data using a system of equations to solve the unknowns for each node of the intermediate unions of the census hierarchy included in the example census-level audience sizes and hierarchy data 306. For example, if there are m intermediate unions/nodes, they can be indexed by j={1, ..., m} with letting σ(j) represent the node index for the parent of the j intermediate union/node. The example Equation 3 below is representative of the system of equations to solve the unknowns for each node of the intermedia unions of the census hierarchy.

$$z_{\sigma(j)} = \frac{Q_{\sigma(j)} - X_{\sigma(j)}}{Q_\bullet - X_{\sigma(j)}} \quad j = \{1, \ldots, m\}$$ (Equation 3)

$$1 - \frac{X_{\sigma(j)}}{Q_{\sigma(j)}} = \prod_{i \in Ch(\sigma(j))} \left(1 - \frac{X_i}{Q_{\sigma(j)}}\right) \quad j = \{1, \ldots, m\}$$

$$1 - \frac{X_\bullet}{Q_\bullet} = \prod_{i \in Ch(\bullet)} \left(1 - \frac{X_i}{Q_\bullet}\right)$$

In some examples, there is a total of 2m+1 equations to be solved for 2m+1 unknowns, and there are m pairs of unknowns $\{Q_k, X_k\}$ (where $X_k$ is the unknown intermediate audience value) for each node of the intermediate unions and there would be another pair for $\{Q_m, X_m\}$ but example disclosed herein assume $X_m$ (the total audience size of the census hierarchy in the top/highest level) is known, yielding a total of 2m+1 unknowns. The example census union calculator circuitry 310 determines logical bounds for $X_k$ and $Q_m$ based on the panel hierarchy audience size data, the census hierarchy audience size data that is known, and the threshold/sufficient statistic. The example census union calculator circuitry 310 calculates a test value (Q) for a universe audience value corresponding to the intermedia union based on the determined logical bound for $Q_m$. The example census union calculator circuitry 310 calculates the deduplicated audience value corresponding to the intermediate union of the census hierarchy based on the threshold statistic and test value. The example census union calculator circuitry 310 solves the system of equations in the example Equation 3 to determine the deduplicated audience value. In the example Equation 4 below, let Q be a test value.

$$\hat{X} = Q\left(1 - \left(\prod_{i \in Ch(\sigma(j))}\left(1 - \frac{X_i}{Q}\right)\right)\right)$$ (Equation 4)

$$f(Q) = \left((1 - z_{\sigma(j)})\hat{X} + Q_\bullet z_{\sigma(j)}\right) - Q$$

In some examples, when $f(Q)=0$ then $\{Q_{\sigma(j)}, X_{\sigma(j)}\} = \{\hat{Q}, \hat{X}\}$ is the solution to pair of unknowns for that index j. In some examples, the census union calculator circuitry 310 computes $\hat{X}$ based on the test value to determine if the deduplicated audience value satisfies a known census audience size from the census hierarchy ($X_m$). Once all $X_{\sigma(j)}$ are known, examples disclosed herein can check if $\widehat{X_\bullet}$ and the example Equation 3 above matches the known value. In some examples, the census union calculator circuitry 310 calculates a new test value if the deduplicated audience value ($\widehat{X_\bullet}$) does not satisfy the known census audience size ($X_m$). This iteration of testing the different test values (Q) may occur in some examples throughout the entire range of allowable test values. Eventually, a deduplicated audience value will result in satisfying the known census audience size. The methodology for calculating the deduplicated audience value(s) corresponding to intermediate union(s)/node(s) of the census hierarchy are described in further detail below in connection with FIGS. 12A-15B.

In some examples, the deduplicated audience size calculator circuitry 204 includes means for calculating a deduplicated audience value corresponding to an intermediate union. For example, the means for calculating a deduplicated audience value may be implemented by census union calculator circuitry 310. In some examples, the census union calculator circuitry 310 may be instantiated by processor circuitry such as the example processor circuitry 2112 of FIG. 21. For instance, the census union calculator circuitry 310 may be instantiated by the example general purpose processor circuitry 2200 of FIG. 22 executing machine executable instructions such as that implemented by at least block 2004 of FIG. 20A and at least blocks 2008, 2010, 2012, 2014, 2016, 2018 of FIG. 20B. In some examples, census union calculator circuitry 310 may be instantiated by hardware logic circuitry, which may be implemented by an ASIC or the FPGA circuitry 2300 of FIG. 23 structured to perform operations corresponding to the machine readable instructions. Additionally or alternatively, the census union calculator circuitry 310 may be instantiated by any other combination of hardware, software, and/or firmware. For example, the census union calculator circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example deduplicated audience size calculator circuitry 204 is provided with example partial union calculator circuitry 312 to calculate deduplicated audience size value(s) corresponding to partial union(s) of the census hierarchy when the structure of the census hierarchy is different than the structure of the panel hierarchy. In such examples, the panel hierarchy does not include the example partial union(s). In some examples, the example partial union calculator circuitry 312 calculates the deduplicated audience size values corresponding to the partial unions while maintaining the logical consistency of deduplicating different audiences. In some examples, the partial union calculator circuitry 312 aggregates the deduplicated audience size value(s) from the example audience metrics generator circuitry 112 using the original MUG analysis without panel data and the deduplicated audience size value(s) from the example census union calculator circuitry 310 using the IMUG/enhanced MUG analysis with panel data.

In some examples, the deduplicated audience size calculator circuitry 204 includes means for calculating a deduplicated audience value corresponding to a partial union of the census hierarchy. For example, the means for calculating a deduplicated audience value may be implemented by partial union calculator circuitry 312. In some examples, the partial union calculator circuitry 312 may be instantiated by processor circuitry such as the example processor circuitry 2112 of FIG. 21. For instance, the partial union calculator circuitry 312 may be instantiated by the example general purpose processor circuitry 2200 of FIG. 22 executing machine executable instructions such as that implemented by at least blocks 2020, 2022 of FIG. 20B. In some examples, the partial union calculator circuitry 312 may be instantiated by hardware logic circuitry, which may be implemented by an ASIC or the FPGA circuitry 2300 of FIG. 23 structured to perform operations corresponding to the machine readable instructions. Additionally or alternatively, the partial union calculator circuitry 312 may be instantiated by any other combination of hardware, software, and/or firmware. For example, the partial union calculator circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In addition, the example deduplicated audience size calculator circuitry 204 is provided with an example communications interface 314 to send the deduplicated census-level audience sizes data 138 to an example audience metrics customer 320. In some examples, the example data interface 300, the example panel union calculator circuitry 308, the example census union calculator circuitry 310, the example partial union calculator circuitry 312, and the example communications interface 314 communicate via an example bus 316.

Figure 4:
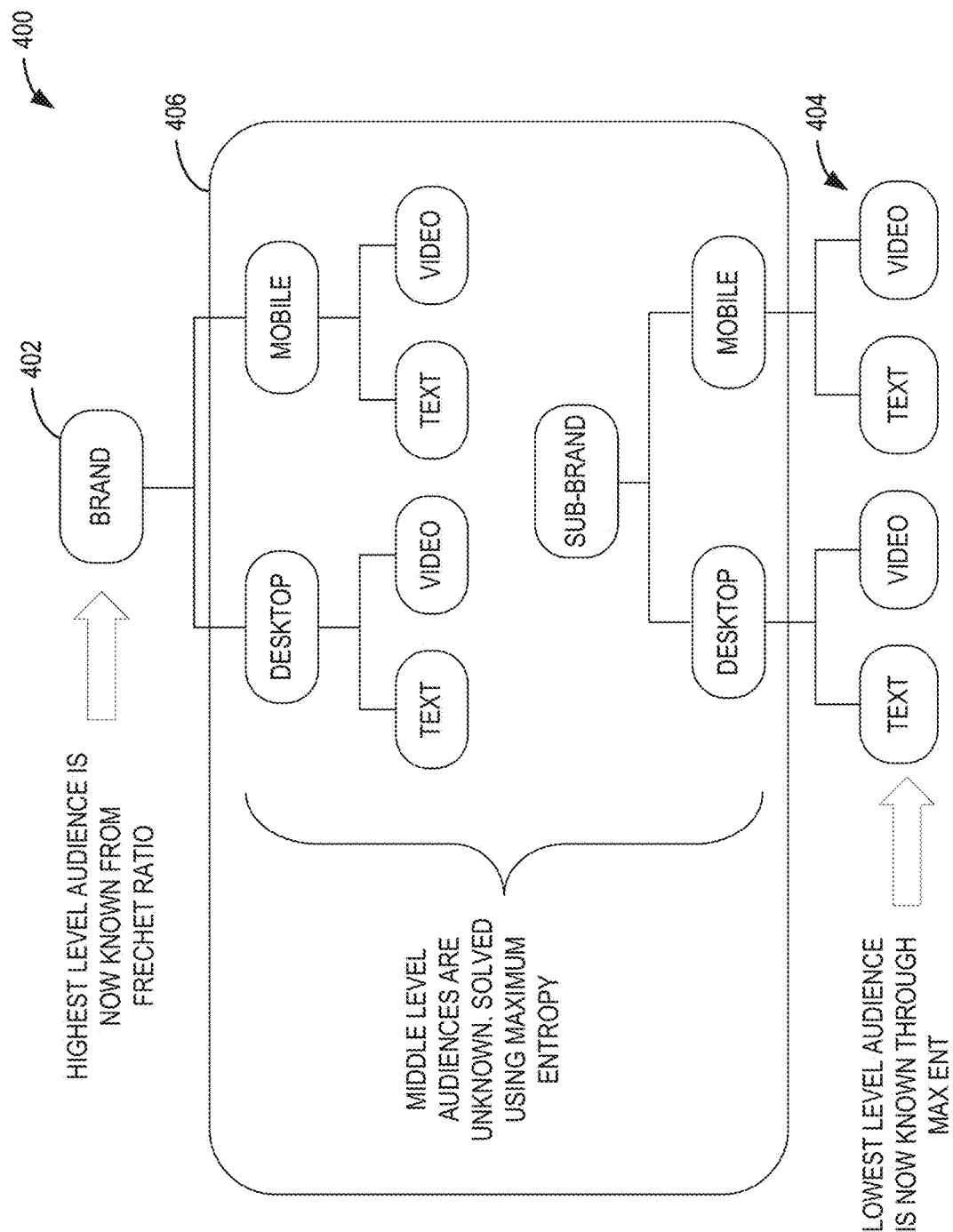
FIG. 4 is an example illustration of an example media brand hierarchy.

FIG. 4 is an example illustration of an example brand hierarchy 400. In the illustrated example, the brand hierarchy 400 includes three levels of audiences: an example top/highest level 402, an example bottom/lowest level audience 404, and an example middle/intermediate level audience 406. In examples disclosed herein, analyses of estimates from the brand hierarchy 400 show significantly higher deviations from production at intermediate level audiences 406 than at the highest level (brand) audience 402. In the illustrated example, the intermediate level audiences 406 are unknown, and the examples disclosed herein (e.g., the example audience metrics generator circuitry 112) solve for the intermediate level audiences 406 using MUG analysis. Examples disclosed herein are robust so that they can work with complex hierarchy in tagged media measurement that must be internally logically consistent and so that they can use limited panel sample sizes. In examples disclosed herein, MUG analysis uses only the information contained at the highest and lowest level of the hierarchy (e.g., the example top/highest level 402 and the example bottom/lowest level audience 404). While this does not affect the total brand estimates, these shifts are deeply concerning for client use of the data. The root-cause issue is regression to the mean, because MUG is not fully able to capture the correlations between each of the entities without additional signals. Examples disclosed herein perform an enhanced MUG analysis of panel estimates for one intermediate level of the brand hierarchy 400 to significantly improve estimation quality without sacrificing logical consistency and without introducing problematic capping rules.

Figure 5:
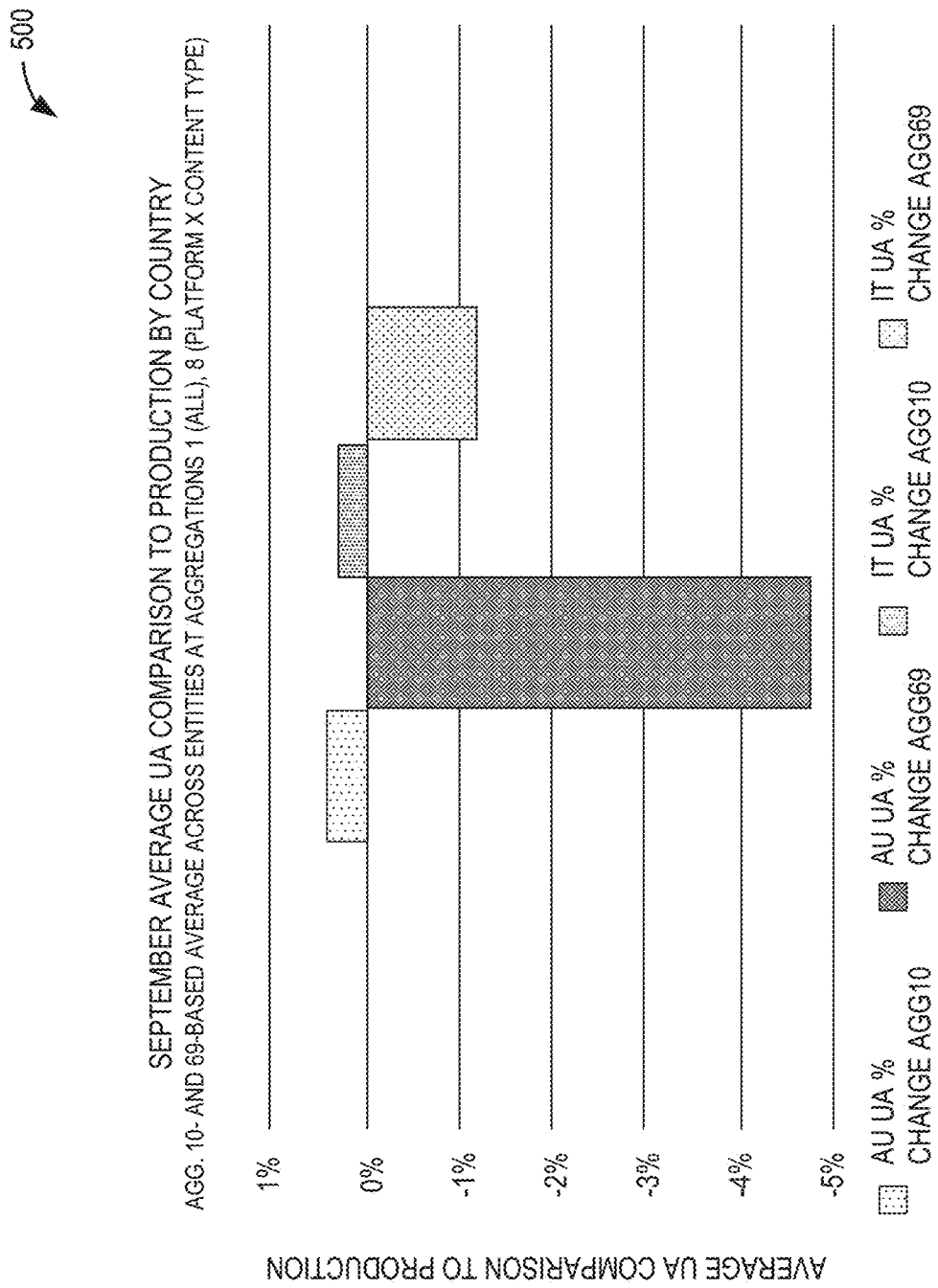
FIG. 5 illustrates an example graph of average universe audience sizes across brand-level aggregation.

FIG. 5 illustrates an example graph 500 of average universe audience sizes across brand-level aggregation. In the illustrated example, the example graph 500 illustrates universe audience alignment to production, average across brands and taken as a relative change. The example graph illustrates the universe audience alignment for the brand-level aggregation is high. In some examples, data produced by the DCR pipeline has demonstrated this regression-to-the-mean (RTM) property consistently across countries and data months. Since MUG operates on intermediate brands and uses brand-level universe audience estimates (aggregation 1) as input, changes in brand estimates do affect MUG's estimates. In the example graph 500, moving from an example first aggregation technique (e.g., aggregation 10) data instead of an example second aggregation technique (e.g., aggregation 69) data has improved the quality of brand-level estimates considerably as shown in FIG. 5.

Figure 6:
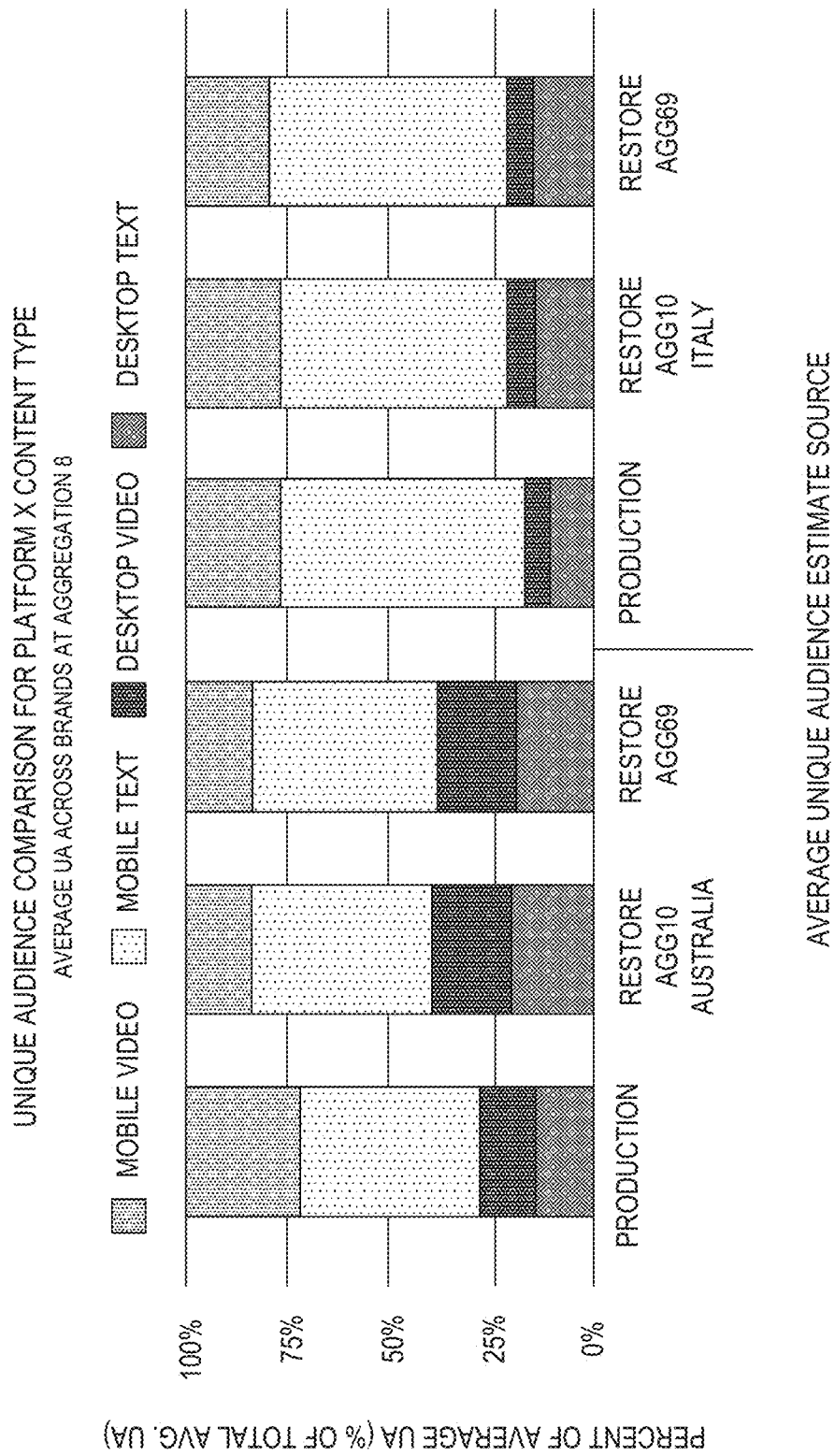
FIG. 6 illustrates an example graph of average universe audience sizes across platform and content type aggregations in a percentage scale.

FIG. 6 illustrates an example graph 600 of average universe audience sizes across platform and content type aggregations in a percentage scale. In the illustrated example, the graph 600 illustrates average percentages of universe audiences for platform and content type aggregations (e.g., mobile, desktop, video, and text) that show regression to the mean seen in MUG analysis. In the illustrated example, the regression to the mean occurs between platforms because mobile represents a larger share of audience and impressions. Without additional signals, the mobile platform is underestimated and the desktop platform (representing a smaller share) is overestimated, and seen in the example graph 600. In the illustrated example of FIG. 6, the average universe audience estimates are stacked and converted to a percentage to show the regression to the mean shifts under discussion.

Figure 7:
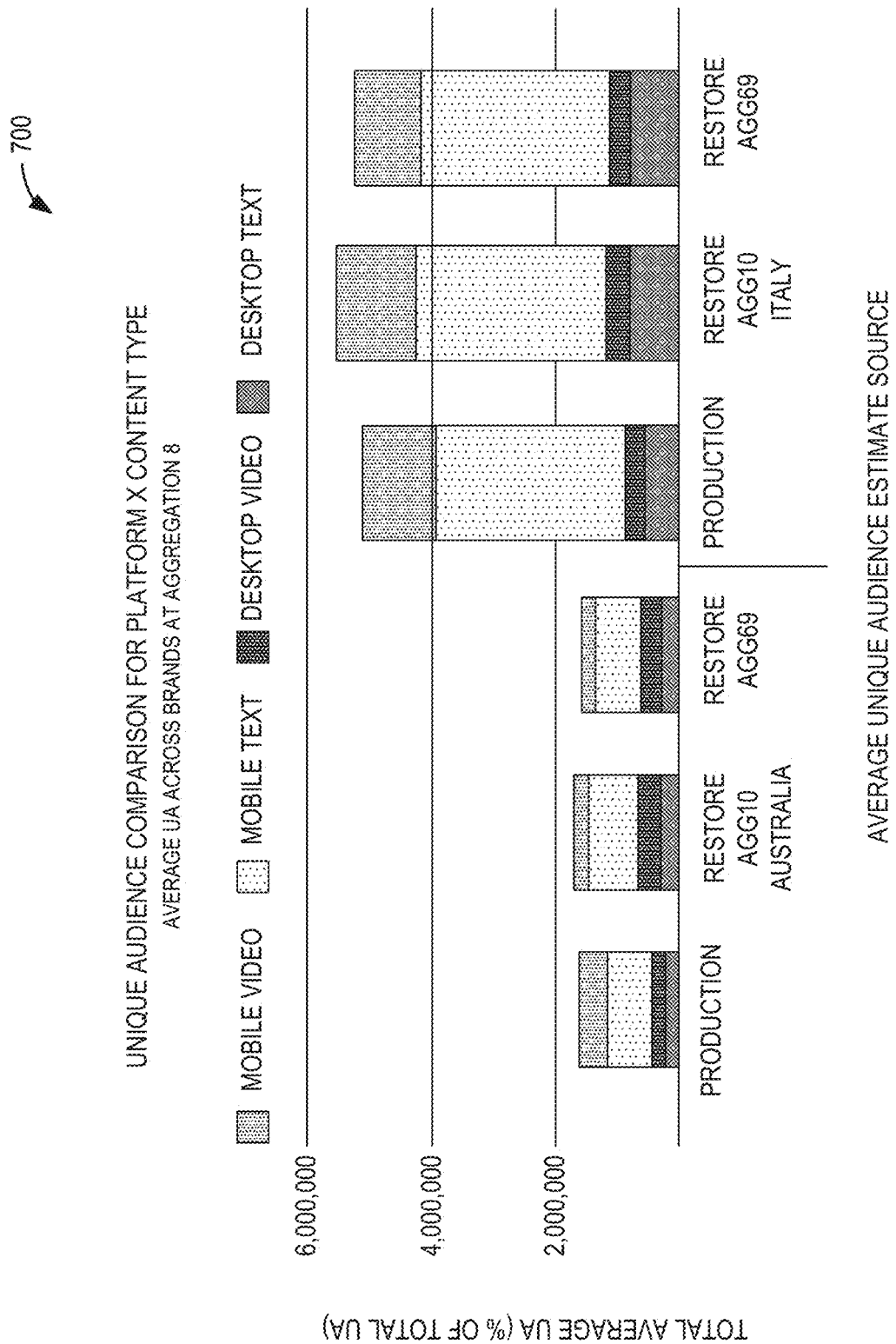
FIG. 7 illustrates an example graph of average universe audience sizes across platform and content type in a universe audience scale.

FIG. 7 illustrates an example graph 700 of average universe audience sizes across platform and content type in a persons universe audience scale. In the illustrated example, the graph 700 illustrates average persons of universe audiences for platform and content type aggregations (e.g., mobile, desktop, video, and text) stacked to show regression to the mean seen in MUG analysis, as shown in FIG. 6, in the persons universe audience scale.

Figure 8:
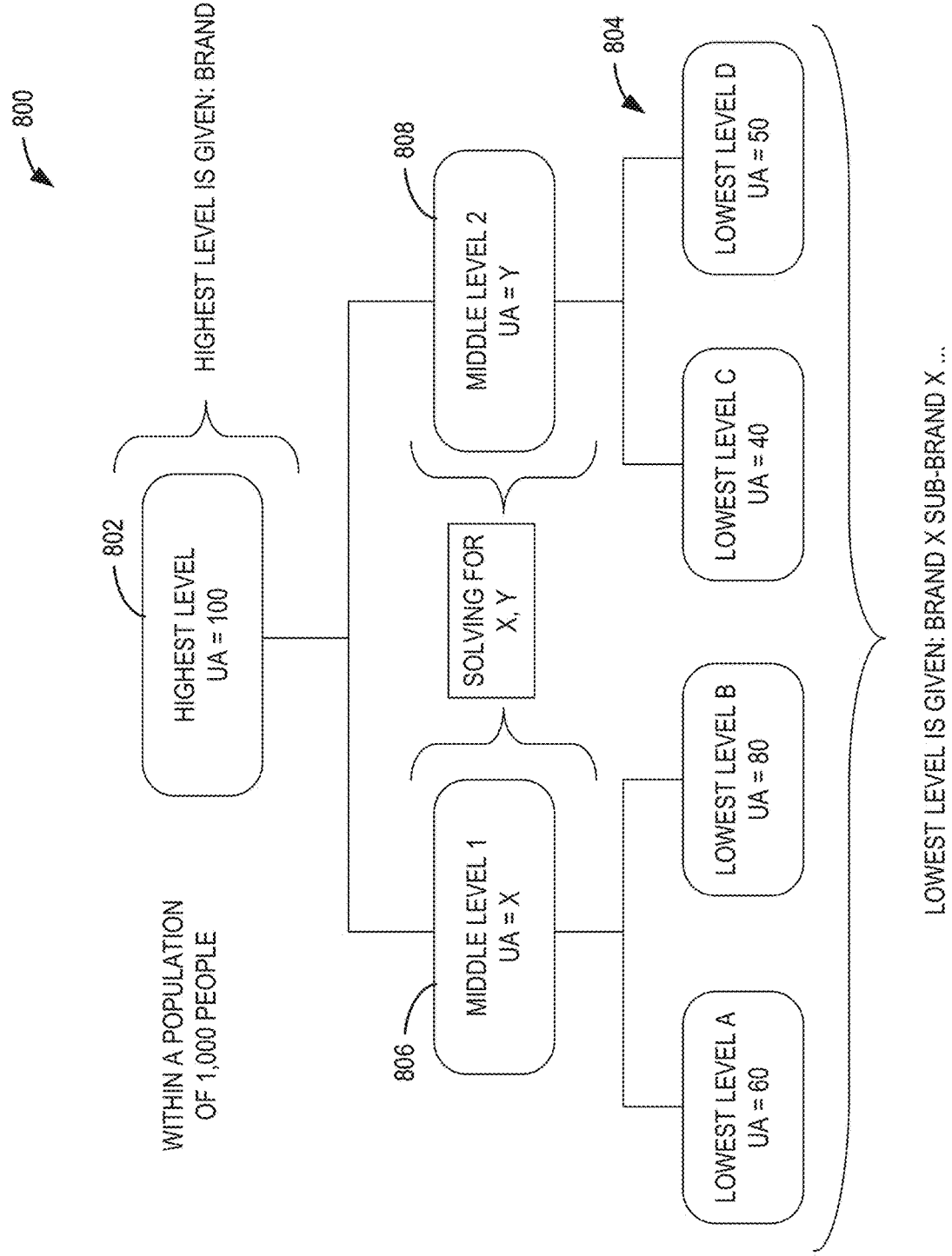
FIG. 8 is an example illustration of an example brand hierarchy using an example marginal union graph (MUG) implementation.
Figure 9A:
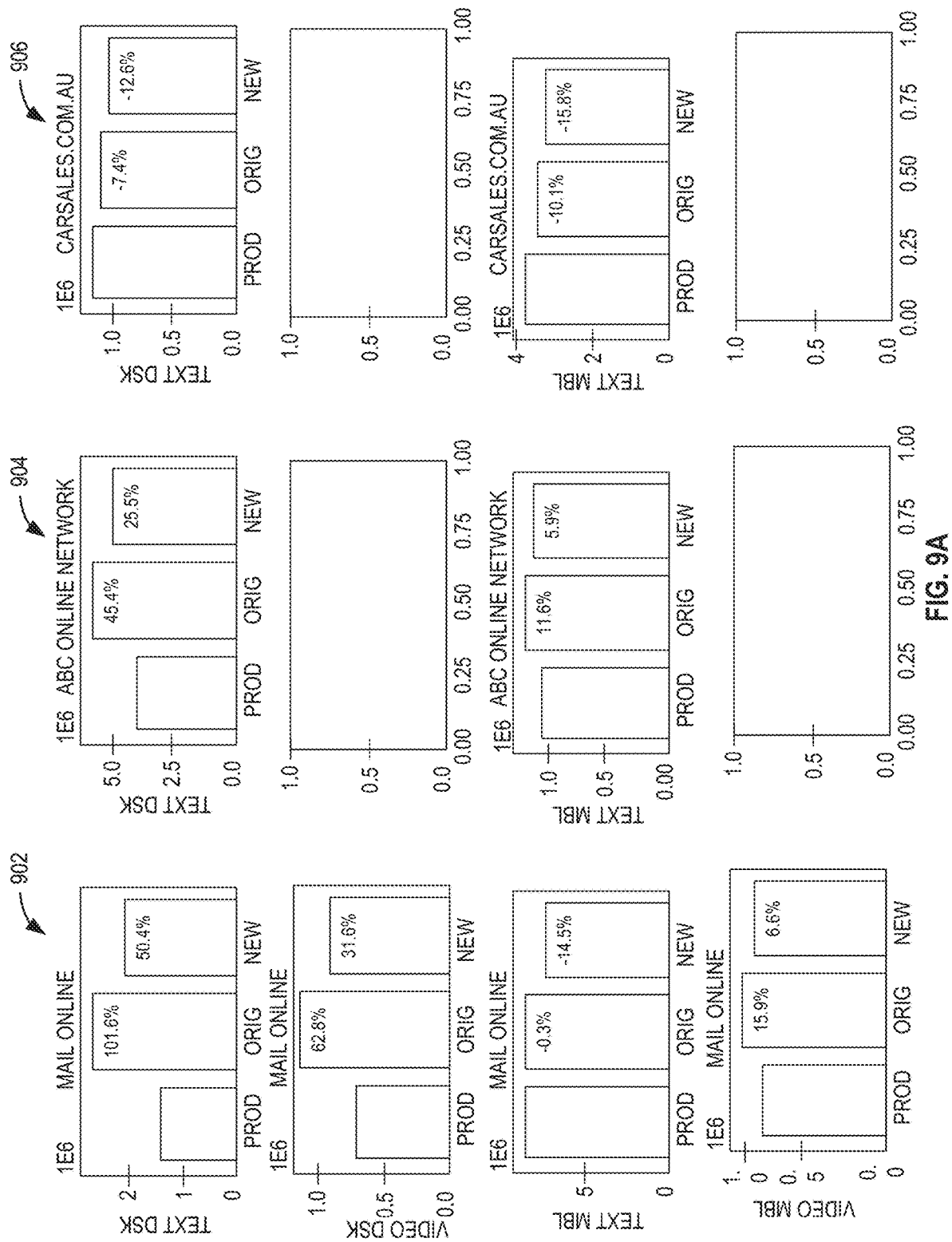
Figure 9B:
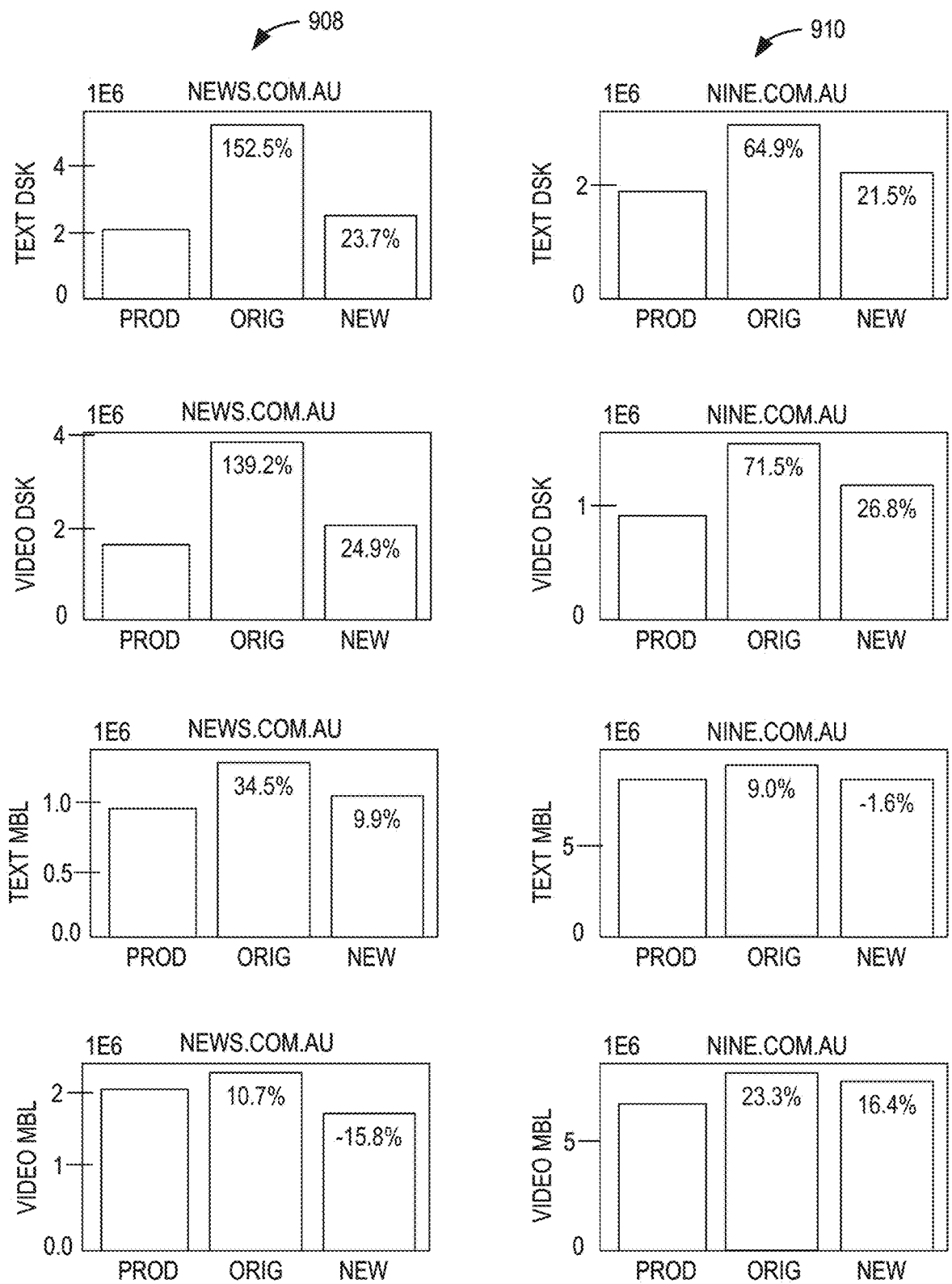
Figure 9C:
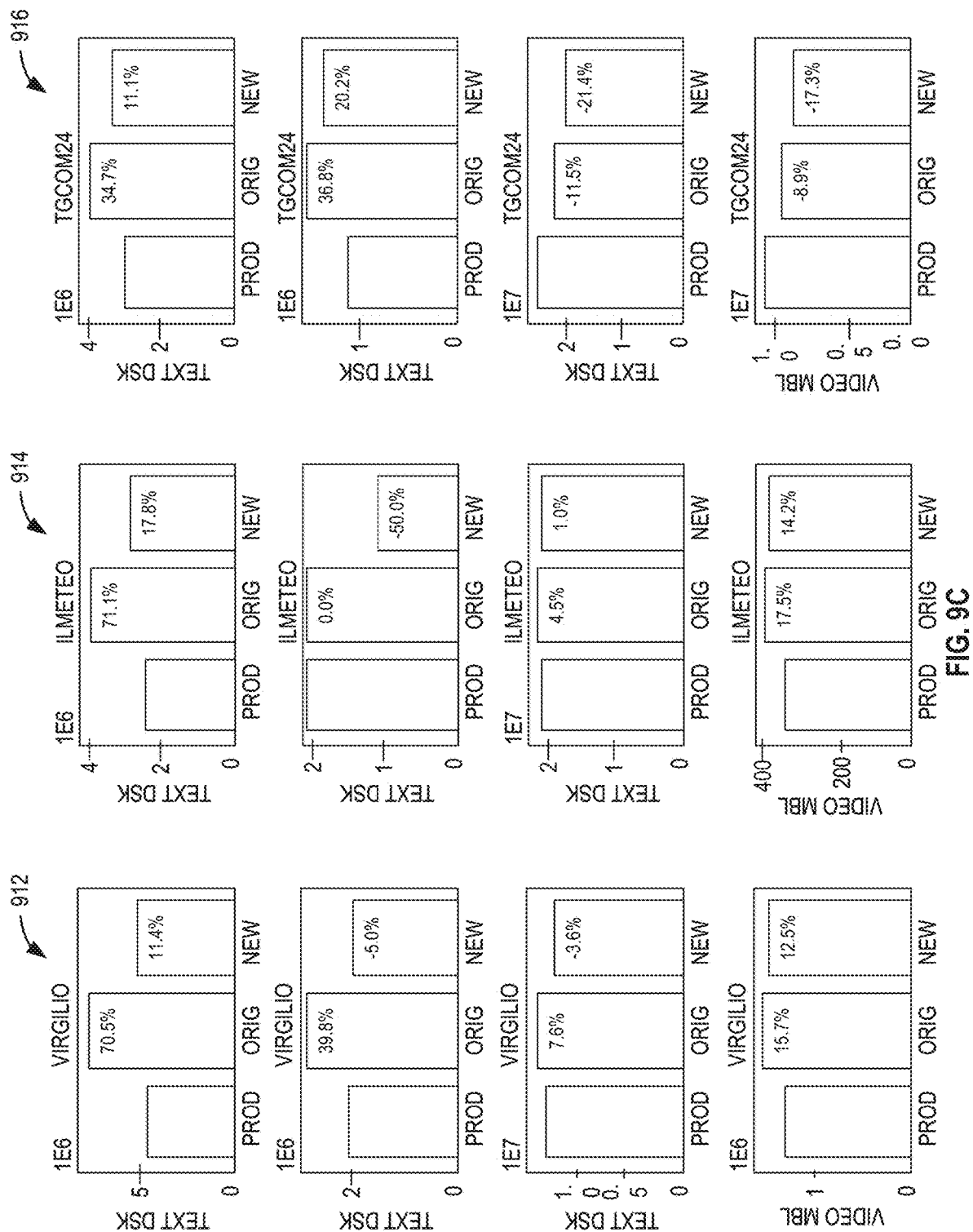
Figure 9E:
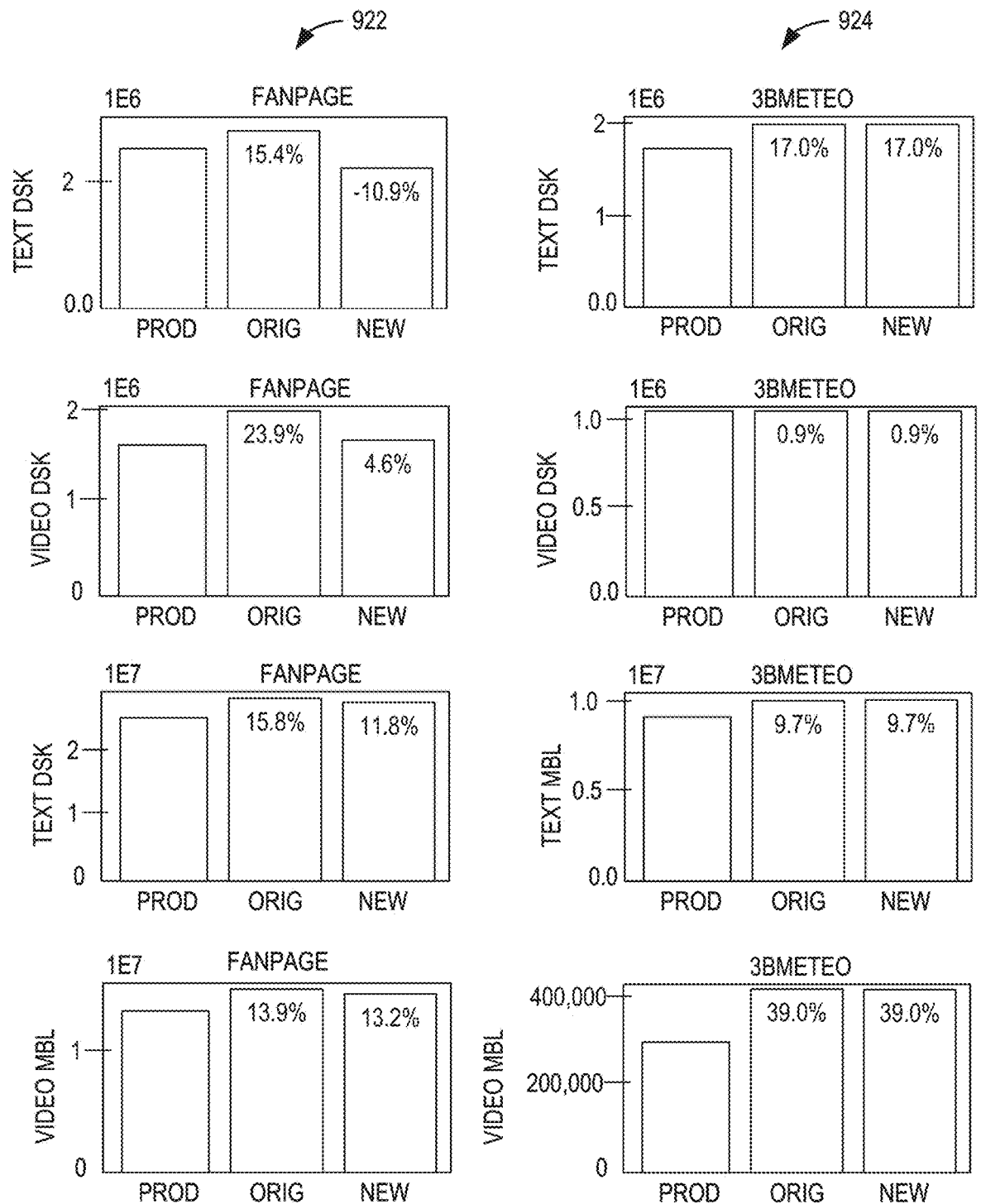

FIG. 8 is an example illustration of an example brand hierarchy 800 using an example MUG implementation. In some examples, MUG is a very robust method of inferring overlaps between the audiences because it uses a limited set of signals and therefore only requires knowledge of the very lowest level and highest level of a hierarchy as inputs (e.g., an example highest level 802 and an example lowest level 804). MUG then estimates the universe audience for any intermediate level (e.g., an example first intermediate level 806 and an example second intermediate level 808) of that brand hierarchy 800 using the principles of maximum entropy. In the current MUG implementation, Maximum Entropy (MaxEnt) can infer what correlations must exist in the Middle (the first intermediate level 806 and the second intermediate level 808) to make the highest level 802 and the lowest level 804 universe audience values true for a given population universe. In the example brand hierarchy 800, X of the first intermediate level 806 is inferred to be 93 as a strong correlation and overlap must exist, Y of the second intermediate level 88 is inferred to be 71 as a weaker correlation is more likely, and the solutions for X and Y are consistent with each other. While MaxEnt can infer correlations between audience estimates as described above, it can still experience regression to the mean (RTM). In nearly every modeling context, observing RTM indicates that additional signals are necessary to produce better predictions for the universe audience estimates of intermediate levels.

As an introduction to RTM, consider two sets of numbers {9, 10, 11} and {19, 20, 21}. One is centered around 10 and the other centered around 20. If examples disclosed herein group the two together, examples disclosed herein get {9,10, 11, 19, 20, 21} with an overall average of 15. If example disclosed herein used this overall average for each set, examples disclosed herein would predict too high for first group and too low for second group. In such examples, the use of an overall average had both groups 'regress toward the overall mean'. The same can be true for deduplication of audiences. The deduplication of the audiences can be more correlated than independence, equal to being independent, or less correlated than independence. If examples disclosed herein are more correlated than independence than the true deduplicated audience is less than what would be predicted from independence as each entry is positively correlated with the other entry's audience.

Given this measure of correlation, an estimated deduplicated audience can be computed for the example intermediate levels (e.g., the first intermediate level 806 and the second intermediate level 808). If examples disclosed herein use the overall correlation across all entries, as described above in the example, it may be too high a correlation for one set or too low for another set. It is now the deduplication correlation which regressed to the mean in this example. If the estimated overall correlation is higher than the true correlation of a set the estimated audience for that set would be slightly smaller than actual; and vice versa.

FIGS. 9A-9E illustrate example graphs 902, 904, 906, 908, 910, 912, 914, 916, 918, 920, 922, 924 of universe audience sizes from production, original universe audience size estimates, and new universe audience size estimates in accordance with teachings of this disclosure. In the illustrated examples of FIGS. 9A-9E, each of the example graphs 902, 904, 906, 908, 910, 912, 914, 916, 918, 920, 922, 924 include plots of universe audiences for different brands across different platforms and content (e.g., mobile, desktop, text, and video). In the illustrate examples, each subplot of the universe audiences for the different platforms and content include universe audience estimates from production ("prod"), universe audience estimates from previous/original alignment estimates ("orig"), and universe audience estimates from the new alignment methodology ("new") in accordance with the teachings of this disclosure. In the illustrated examples, graphs 902, 904, 906, 908, 910, 912, 914, 916, 918, 920, 922, 924 include percent differences from production data labeled in the "orig" and "new" bars. The example graphs 902, 904, 906, 908, 910, 912, 914, 916, 918, 920, 922, 924 are universe audience estimates results for different brands shown for an aggregation level (e.g., aggregation 8). In each of the example graphs 902, 904, 906, 908, 910, 912, 914, 916, 918, 920, 922, 924, the y-axis shows unique audiences (in scientific notation units), and the x-axis compares production (prod), MUG (orig), and IMUG/enhanced MUG (new). In the illustrated examples, each brand is shown vertically across each of the aggregation breakouts. In the example graphs 902, 904, 906, 908, 910, 912, 914, 916, 918, 920, 922, 924, relative differences compared to production are shown at the top of the MUG and IMUG bars.

Figure 10:
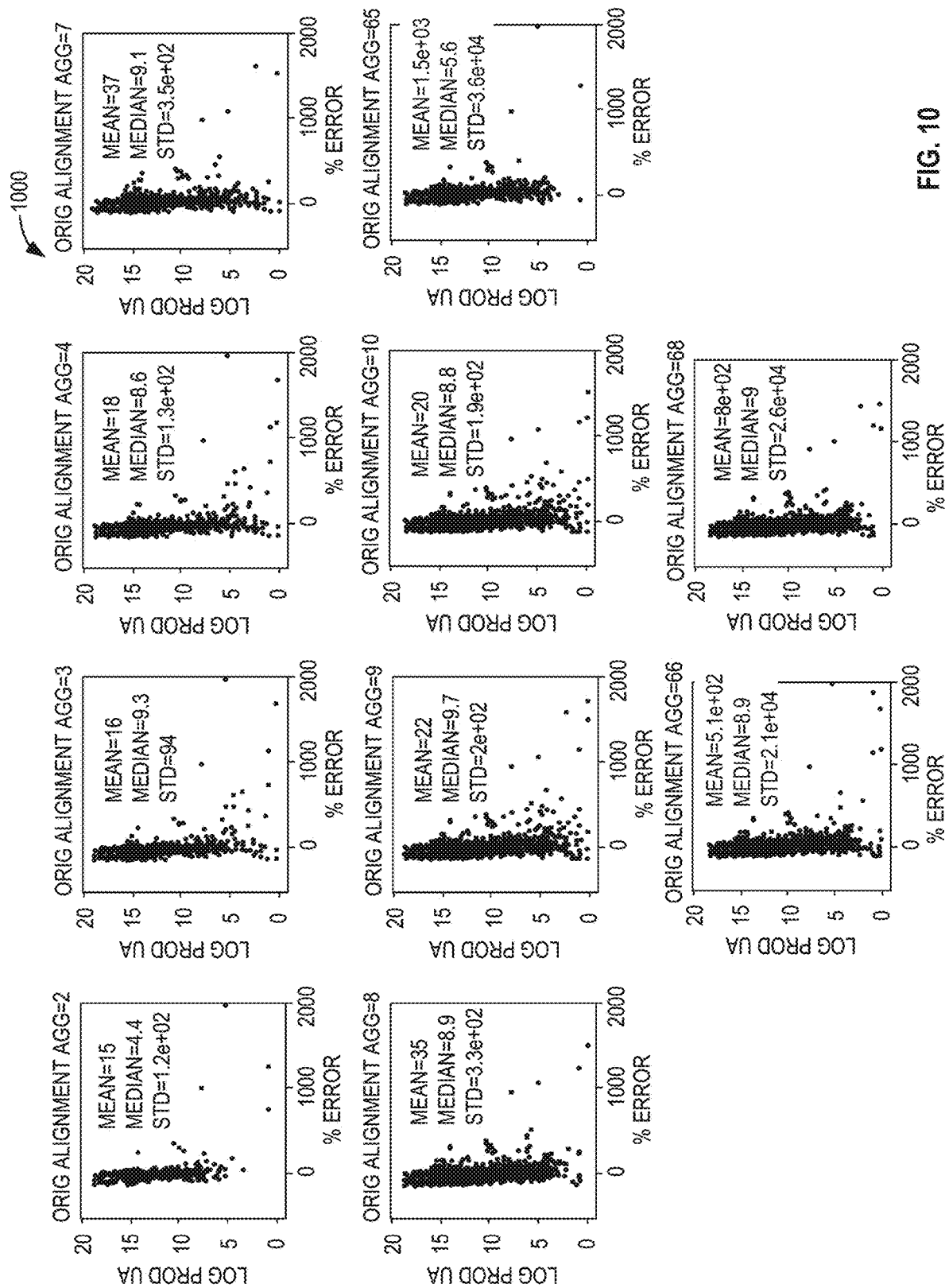
FIG. 10 illustrates example graphs of universe audience size estimates using MUG methodology without intermediate panel data and census data.

FIG. 10 illustrates example graphs 1000 of universe audience size estimates using an original MUG methodology without intermediate panel data and census data. In the illustrated example, the graphs 1000 illustrate the universe audience size estimates (y-axis) and percent error measurements (x-axis) for different aggregation levels. The example graphs 1000 include mean, median, and standard deviation measurements based on the original MUG methodology analysis without intermediate panel data.

Figure 11:
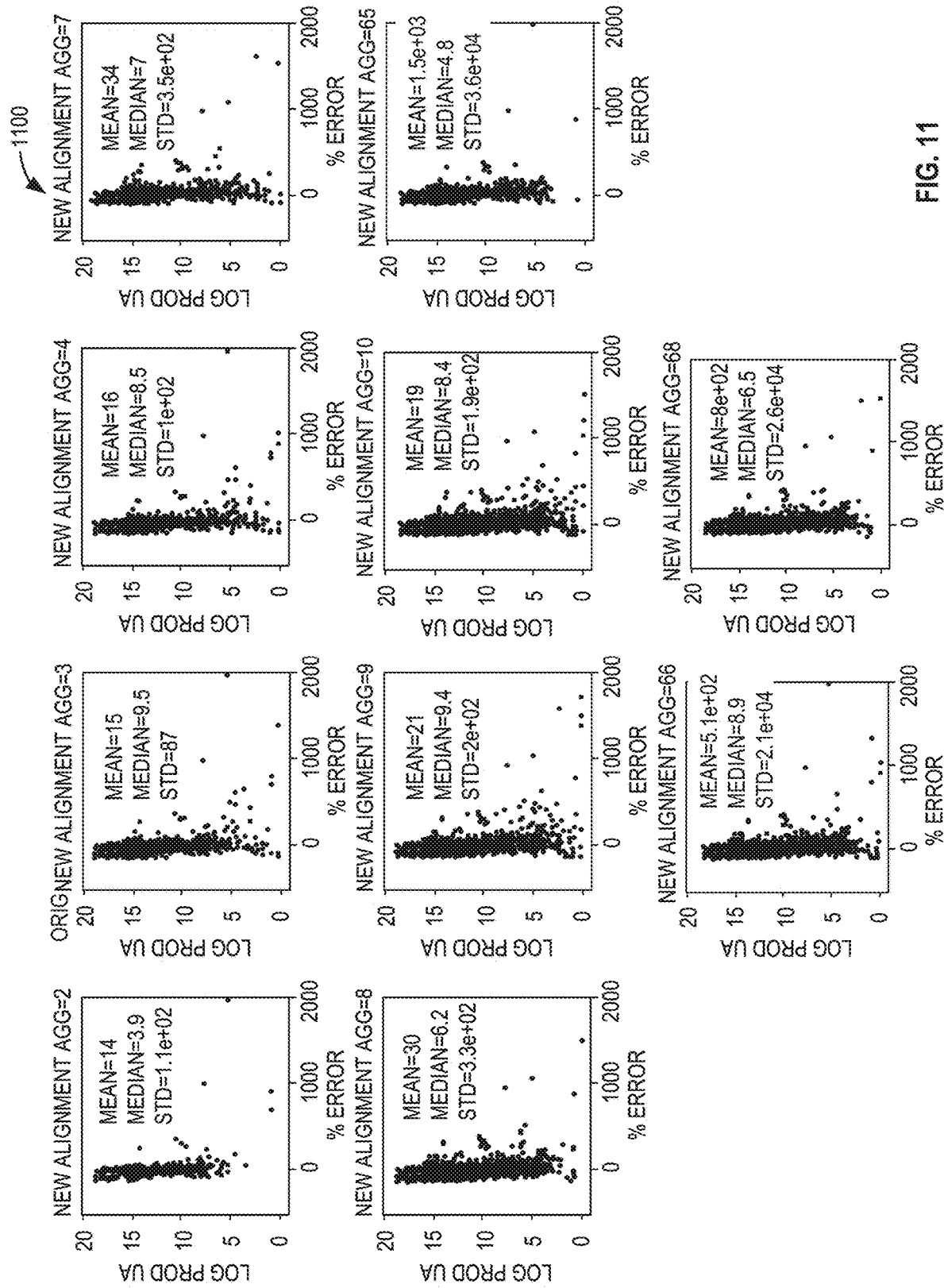
FIG. 11 illustrates example graphs of universe audience size estimates using an example enhanced MUG methodology with panel data and census data in accordance with teachings of this disclosure.

FIG. 11 illustrates example graphs 1100 of universe audience size estimates using the example enhanced MUG methodology with panel data and census data in accordance with teachings of this disclosure. In the illustrated example, the graphs 1100 illustrate the universe audience size estimates (y-axis) and percent error measurements (x-axis) for different aggregation levels. The example graphs 1100 include mean, median, and standard deviation measurements based on the IMUG/enhanced MUG methodology analysis of examples disclosed herein using intermediate panel data and census data. In the illustrated examples, the mean, median, and standard deviation measurements of the enhanced MUG analysis in graphs 1100 are improved from the mean, median, and standard deviation measurements of the original MUG analysis in the example graphs 1000 of FIG. 10.

Figure 12B:
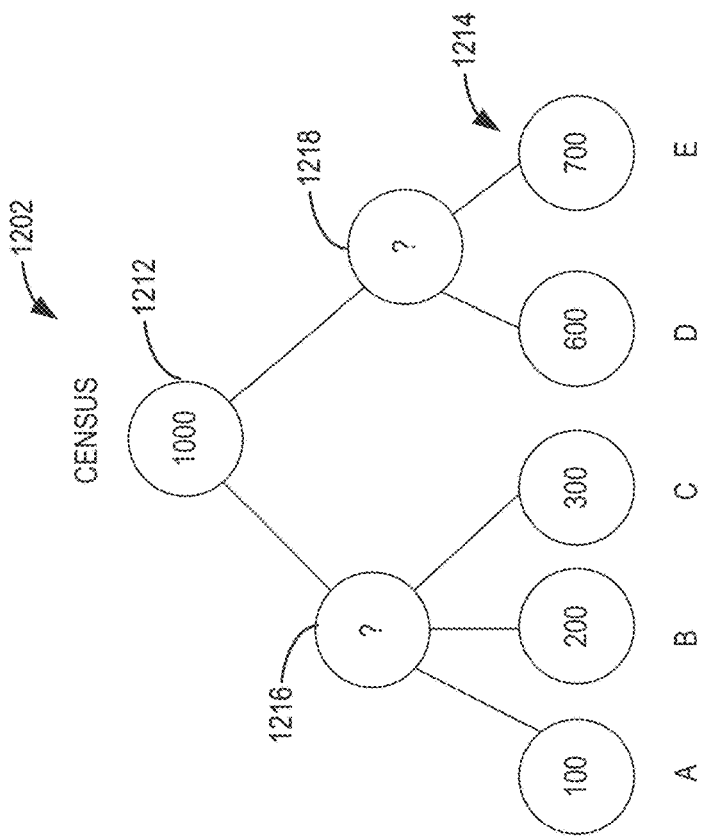
FIG. 12B illustrates an example census hierarchy in accordance with teachings of this disclosure.
Figure 12A:
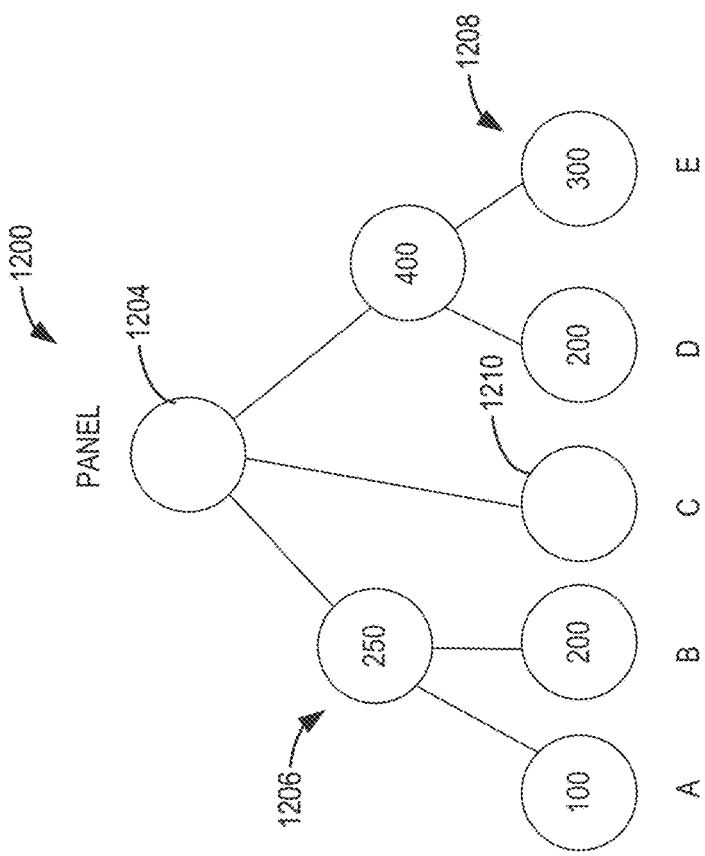
FIG. 12A illustrates an example panel hierarchy in accordance with teachings of this disclosure.

FIGS. 12A and 12B illustrate an example panel hierarchy 1200 and an example census hierarchy 1202 in accordance with teachings of this disclosure. In the illustrated examples, there are two branches that have identical numbers of nodes. However, the panel data of the panel hierarchy 1200 example disclosed herein are missing 1 of the nodes. In examples disclosed herein, the example deduplicated audience size calculator circuitry 204 of the example AME 102 of FIGS. 1-3 enhance the MUG analysis methodology with panel data from the panel hierarchy 1200 to further calibrate the hierarchy. In some examples, when the panel data is not available, the original MUG analysis methodology can still be used as a default. In some examples, the panel can be small, and the panel can encounter cases where it will not observe every combination or observe enough panelists to create robust universe audience estimates for the census intermediate levels. For that reason, the IMUG/enhanced MUG of examples disclosed herein is robust against the assumption that every observation is made. By aligning the panel hierarchy 1200 and the census hierarchy 1202 for what is observed, examples disclosed herein can then use the panel as a signal for calibration without perfect information. In some examples, the AME (e.g., the AME 102 of FIGS. 1 and 2) does not have a cross-platform panel, and examples disclosed herein utilize a platform or platform by content type aggregation at which to calibrate.

In the illustrated example, the panel hierarchy 1200 includes an example top node 1204 that is representative of an unknown total universe audience for the panel data. The example panel hierarchy 1200 includes example intermediate nodes 1206 representative of audience size measurements (e.g., 250 and 400) for the intermediate levels of the panel data. In the illustrated example, the panel hierarchy 1200 also includes example leaf/bottom nodes 1208 representative of audience size measurements for individual media sources (e.g., 100, 200, 200, and 300). In the illustrated example of FIG. 12A, the panel hierarchy 1200 is missing audience size measurements for an example node 1210, which is a leaf of the top node 1204.

In the illustrated example of FIG. 12, the census hierarchy 1202 includes an example top node 1212 that is representative of a known total universe audience for the census data. The example census hierarchy 1202 includes example leaf/bottom nodes 1214 representative of audience size measurements for individual media sources (e.g., 100, 200, 300, 600, and 700). In the illustrated example of FIG. 12B, the census hierarchy 1202 also includes intermediate nodes 1216 and 1218 that are unknown audience size measurements that examples disclosed herein estimate using the panel hierarchy 1200. In examples disclosed herein, the example deduplicated audience size calculator circuitry 204 estimates the deduplicated audience sizes of the intermediate nodes 1216 and 1218 using the panel hierarchy 1200 in accordance with the following discussion.

The following discussion is provided for the interested reader regarding the development of examples disclosed herein. However, examples disclosed herein are not limited to this manner of development, and use of examples disclosed herein is not dependent on any particular manner of development of such disclosed examples.

Within the panel structure all leaves are one of two types: The leaf node is either a child of (1) an intermediate union, or (2) the total unknown audience. In some examples, the nodes are labelled by some sequential index which remains consistent throughout. One such labelling is left-to-right in increasing height. In that labelling all leaf nodes will be the first m of the sequence $\{1, \ldots, s\}$ for some s, the number of leaf nodes.

In some examples, node k is an arbitrary intermediate level union with audience $A_k$. In some examples, a pseudo-universe estimate $Q_k$ exists which corresponds to that union with node k being the parent. In some examples, the example Equation 1 described above in connection with FIG. 3 illustrates a solution for the expression for $Q_k$ where the product on the right is across all children of node k. The solution to $Q_k$ for each intermediate union can be solved by fixed-point iteration or other techniques. Once $Q_k$ is solved, the sufficient statistic for that union, $z_k$, can be solved using the example Equation 2 described above in connection with FIG. 3, which remains invariant when solving the census estimates later.

The expression $Q_{Par(k)}$ is the pseudo-universe estimate of the next higher union, the corresponding Q value of the parent of node k. In some examples, the panel hierarchy/structure includes nodes that go up to a node of 100% constraint as the total audience itself is unknown. Therefore, if audiences are expressed in proportions of population, $Q_{Par(k)}=1$ for all intermediate nodes k. In some examples, if using raw counts instead of equaling 1, it is the raw value of actual universe estimate.

Once the sufficient statistics, $z_k$, are solved for the panel data, the sufficient statistics become invariant quantities for the same formulas within the census data using the same graph structure/hierarchy as the panel data. For example, in FIGS. 12A and 12B, the first three nodes of the census hierarchy 1202 are connected but the structure of the panel hierarchy 1200 has only the first two nodes are connected. In examples disclosed herein, the structure used in the panel hierarchy is being solved for to later solve for the different union and structure in a consistent manner to produce the census graph structure which is shown in the census hierarchy 1202. Example Equation 5 below is the equivalent formula for the sufficient statistics in the census data.

$$z_k = \frac{Q_k - X_k}{Q_{Par(k)} - X_k} \qquad \text{(Equation 5)}$$

In Equation 5 above, the left hand side for $z_k$ is the known value solved earlier and $X_k$ is the unknown intermediate audience value. In Equation 5 above, the Q variables are also being used, however they are different values than those solved in the panel data. The example Equation 6 below is the formula for the unknown intermediate audience values are still the same but now with census X audiences.

$$1 - \frac{X_k}{Q_k} = \prod_{i \in Ch(k)} \left(1 - \frac{X_i}{Q_i}\right) \qquad \text{(Equation 6)}$$

If there are m intermediate unions, they can be indexed by $j=\{1, \ldots, m\}$ with letting $\sigma(j)$ represent the node index for the parent of the j intermediate union. The example Equation 3 described above in connection with FIG. 3 is representative of the system of equations to solve the unknowns for each node of the intermediate unions of the census.

In some examples, there is a total of 2m+1 equations to be solved for 2m+1 unknowns, and there are m pairs of unknowns $\{Q_k, X_k\}$ for each node of the intermediate unions and there would be another pair for $\{Q_m, X_m\}$ but example disclosed herein assume $X_m$ is known, yielding a total of 2m+1 unknowns. In some examples, there can be some reduction to m+1 unknowns as the equation for $z_{\sigma(j)}$ can be solved for either $X_{\sigma(j)}$ (or $Q_{\sigma(j)}$) and substituted into the next set of equations, so only k+1 remain.

In fact, all 2m+1 can be solved using just one degree of freedom as an unknown, namely $Q_m$. For small system of structures, the overall system of equations, be it 2m+1 or m+1 equations, can be solved simultaneously. For larger systems it may be advantageous to use the following approach which can be parallelized. In either case, the inequality bounds for the variables should be used to maintain logical consistency.

It should also be noted that the children of the top node need not necessarily all be the intermediate level, there may be a mixture between intermediate and lowest level; whereas the children for the intermediate level are always the lowest leaf level. In some examples, this may not be true for multiple intermediate levels, but for a single intermediate level it is true.

First, some logical bounds can be deduced to help in solve the system. For node k, examples disclosed herein define the superscript plus and minus to be the theoretical maximum and minimum values possible for that node. For example, $X_k^- \leq X_k \leq X_k^+$. The example Equation 7 below is used to solve for the minimum and maximum values possible for each node. If $X_k$ is a known value, such as a leaf node in the census, then the inequalities all become equalities. If $X_k$ is unknown and node k is a parent of a union, the upper and lower bounds depend on both its children and parent. As there is only one intermediate level node, the parents for all of the nodes are the same—the top root node.

$$X_k^- = \max_{i \in Ch(k)} X_i \qquad \text{(Equation 7)}$$
$$X_k^+ = \min\left(X_\bullet, \sum_{i \in Ch(k)} X_i\right)$$

In the example Equation 7 above, the lower bound is by the reasoning that the union of collection of sets can never be less than the largest set, and the upper bound is that it can never be larger than the sum of the sets and in addition cannot exceed the known total audience. The example Equation 7 is analogous to the sum of probabilities corresponding to different unions of sets within the same Venn diagram cannot exceed 100%.

The superscript notation can also be applied to Q. For $Q_m$, the bounds can be determined directly by the definition of Q. In the example Equation 8 below, notice the switched superscripts between Q and X. The lower bound for Q uses the upper bound of X's and vice versa.

$$1 - \frac{X_\bullet}{Q_\bullet^\pm} = \prod_{i \in Ch(k)} \left(1 - \frac{X_i^\mp}{Q_i^\pm}\right) \qquad \text{(Equation 8)}$$

In the example Equation 8 above, while $Q_m^- \geq X_m$, the bounds by the solving the equation make it even tighter. If $\Sigma_{i \in Ch(k)} X_i^- = X_m$ then $Q_m^+ = \infty$. However, in most practical cases, there is the finite bounded inequality $Q_m^- \leq Q_m \leq Q_m^+$.

For $Q_{\sigma(j)}$ for intermediate node j there are actually two equations which can be used to bound it. In examples disclosed herein, let $Q_m$ be a valid test value within its respective logical range. The example Equation 9 below solves for $Q_{\sigma(j)}$ using the example Equation 3 described above.

$$Q_{\sigma(j)} = (1 - z_{\sigma(j)}) X_{\sigma(j)} + Q_m z_{\sigma(j)} \qquad \text{(Equation 9)}$$

In some examples, the upper and lower bound for $Q_{\sigma(j)}$ depends on the relation to $z_{\sigma(j)}$ with respect to the value one, as shown in the example Equation 10 below. In the example Equation 9 below, the superscript for plus or minus is switched within the right hand side.

$$Q_{\sigma(j)}^\pm = \begin{cases} (1 - z_{\sigma(j)}) X_{\sigma(j)}^\pm + Q_\bullet z_{\sigma(j)} & \text{if } z_{\sigma(j)} < 1 \\ Q_\bullet & \text{if } z_{\sigma(j)} = 1 \\ (1 - z_{\sigma(j)}) X_{\sigma(j)}^\mp + Q_\bullet z_{\sigma(j)} & \text{if } z_{\sigma(j)} > 1 \end{cases} \qquad \text{(Equation 10)}$$

After solving the example Equation 10 above, the bounds for $Q_{\sigma(j)}$ are known. In the example Equation 11 below, the pair of unknown values $\{Q_{\sigma(j)}, X_{\sigma(j)}\}$ are now the unique solution to the following pair of equations within that interval of $Q_{\sigma(j)}$.

$$z_{\sigma(j)} = \frac{Q_{\sigma(j)} - X_{\sigma(j)}}{Q_\blacksquare - X_{\sigma(j)}} \quad \text{(Equation 11)}$$

$$1 - \frac{X_{\sigma(j)}}{Q_{\sigma(j)}} = \prod_{i \in Ch(\sigma(j))}\left(1 - \frac{X_i}{Q_{\sigma(j)}}\right)$$

In some examples, the system can be rewritten in terms of one single equation by substitution and bounded root finding algorithms can be used, such as regula falsi or other technique of choice. For the regula falsi method, suppose on the $k^{th}$ iteration the bracketing interval of the function $f(x)$ is contained within $(a_k, b_k)$. In such examples, choose $c_k$ such that the line joining $(a_k, f(a_k))$ and $(b_k, f(b_k))$ crosses the x-intercept, which can be solved using the example Equation 12 below.

$$c_k = \frac{a_k f(b_k) - b_k f(a_k)}{f(b_k) - f(a_k)} \quad \text{(Equation 12)}$$

If $f(a_k)$ and $f(c_k)$ have the same sign, set $a_{k+1} = c_k$ and $b_{k+1} = b_k$, otherwise set $a_{k+1} = a_k$ and $b_{k+1} = c_k$. This process is repeated until the root is approximated sufficiently well. That is, we can use the example Equation 11 above to solve for $X_{\sigma(j)}$ and rephrase the example Equation 9 above to be a root equation by subtracting $Q_{\sigma(j)}$ on both sides, as shown in the example Equation 4 described above in connection with FIG. 3.

In some examples, when $f(Q)=0$ then $\{Q_{\sigma(j)}, X_{\sigma(j)}\} = \{\hat{Q}, \hat{X}\}$ is the solution to pair of unknowns for that index j. Once all $X_{\sigma(j)}$ are known, examples disclosed herein can check if $\widehat{X_\blacksquare}$ and the example Equation 3 above matches the known value.

Examples disclosed herein include an algorithm to solve all 2m+1 equations using one degree of freedom: For test value within $Q_m^- \leq Q_m \leq Q_m^+$, examples disclosed herein determine deduplicated audience sizes for the intermediate unions in the census hierarchy using the following steps.
1. For a given test value of $Q_m$ within $Q_m^- \leq Q_m \leq Q_m^+$
2. For each intermediate union index $j=\{1, \ldots, m\}$, which can be done in parallel
   a) Determine $Q_{\sigma(j)}^{-Q} \leq Q_{\sigma(j)} \leq Q_{\sigma(j)}^+$
   b) Solve for unique solution for $\{Q_{\sigma(j)}, X_{\sigma(j)}\}$
3. Knowing $\{Q_{\sigma(j)}, X_{\sigma(j)}\}$, compute $\widehat{X_\blacksquare}$
4. If $\widehat{X_\blacksquare} = X_m$ then done, otherwise update $Q_m$ accordingly.

The algorithm for finding $Q_m$ such as the when $\widehat{X_\blacksquare} - X_m = 0$ can be any root finding algorithm in a bounded interval. Bisection or regula falsi can be used as two possible choices. In examples disclosed herein, once all values have been solved for the census for the structure of the panel, different partial unions can be computed to estimate the audience for other structures which may be important to the client.

An example of estimating the deduplicated audience sizes of the intermediate nodes of the census data in accordance with examples disclosed herein is described below in connection with the structure and known values from a panel illustrated in FIGS. 12A and 12B. The nodes are labelled $k=\{1, \ldots, 8\}$ going left-to-right and bottom-up. For example, $A_1=100$ and $A_7=400$. In the illustrated example of FIG. 12A, there are two unions in the intermediate level with parent nodes $k=\{6,7\}$ (e.g., intermediate nodes 1206). This would be that $\sigma(\{1,2\})=\{6,7\}$. Not shown in the illustration of FIGS. 12A and 12B but used for the example is a universe estimate of 10,000 total people. This is not the total audience, the top root node, but the larger set where all the audience is a member of.

The first step is to solve for $Q_k$ for each intermediate union, $j=\{1,2\}$ using the example Equation 13 below.

$$j = 1: 1 - \frac{250}{Q_6} = \left(1 - \frac{100}{Q_6}\right)\left(1 - \frac{200}{Q_6}\right) \Rightarrow Q_6 = 400 \quad \text{(Equation 13)}$$

$$j = 2: 1 - \frac{400}{Q_7} = \left(1 - \frac{200}{Q_7}\right)\left(1 - \frac{300}{Q_7}\right) \Rightarrow Q_7 = 600$$

Therefore, the sufficient statistics are determined in example Equation 14 below.

$$j = 1: z_6 = \frac{400 - 250}{10,000 - 250} = \frac{1}{65} \quad \text{(Equation 14)}$$

$$j = 2: z_7 = \frac{600 - 400}{10,000 - 400} = \frac{1}{48}$$

In the example Equation 14 above, the two numbers are the only quantities that need to be saved in memory to replicate the correlated structure of the intermediate unions present in the panel hierarchy 1200 (FIG. 12A).

Figure 13B:
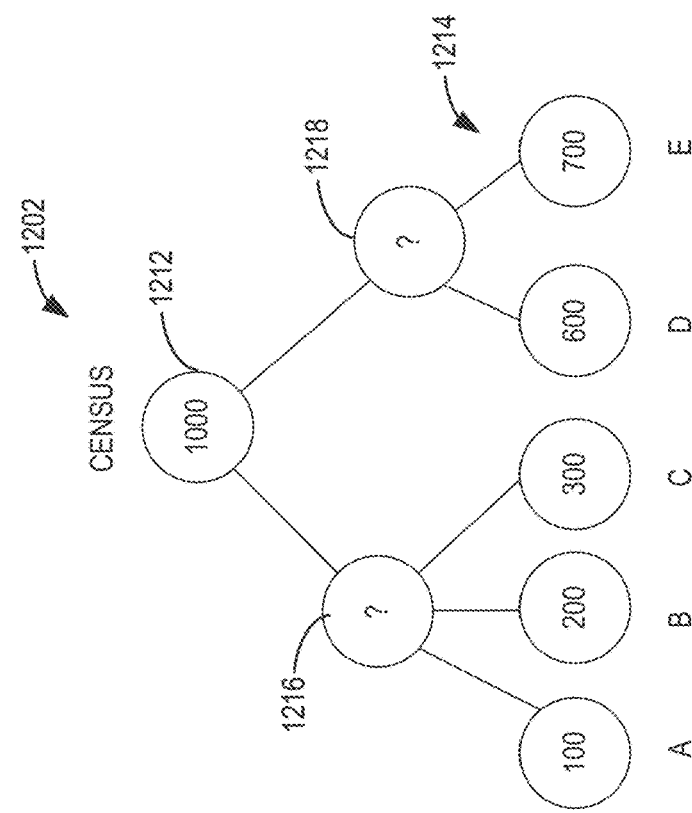
FIG. 13B illustrates the example census hierarchy of FIG. 12B including example sufficient statistics.
Figure 13A:
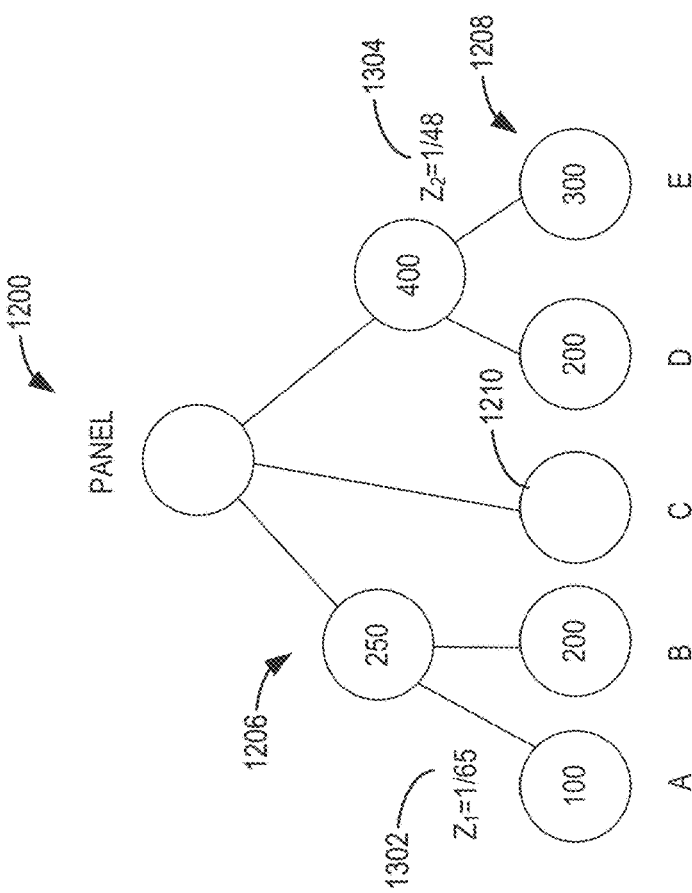
FIG. 13A illustrates the example panel hierarchy of FIG. 12A including example sufficient statistics.

FIGS. 13A and 13B illustrate the example panel hierarchy 1200 and the example census hierarchy 1202 of FIGS. 12A and 12B including example sufficient statistics 1302 and 1304, as determined in example Equation 14 above.

As the intermediate level nodes are unknown, examples disclosed herein can use the example Equation 7 above to determine the bounds, as shown in the example Equation 15 below.

$$200 \leq X_6 \leq 300 \quad \text{(Equation 15)}$$

$$700 \leq X_7 \leq 1,000$$

In the example Equation 15 above, while the upper bound for $X_6$ is the sum of the children that is not true for $X_7$, as the sum exceeds the known total audience of 1,000 and so that node, which is lower, cannot have more than 1,000 individuals.

Knowing bounds of the children of $X_m=1,000$ bounds on $Q_m$ can be determined using the example Equation 8 above, yielding $1,000 \leq Q_m \leq 1941.86$. Examples disclosed herein are now certain that the actual correct value is within that range. The example Table 1 below is a sample output of regula falsi with the test function to find the root for estimating $Q_m$ with $f(Q) = \widehat{X_\blacksquare} - X_m$ with $X_m=1,000$ as known and given.

TABLE 1

| Iteration | a | b | c | f(c) |
| --- | --- | --- | --- | --- |
| 1 | 1000 | 1941.86 | 1658.43 | 19.83 |
| 2 | 1000 | 1658.43 | 1582.25 | 5.63 |
| 3 | 1000 | 1582.25 | 1561.40 | 1.56 |
| . | . | . | . | . |
| . | . | . | . | . |
| . | . | . | . | . |
| ∞ | 1553.47 | 1553.47 | 1553.47 | 0 |

The root-finding need not go to infinity but to finite number of iterations such that the error between successive estimates is small enough. In the illustrated example, $Q_m=1553.47$ which also yields as output the correct value of the other variables as showing in Equation 16 below.

$Q_m=1553.47$ $Q_6=235.756$ $Q_7=773.84$ $X_6=215.166$ $X_7=757.252$ (Equation 16)

Figures 14A, 14B:
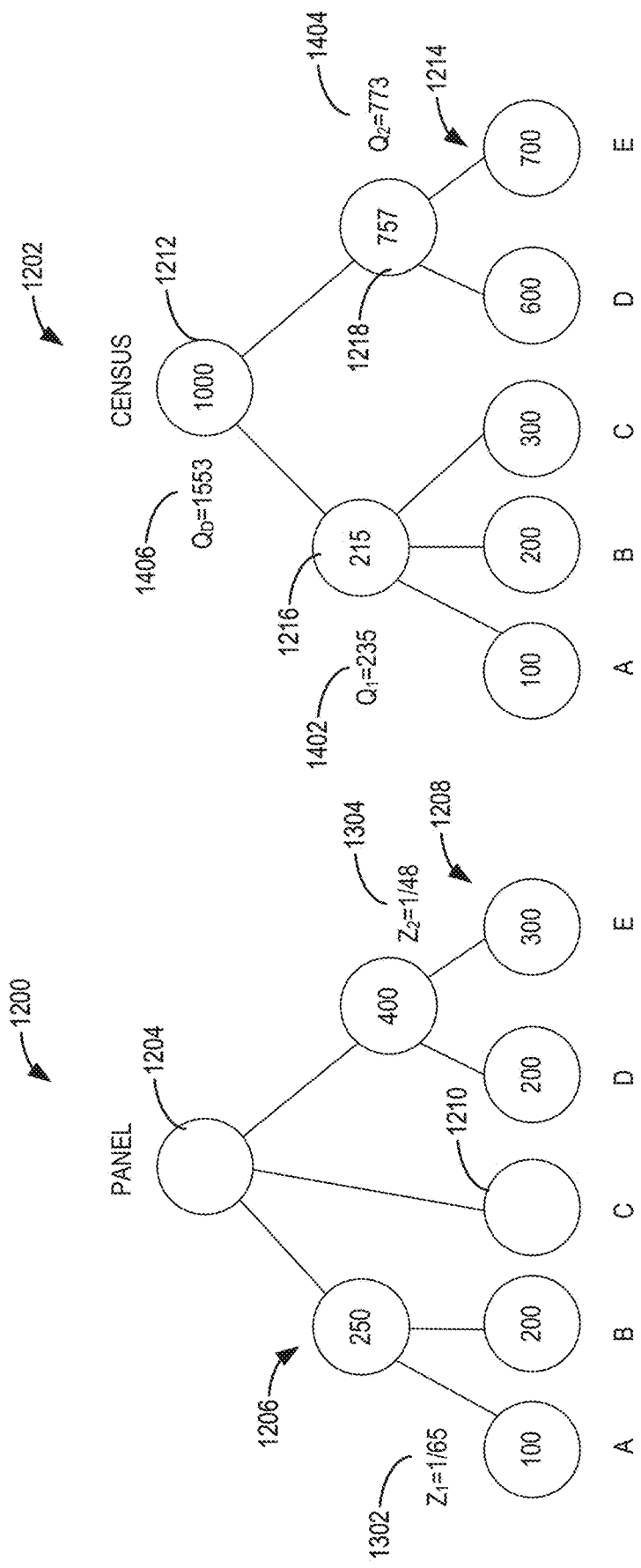
FIG. 14A illustrates the example panel hierarchy of FIGS. 12A and 13A including example test values for universe audiences corresponding to the intermediate unions.
FIG. 14B illustrates the example census hierarchy of FIGS. 12B and 13B including example test values for universe audiences corresponding to the intermediate unions.

FIGS. 14A and 14B illustrate the example panel hierarchy 1200 and the example census hierarchy 1202 of FIGS. 12A-13B including example test values 1402, 1404, and 1406 for universe audiences corresponding to the intermediate unions, as shown in the example Equation 16 above. In the illustrated example of FIGS. 14A and 14B, the panel hierarchy 1200 and the census hierarchy 1202 are arranged in the same structure to determine the test values 1402, 1404, and 1406 for the deduplicated audience size estimates of the intermediate nodes 1216 and 1218 in the census hierarchy 1202.

The audience values of the intermediate nodes (e.g., the intermediate nodes 1216 and 1218) of 215 and 757 can be returned to the client as estimates for the respective deduplicated audiences. To see how those values are calculated for a test value of Q, each intermediate node itself is another root-finding mechanism. As the solution for each intermediate node is independent of the others these steps can be done in parallel for large structures.

Take for instance $\widehat{Q_*}=1658.43$ as a test value, which is the output of the first iteration from Table 1 as the value of c. Examples disclosed herein reproduce the quantity $f(c)=19.83$. For illustration only, node 6 is shown in detail, with node 7 computed similarly.

Using the example Equation 10 above, with $$z6 = \frac{1}{65}$$

and $\widehat{Q_*}=1658.43$, along with the bounds for $X_6$ determined in example Equation 14 above, the bounds for node 6 are shown in example Equation 17 below.

$222.437 \leq \widehat{Q_6} \leq 320.899$ (Equation 17)

The example Equation 11 above can then be used as the root-finding mechanism to find which $\widehat{Q_6}$ is the correct value in that interval. The example Table 2 below illustrated a regula falsi summary table for estimating $Q_6$ with $f(Q)=\widehat{Q_6}-Q_6$, as seen in the example Equation 11 above.

TABLE 2

| Iteration | a | b | c | f(c) |
|---|---|---|---|---|
| 1 | 222.437 | 320.89 | 236.15 | 1.36 |
| 2 | 236.153 | 320.89 | 237.99 | 0.17 |
| 3 | 237.988 | 320.89 | 238.21 | 0.02 |
| . | . | . | . | . |
| . | . | . | . | . |
| . | . | . | . | . |
| ∞ | 238.24 | 238.24 | 238.24 | 0 |

As shown in Table 2 above, the pair of estimates $\{Q_6, X_6\}=\{238.24, 216.05\}$. A similar procedure for node 7 yields bounds of $719.967 \leq \widehat{Q_7} \leq 1013.72$ and solution $\{Q_7, X_7\}=\{780.689, 762.014\}$. Examples disclosed herein test to see if those results, with $\widehat{Q_*}=1658.43$ is the correct overall solution. If it is the estimated total audience $\widehat{X_*}$ should exactly equal the known value as a constraint. The overall audience estimate can be computed using example Equation 18 below.

$$\widehat{X_*} = \widehat{Q_*}\left(1 - \left(1 - \frac{\widehat{X_6}}{\widehat{Q_*}}\right)\left(1 - \frac{X_3}{\widehat{Q_*}}\right)\left(1 - \frac{\widehat{X_7}}{\widehat{Q_*}}\right)\right) = 1019.83$$ (Equation 18)

As seen in example Equation 18 above, the overall audience estimate exceeds the true $X_m=1,000$ by 19.83, which matches the first row of Table 1 above as the output of $f(c)$. The regular falsi algorithm then updates the bounds where the true root may belong, and a new point estimate is computed. Examples disclosed herein repeats this process until the true solution is found. The results, as given in the example Equation 15 above are shown also below in example Equation 19 for reference.

$Q_m=1553.47$ $Q_6=235.756$ $Q_7=773.84$ $X_6=215.166$ $X_7=757.252$ (Equation 19)

Once the values are solved, different unions can be made (e.g., partial unions), such as below which has a different union (e.g., partial union) from the original structure—namely the first intermediate union is of the first three leaf nodes and not the original two.

The unknown intermediate node in this example of FIG. 12B is the union between the original intermediate node (containing nodes 1 and 2) and the node of union 3. The example Equation 20 below illustrated solving for the unknown intermediate node (e.g., an intermediate node of a partial union) case with subscripts being which nodes are being used.

$$1 - \frac{X_{(123)}}{Q_*} = \left(1 - \frac{X_{(12)}}{Q_*}\right)\left(1 - \frac{X_{(3)}}{Q_*}\right)$$ (Equation 20)

The example Equation 20 above yields $\widehat{X}_{(123)}=490.228$ as the deduplicated audience size for the unknown intermediate node of the partial union. FIGS. 15A and 15B illustrate the example panel hierarchy 1200 and the example census hierarchy 1202 of FIGS. 12A-14B including example estimated, deduplicated audience size values corresponding to the intermediate unions in accordance with the teachings of this disclosure and an estimated audience size value for an example partial union 1502. Using the example Equation 20 above, the example deduplicated audience size calculator circuitry 204 (e.g., the partial union calculator circuitry 312 of FIG. 3) deduplicates the audience sizes of the intermediate node 1216 and the code C of the leaf nodes 1214 using the example Equation 20, which results in 473 for the audience size of the partial union 1502.

FIGS. 16A and 16B illustrate an example table 1600 and an example table 1614 including platform data, panel data, and census data to implement the enhanced MUG methodology in accordance with the teachings of this disclosure. The example table 1600 of FIG. 16A include example tables 1602 for the nodes of the hierarchies, example platform data 1604, example panel marginal (node) data 1606, example panel sub-union (intermediate) data 1608, example census marginal (node) data 1610, and example census total union (total universe audience) data 1612. The example table 1600 includes the data used to implement the IMUG/enhanced MUG analysis of examples disclosed herein using simply group-by-apply-aggregate in tabular data. The example table 1614 of FIG. 16B includes example sufficient statistics data 1616 determined for the different nodes of the example tables 1602. The example table 1614 also includes example flags data 1618 that indicate whether the row (e.g., node) has panel data or not. In some examples, the census union calculator circuitry 310 of FIG. 3 groups the audience sizes data by the platform data 1604 and applies the IMUG/enhanced MUG methodology to solve for the z variables (e.g., the sufficient statistics data 1616) using the example Equation 3 above. For example, the census union calculator circuitry 310 groups nodes A and B based on the platform data 1604 of "Text" and determine the sufficient statistics data 1616 as ⅟₆₅ for both nodes A and B. In the example table 1614, node C does not include sufficient statistics data 1616 because the flags data 1618 indicated the node C does not include panel data to use in estimating the sufficient statistics data 1616.

FIGS. 17A-17C illustrate example tables 1700, 1702, and 1706 including the data from the example tables 1602 and 1614 of FIGS. 16A and 16B and aggregated data in accordance with the teachings of this disclosure. In the illustrated example of FIG. 17A, the example table 1700 illustrates how the example census union calculator circuitry 310 aggregates the data by the example flags data 1618 and the example platform data 1604 so the nodes (e.g., the census marginal data 1610) are collected into a list. For example, nodes A and B are grouped together in the example table 1700 because they include the same platform data 1604 (e.g., "Text") and are both flagged as 1 in the flags data 1618 (e.g., indicating both nodes A and B include panel data), which groups the census marginal data 1610 for both nodes into a list (e.g., [100, 200]). In the illustrated example of FIG. 17B, the example table 1702 illustrates how the example census union calculator circuitry 310 groups the flags data 1618 to make the nodes (e.g., the census marginal data 1610) with corresponding panel data (e.g., flagged as 1) and without living at different columns in the table 1702. In the example table 1702, missing values are filled as "[0]." In the illustrated example of FIG. 17C, the example table 1706 illustrates how the example census union calculator circuitry 310 groups the data by the union level (e.g., level 1, top level, etc.) in the hierarchy structure and applies the example Equation 3 to the solve for example audience size estimates/test values 1708, 1710, and 1712 associated with the census data.

FIGS. 18A-18C illustrate example tables 1800, 1802, and 1806 including the data from the example tables 1602, 1614, 1700, 1702, and 1706 of FIGS. 16A-17C and estimated universe audience size data in accordance with the teachings of this disclosure. In the illustrated example of FIG. 18A, the example table 1800 illustrates how the example census union calculator circuitry 310 can join the solved audience size estimates/test values 1710 and 1712 with the original lowest level table 1614 of FIG. 16B for the roll-up process. In some examples, to compute text and video specific sub-unions, the example census union calculator circuitry 310 performs a 2-step roll up as seen in the example table 1802 of FIG. 18B and the example table 1806 of FIG. 18C. The example table 1802 of FIG. 18B illustrates the example census union calculator circuitry 310 aggregating the data only with the flags data 1618 that are set to "1." In the example table 1802, the example census union calculator circuitry 310 appends the subset of a row where the flags data 1618 is set to "0" to the end of the table 1802. The example table 1802 includes example census sub-union calculations 1804 based on the example Equation 3 above. The example table 1806 of FIG. 18C illustrates how the example census union calculator circuitry 310 is aggregated by the platform data 1604 to determine the deduplicated audience size values for text and video specific sub-unions in the census data.

While an example manner of implementing the example audience metrics generator circuitry 112 of FIG. 1 and the example deduplicated audience size calculator circuitry 204 of FIG. 2 are illustrated in FIGS. 2 and 3, one or more of the elements, processes, and/or devices illustrated in FIGS. 2 and 3 may be combined, divided, re-arranged, omitted, eliminated, and/or implemented in any other way. Further, the example data interface 300, the example panel union calculator circuitry 308, the example census union calculator circuitry 310, the example partial union calculator circuitry 312, and the example communications interface 314, and/or, more generally, the example audience metrics generator circuitry 112 of FIG. 1 and the example deduplicated audience size calculator circuitry 204 of FIG. 2, may be implemented by hardware alone or by hardware in combination with software and/or firmware. Thus, for example, any of the example data interface 300, the example panel union calculator circuitry 308, the example census union calculator circuitry 310, the example partial union calculator circuitry 312, and the example communications interface 314, and/or, more generally, the example audience metrics generator circuitry 112 and the example deduplicated audience size calculator circuitry 204, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience metrics generator circuitry 112 of FIG. 1 and the example deduplicated audience size calculator circuitry 204 of FIG. 2 may include one or more elements, processes, and/or devices in addition to, or instead of, those illustrated in FIGS. 2 and 3, and/or may include more than one of any or all of the illustrated elements, processes and devices.

Figure 19:
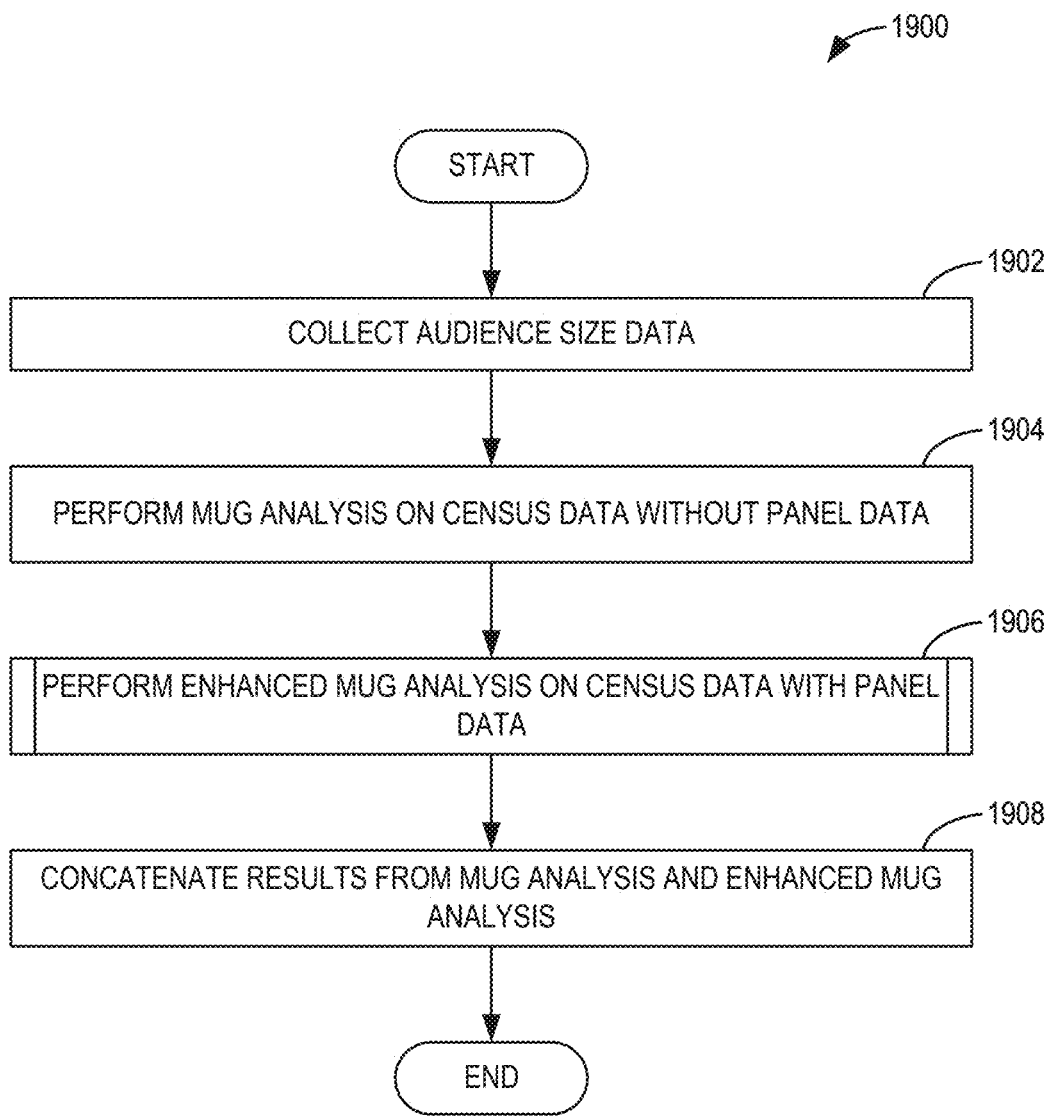
FIG. 19 is a flowchart representative of example machine readable instructions and/or example operations that may be executed by example processor circuitry to implement the audience metrics generator circuitry of FIGS. 1 and 2 to determine census-level audience sizes.
Figure 20A:
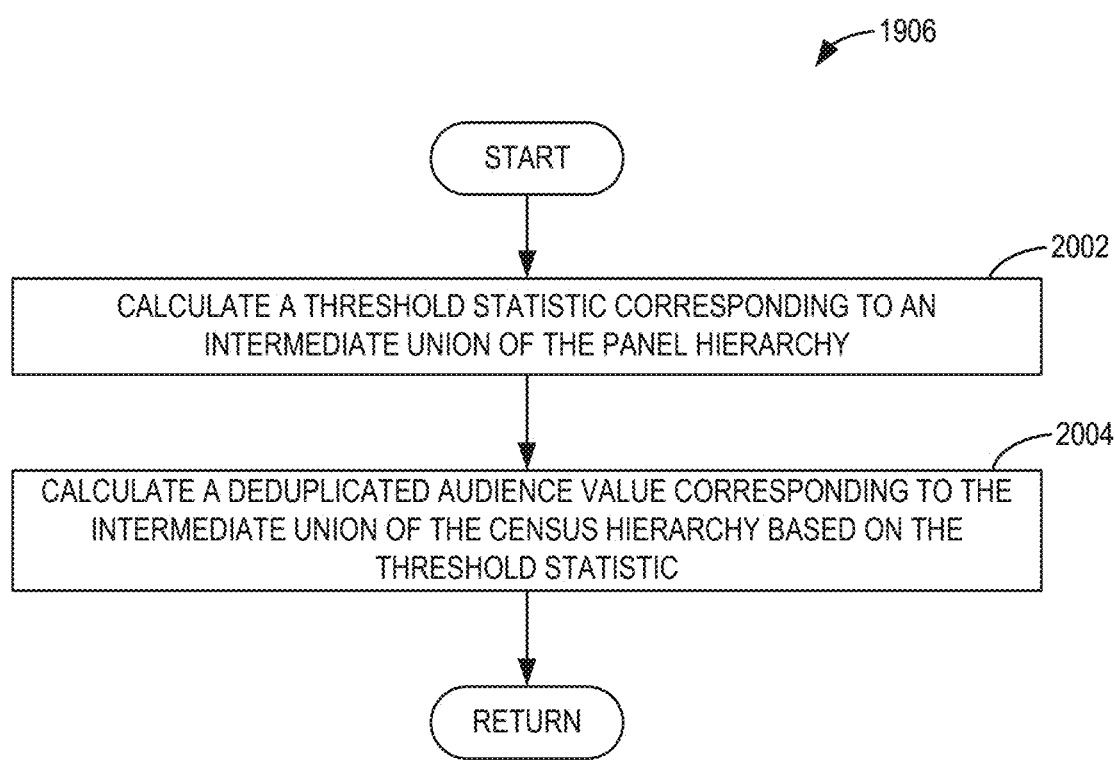
FIG. 20A is a flowchart representative of example machine readable instructions and/or example operations that may be executed by example processor circuitry to implement the deduplicated audience size calculator circuitry of FIGS. 2 and 3 to estimate deduplicated census audience sizes based on panel-level data and census-level data.
Figure 20B:
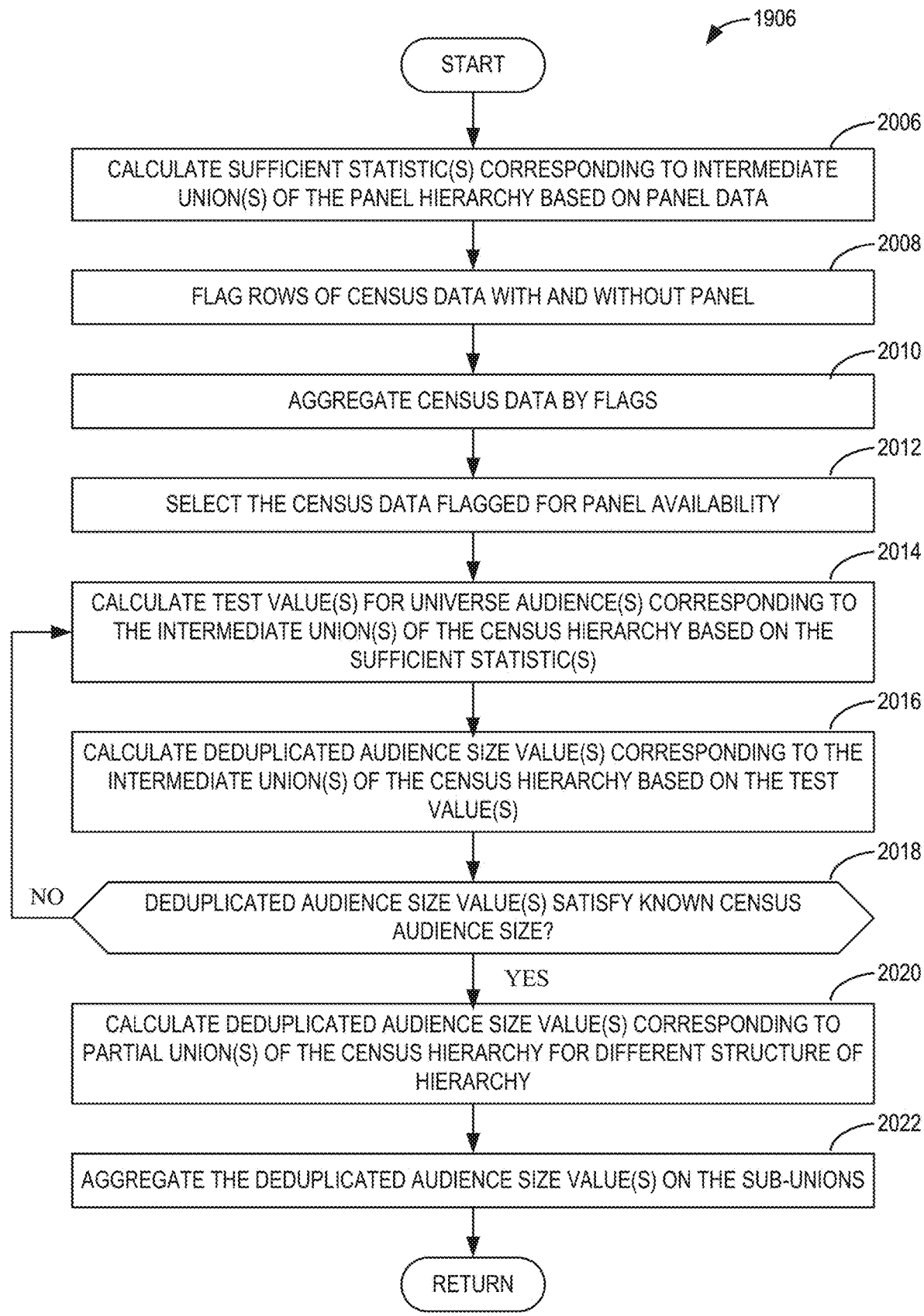
FIG. 20B is a flowchart representative of other example machine readable instructions and/or example operations that may be executed by example processor circuitry to implement the deduplicated audience size calculator circuitry of FIGS. 2 and 3 to estimate deduplicated census audience sizes based on panel-level data and census-level data.

Flowcharts representative of example hardware logic circuitry, machine readable instructions, hardware implemented state machines, and/or any combination thereof for implementing the audience metrics generator circuitry 112 of FIGS. 1 and 2 and the example deduplicated audience size calculator circuitry 204 of FIGS. 2 and 3 are shown in FIGS. 19, 20A, and 20B. The machine readable instructions may be one or more executable programs or portion(s) of an executable program for execution by processor circuitry, such as the processor circuitry 2112 shown in the example processor platform 2100 discussed below in connection with FIG. 21 and/or the example processor circuitry discussed below in connection with FIGS. 22 and/or 23. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 19, 20A, and 20B, many other methods of implementing the example audience metrics generator circuitry 112 of FIGS. 1 and 2 and the example deduplicated audience size calculator circuitry 204 of FIGS. 2 and 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 19, 20A, and 20B may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 19 is a flowchart representative of example machine readable instructions and/or example operations 1900 that may be executed and/or instantiated by processor circuitry to implement the audience metrics generator circuitry 112 of FIGS. 1 and 2 to determine census-level audience sizes. The machine readable instructions and/or the operations 1900 of FIG. 19 begin at block 1902, at which the example audience metrics generator circuitry 112 collects audience size data. In some examples, the example audience metrics generator circuitry 112 utilizes the database proprietor subscriber impression counts data 132 and the database proprietor subscriber audience sizes data 134 of FIGS. 1 and 2 as inputs to estimate census-level impression counts data 136 and census-level audience sizes data.

At block 1904, the example audience metrics generator circuitry 112 performs MUG analysis on the census data without panel data. In some examples, the audience metrics generator circuitry 112 performs MUG analysis on the census-level audience sizes data for the census data without associated panel data. In some examples, the audience metrics generator circuitry 112 determines deduplicated census audience size using the MUG approach with information included in the lowest level and the highest level of a DCR brand hierarchy to infer overlaps between audiences and thereby estimate a unique audience. In some examples, the audience metrics generator circuitry 112 implements the maximum entropy approach to infer which correlations in the intermediate level of the census data make the highest-level values and the lowest-level values true. However, the audience metrics generator circuitry 112 may not produce accurate deduplicated audience estimates since the maximum entropy approach may produce overall correlations that are subject to a regression to the mean.

At block 1906, the example deduplicated audience size calculator circuitry 204 performs enhanced MUG analysis on the census data with panel data. In some examples, the deduplicated audience size calculator circuitry 204 utilizes the census-level audience sizes data determined by the audience metrics generator circuitry 112 as an input to estimate example deduplicated census-level audience sizes data 138 using audience sizes from a hierarchy of panel data. In some examples, the deduplicated audience size calculator circuitry 204 performs an enhanced MUG analysis on the census data with panel data. The example deduplicated audience size calculator circuitry 204 improves the accuracy of audience estimates from the example audience metrics generator circuitry 112. In some examples, the deduplicated audience size calculator circuitry 204 uses the panel data to supply prior audience information to estimate the missing intermediate level in the hierarchy of the census data. As described in further detail below, the example flowcharts of FIGS. 20A and 20B represent different example instructions that may be executed to implement block 1906 to perform enhanced MUG analysis on the census data with panel data.

After the example deduplicated audience size calculator circuitry 204 performs the enhanced MUG analysis on the census data with panel data, the instructions 1900 continue to block 1908 at which the example audience metrics generator circuitry 112 concatenates the results from the MUG analysis and the enhanced MUG analysis. After the example audience metrics generator circuitry 112 concatenates the results from the MUG analysis and the enhanced MUG analysis, the instructions 1900 end.

FIG. 20A is a flowchart representative of example machine readable instructions and/or example operations 1906 that may be executed by example processor circuitry to implement the deduplicated audience size calculator circuitry 204 of FIGS. 2 and 3 to estimate deduplicated census audience sizes based on panel-level data and census-level data. The machine readable instructions and/or the operations 1906 of FIG. 20A begin at block 2002, at which the example panel union calculator circuitry 308 (FIG. 3) calculates a threshold statistic corresponding to an intermediate union of the panel hierarchy. For example, the example panel union calculator circuitry calculates the threshold statistic based on panel data (e.g., the panel-level audience sizes and hierarchy data 302 of FIG. 3).

At block 2004, the example census union calculator circuitry 310 (FIG. 3) calculates a deduplicated audience value corresponding to the intermediate union of the census hierarchy based on the threshold statistic. In some examples, the deduplicated audience value is representative of accesses to media by audience members via network-connected devices. For example, the census union calculator circuitry 310 calculates the deduplicated audience value based on a test value for a universe audience corresponding to the intermediate union of the census hierarchy. In some examples, the census union calculator circuitry 310 calculates a test value for a universe audience corresponding to the intermediate union of the census hierarchy based on the threshold statistic, and the census union calculator circuitry 310 calculates the deduplicated audience value using the test value. After the example census union calculator circuitry 310 calculates the deduplicated audience value corresponding to the intermediate union of the census hierarchy, the instructions 1906 end and control returns to the instructions 1900 of FIG. 19.

FIG. 20B is a flowchart representative of other example machine readable instructions and/or example operations 1906 that may be executed and/or instantiated by processor circuitry to implement the deduplicated audience size calculator circuitry 204 of FIGS. 2 and 3 to estimate deduplicated census audience sizes based on panel-level data and census-level data. The machine readable instructions and/or the operations 1906 of FIG. 20B begin at block 2006, at which the example panel union calculator circuitry 308 (FIG. 3) calculates sufficient statistic(s) corresponding to intermediate union(s) of the panel hierarchy based on the panel data. In some examples, a threshold statistic (sufficient statistic) is a statistic that remains an invariant quantity for an equivalent structure in the census data. In some examples, the panel union calculator circuitry 308 calculates the threshold/sufficient statistics based on the panel-level audience sizes and hierarchy data 302. For example, the panel union calculator circuitry 308 calculates the threshold/sufficient statistics based on a plurality of audience metrics (e.g., audience size values) corresponding to bottom unions (e.g., nodes in a bottom/lowest level) of the panel hierarchy. In some examples, to calculate the threshold/sufficient statistics, the panel union calculator circuitry 308 determine pseudo-universe estimates ($Q_k$) for each of the intermediate union(s)/node(s) of the panel hierarchy using the example Equation 1 described above in connection with FIG. 3. Once the example panel union calculator circuitry 308 determines $Q_k$ for each of the intermediate union(s)/node(s), the example panel union calculator circuitry 308 calculates sufficient statistics for each of the unions ($z_k$). The example panel union calculator circuitry 308 calculates the sufficient statistics using the example Equation 2 described above in connection with FIG. 3.

At block 2008, the example census union calculator circuitry 310 (FIG. 3) flags rows of census data with and without the panel data. In some examples, the census union calculator circuitry 310 manages the census-level audience sizes and hierarchy data 306. In some examples, the census union calculator circuitry 310 flags rows of census data that include panel data (e.g., flagged as "1") and census data that does not include panel data (e.g., flagged as "0").

At block 2010, the example census union calculator circuitry 310 aggregates the census data by the flags. At block 2012, the example census union calculator circuitry 310 selects the census data flagged as having panel data. The example census union calculator circuitry 310 identifies the census data that is flagged as having panel data (e.g., flagged as "1") and selects the census data to perform the enhanced marginal union graph (IMUG)/enhanced MUG analysis to determine the deduplicated audience size value(s) corresponding to intermediate union(s)/node(s) of the census hierarchy. The example census union calculator circuitry 310 determines the deduplicated audience size value(s) corresponding to intermediate union(s)/node(s) of the census hierarchy that is flagged as including panel data. The example census union calculator circuitry 310 determines the deduplicated audience size value(s) using an enhanced MUG analysis for the census data including panel data.

At block 2014, the example census union calculator circuitry 310 calculates test value(s) for universe audience(s) corresponding to the intermediate union(s) of the census hierarchy based on the sufficient statistic(s). The example census union calculator circuitry 310 determines logical bounds for $X_k$ and $Q_m$ based on the panel hierarchy audience size data, the census hierarchy audience size data that is known, and the threshold/sufficient statistic. The example census union calculator circuitry 310 calculates a test value (Q) for a universe audience value corresponding to the intermedia union based on the determined logical bound for $Q_m$.

At block 2016, the example census union calculator circuitry 310 calculates deduplicated audience size value(s) corresponding to the intermediate union(s) of the census hierarchy based on the test value(s). The example census union calculator circuitry 310 calculates the deduplicated audience value corresponding to the intermediate union of the census hierarchy based on the threshold statistic and test value. The example census union calculator circuitry 310 solves the system of equations in the example Equation 3 described above in connection with FIG. 3 to determine the deduplicated audience size value.

At block 2018, the example census union calculator circuitry 310 determines if the deduplicated audience size value(s) satisfy the known census audience size. In some examples, the census union calculator circuitry 310 computes $\hat{X}$ using the example Equation 4 described above in connection with FIG. 3 based on the test value to determines if the deduplicated audience value satisfies a known census audience size from the census hierarchy ($X_m$). If the example census union calculator circuitry 310 determines the deduplicated audience size value(s) satisfies the known census audience size, the instructions 1906 continue to block 2020 at which the example partial union calculator circuitry 312 (FIG. 3) calculates deduplicated audience size value(s) corresponding to partial union(s) of the census hierarchy for a different structure of hierarchy. However, if at block 2018 the example census union calculator circuitry 310 determines the deduplicated audience size value(s) does not satisfy the known census audience size, the instructions 1906 return to block 2014 at which the example census union calculator circuitry 310 calculates test value(s) for universe audience(s) corresponding to the intermediate union(s) of the census hierarchy based on the sufficient statistic(s). In some examples, the census uni7on calculator circuitry 310 calculates a new test value if the deduplicated audience value ($\widehat{X_\bullet}$) does not satisfy the known census audience size ($X_m$). This iteration of testing the different test values (Q) may occur in some examples throughout the entire range of allowable test values. Eventually, a deduplicated audience value will result in satisfying the known census audience size.

At block 2020, the example partial union calculator circuitry 312 calculates deduplicated audience size value(s) corresponding to partial union(s) of the census hierarchy for a different structure of hierarchy. In some examples, the partial union calculator circuitry 312 to calculate deduplicated audience size value(s) corresponding to partial union(s) of the census hierarchy when the structure of the census hierarchy is different than the structure of the panel hierarchy. In such examples, the panel hierarchy does not include the example partial union(s). In some examples, the example partial union calculator circuitry 312 calculates the deduplicated audience size values corresponding to the partial unions while maintaining the logical consistency of deduplicating different audiences. At block 2022, the example partial union calculator circuitry 312 aggregates the deduplicated audience size value(s) on the sub-unions. In some examples, the partial union calculator circuitry 312 aggregates the deduplicated audience size value(s) from the example audience metrics generator circuitry 112 using the original MUG analysis without panel data and the deduplicated audience size value(s) from the example census union calculator circuitry 310 using the IMUG/enhanced MUG analysis with panel data. After the example partial union calculator circuitry 312 aggregates the deduplicated audience size value(s) on the sub-unions, the instructions 1906 end and control returns to the instructions 1900 of FIG. 19.

Figure 21:
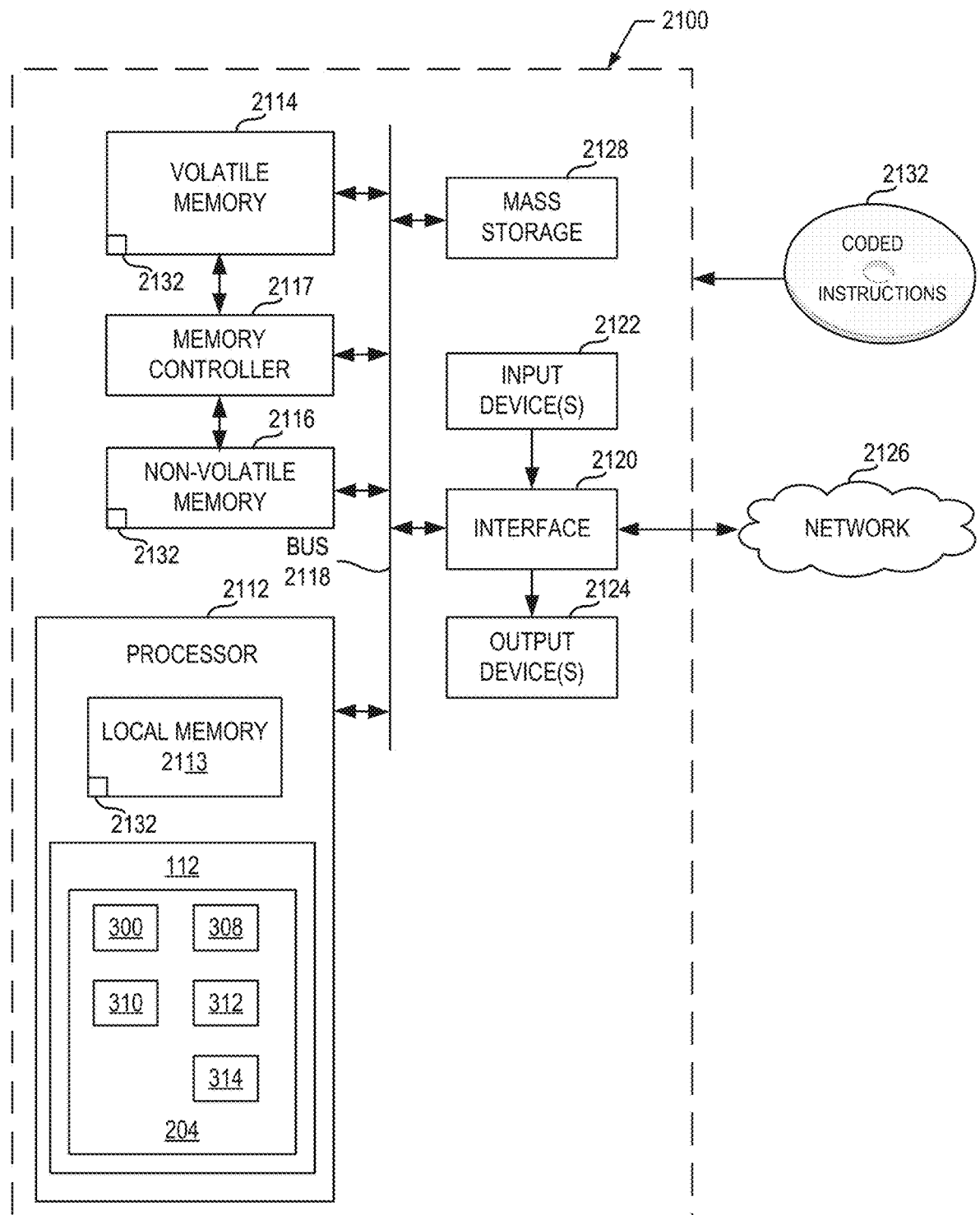
FIG. 21 is a block diagram of an example processing platform including processor circuitry structured to execute the example machine readable instructions and/or the example operations of FIGS. 19, 20A, and 20B to implement the example audience metrics generator circuitry of FIGS. 1 and 2 and the example deduplicated audience size calculator circuitry of FIGS. 2 and 3.

FIG. 21 is a block diagram of an example processor platform 2100 structured to execute and/or instantiate the machine readable instructions and/or the operations of FIGS. 19, 20A, and 20B to implement the audience metrics generator circuitry 112 of FIGS. 1 and 2 and the deduplicated audience size calculator circuitry 204 of FIGS. 2 and 3. The processor platform 2100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance or any other type of computing device.

The processor platform 2100 of the illustrated example includes processor circuitry 2112. The processor circuitry 2112 of the illustrated example is hardware. For example, the processor circuitry 2112 can be implemented by one or more integrated circuits, logic circuits, FPGAs, microprocessors, CPUs, GPUs, DSPs, and/or microcontrollers from any desired family or manufacturer. The processor circuitry 2112 may be implemented by one or more semiconductor based (e.g., silicon based) devices. In this example, the processor circuitry 2112 implements the example data interface 300, the example panel union calculator circuitry 308, the example census union calculator circuitry 310, the example partial union calculator circuitry 312, and the example communications interface 314.

The processor circuitry 2112 of the illustrated example includes a local memory 2113 (e.g., a cache, registers, etc.). The processor circuitry 2112 of the illustrated example is in communication with a main memory including a volatile memory 2114 and a non-volatile memory 2116 by a bus 2118. The volatile memory 2114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2116 may be implemented by flash memory and/or any other desired type of memory device. Access to the main memory 2114, 2116 of the illustrated example is controlled by a memory controller 2117.

The processor platform 2100 of the illustrated example also includes interface circuitry 2120. The interface circuitry 2120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2122 are connected to the interface circuitry 2120. The input device(s) 2122 permit(s) a user to enter data and/or commands into the processor circuitry 2112. The input device(s) 2122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2124 are also connected to the interface circuitry 2120 of the illustrated example. The output device(s) 2124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2120 of the illustrated example, thus, typically includes a graphics driver card, a graphics driver chip, and/or graphics processor circuitry such as a GPU.

The interface circuitry 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2100 of the illustrated example also includes one or more mass storage devices 2128 to store software and/or data. Examples of such mass storage devices 2128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 2132, which may be implemented by the machine readable instructions of FIGS. 19, 20A, and 20B, may be stored in the mass storage device 2128, in the volatile memory 2114, in the non-volatile memory 2116, and/or on a removable non-transitory computer readable storage medium such as a CD or DVD.

Figure 22:
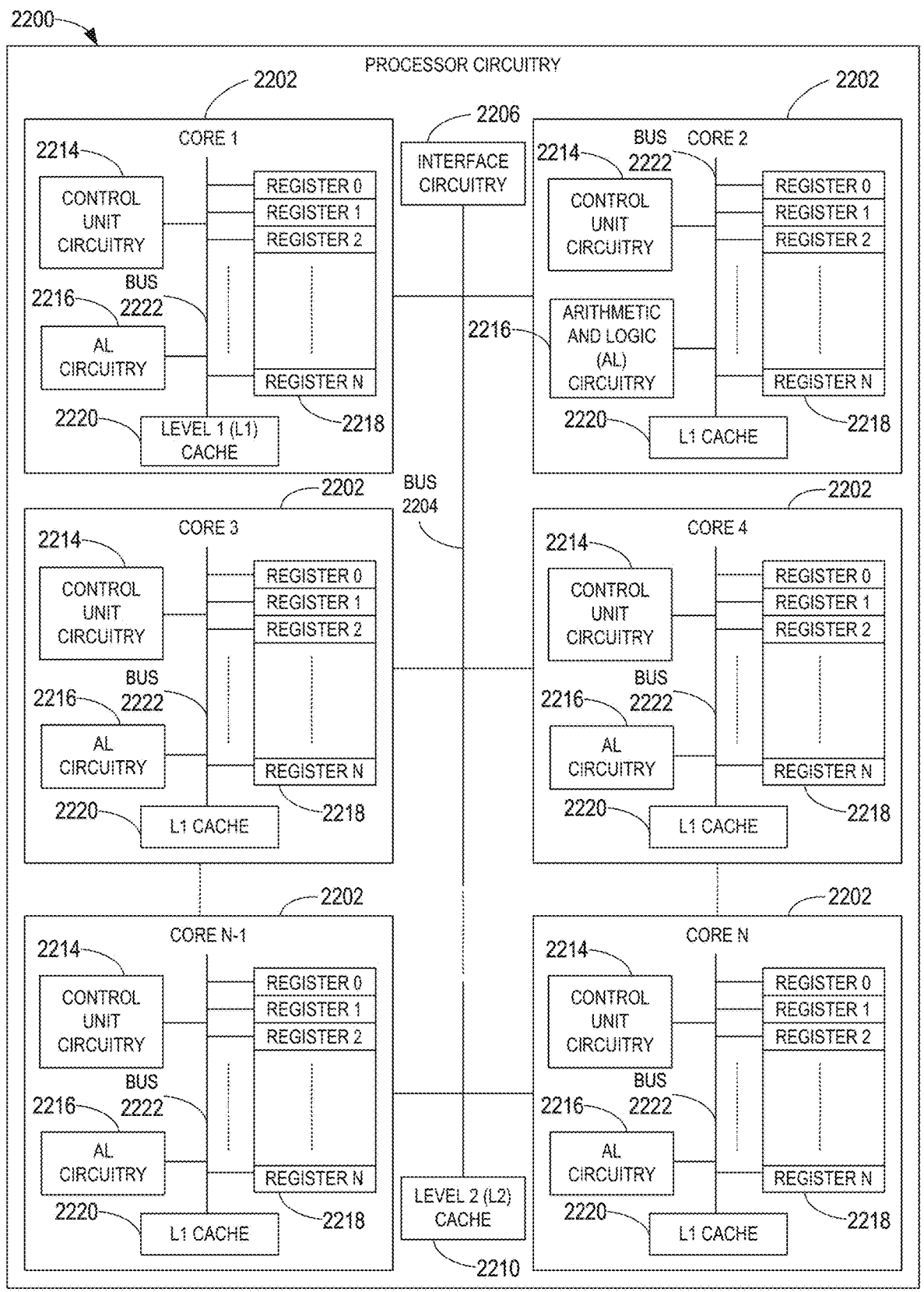
FIG. 22 is a block diagram of an example implementation of the processor circuitry of FIG. 21.

FIG. 22 is a block diagram of an example implementation of the processor circuitry 2112 of FIG. 21. In this example, the processor circuitry 2112 of FIG. 21 is implemented by a general purpose microprocessor 2200. The general purpose microprocessor circuitry 2200 executes some or all of the machine readable instructions of the flowcharts of FIGS. 19, 20A, and 20B to effectively instantiate the circuitry of FIGS. 1-3 as logic circuits to perform the operations corresponding to those machine readable instructions. In some such examples, the circuitry of FIGS. 1-3 is instantiated by the hardware circuits of the microprocessor 2200 in combination with the instructions. For example, the microprocessor 2200 may implement multi-core hardware circuitry such as a CPU, a DSP, a GPU, an XPU, etc. Although it may include any number of example cores 2202 (e.g., 1 core), the microprocessor 2200 of this example is a multi-core semiconductor device including N cores. The cores 2202 of the microprocessor 2200 may operate independently or may cooperate to execute machine readable instructions. For example, machine code corresponding to a firmware program, an embedded software program, or a software program may be executed by one of the cores 2202 or may be executed by multiple ones of the cores 2202 at the same or different times. In some examples, the machine code corresponding to the firmware program, the embedded software program, or the software program is split into threads and executed in parallel by two or more of the cores 2202. The software program may correspond to a portion or all of the machine readable instructions and/or operations represented by the flowcharts of FIGS. 19, 20A, and 20B.

The cores 2202 may communicate by a first example bus 2204. In some examples, the first bus 2204 may implement a communication bus to effectuate communication associated with one(s) of the cores 2202. For example, the first bus 2204 may implement at least one of an Inter-Integrated Circuit (I2C) bus, a Serial Peripheral Interface (SPI) bus, a PCI bus, or a PCIe bus. Additionally or alternatively, the first bus 2204 may implement any other type of computing or electrical bus. The cores 2202 may obtain data, instructions, and/or signals from one or more external devices by example interface circuitry 2206. The cores 2202 may output data, instructions, and/or signals to the one or more external devices by the interface circuitry 2206. Although the cores 2202 of this example include example local memory 2220 (e.g., Level 1 (L1) cache that may be split into an L1 data cache and an L1 instruction cache), the microprocessor 2200 also includes example shared memory 2210 that may be shared by the cores (e.g., Level 2 (L2_cache)) for high-speed access to data and/or instructions. Data and/or instructions may be transferred (e.g., shared) by writing to and/or reading from the shared memory 2210. The local memory 2220 of each of the cores 2202 and the shared memory 2210 may be part of a hierarchy of storage devices including multiple levels of cache memory and the main memory (e.g., the main memory 2114, 2116 of FIG. 21). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2202 may be referred to as a CPU, DSP, GPU, etc., or any other type of hardware circuitry. Each core 2202 includes control unit circuitry 2214, arithmetic and logic (AL) circuitry (sometimes referred to as an ALU) 2216, a plurality of registers 2218, the L1 cache 2220, and a second example bus 2222. Other structures may be present. For example, each core 2202 may include vector unit circuitry, single instruction multiple data (SIMD) unit circuitry, load/store unit (LSU) circuitry, branch/jump unit circuitry, floating-point unit (FPU) circuitry, etc. The control unit circuitry 2214 includes semiconductor-based circuits structured to control (e.g., coordinate) data movement within the corresponding core 2202. The AL circuitry 2216 includes semiconductor-based circuits structured to perform one or more mathematic and/or logic operations on the data within the corresponding core 2202. The AL circuitry 2216 of some examples performs integer based operations. In other examples, the AL circuitry 2216 also performs floating point operations. In yet other examples, the AL circuitry 2216 may include first AL circuitry that performs integer based operations and second AL circuitry that performs floating point operations. In some examples, the AL circuitry 2216 may be referred to as an Arithmetic Logic Unit (ALU). The registers 2218 are semiconductor-based structures to store data and/or instructions such as results of one or more of the operations performed by the AL circuitry 2216 of the corresponding core 2202. For example, the registers 2218 may include vector register(s), SIMD register(s), general purpose register(s), flag register(s), segment register(s), machine specific register(s), instruction pointer register(s), control register(s), debug register(s), memory management register(s), machine check register(s), etc. The registers 2218 may be arranged in a bank as shown in FIG. 22. Alternatively, the registers 2218 may be organized in any other arrangement, format, or structure including distributed throughout the core 2202 to shorten access time. The second bus 2222 may implement at least one of an I2C bus, a SPI bus, a PCI bus, or a PCIe bus Each core 2202 and/or, more generally, the microprocessor 2200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 23:
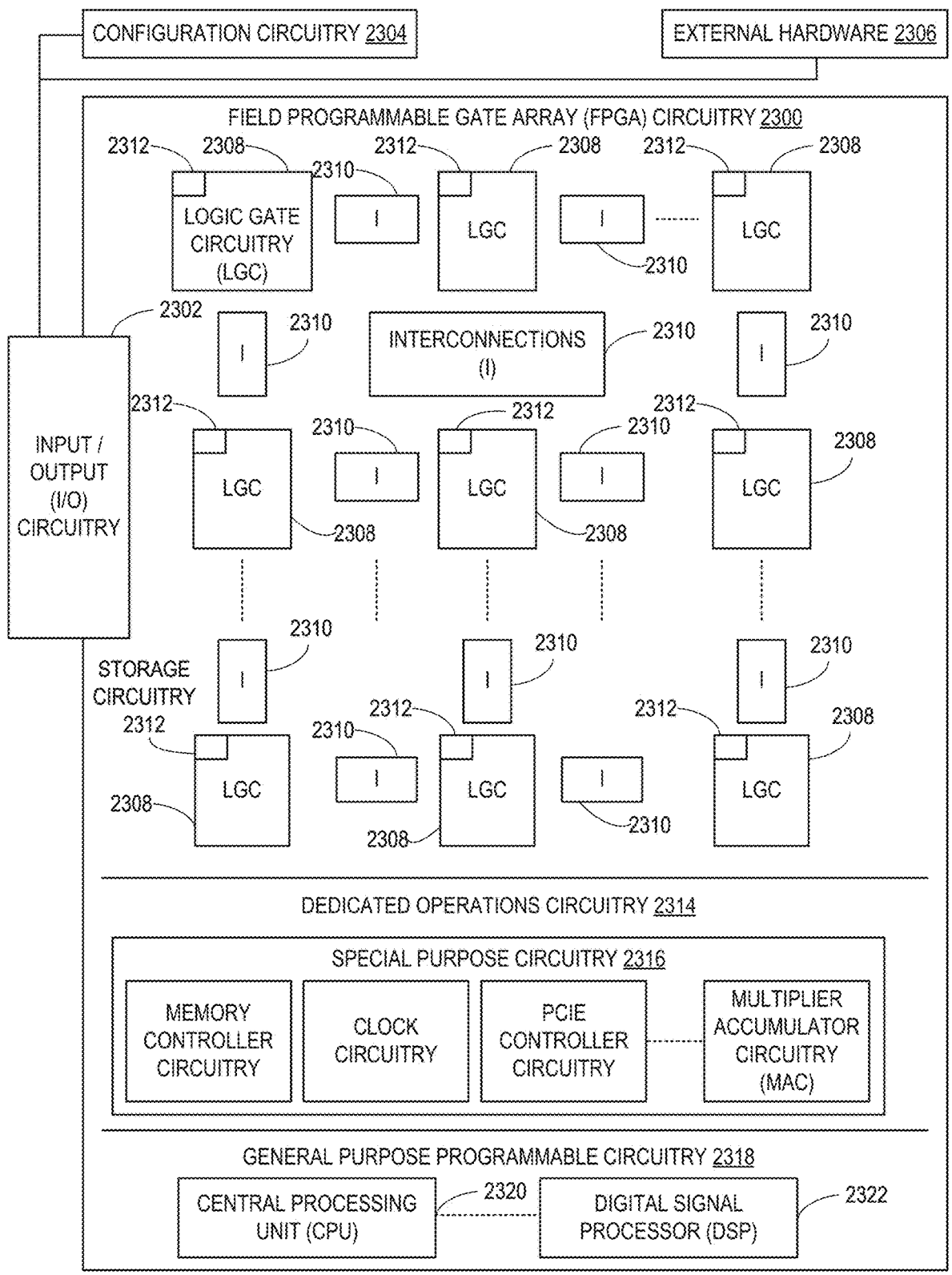
FIG. 23 is a block diagram of another example implementation of the processor circuitry of FIG. 21.

FIG. 23 is a block diagram of another example implementation of the processor circuitry 2112 of FIG. 21. In this example, the processor circuitry 2112 is implemented by FPGA circuitry 2300. The FPGA circuitry 2300 can be used, for example, to perform operations that could otherwise be performed by the example microprocessor 2200 of FIG. 22 executing corresponding machine readable instructions. However, once configured, the FPGA circuitry 2300 instantiates the machine readable instructions in hardware and, thus, can often execute the operations faster than they could be performed by a general purpose microprocessor executing the corresponding software.

More specifically, in contrast to the microprocessor 2200 of FIG. 22 described above (which is a general purpose device that may be programmed to execute some or all of the machine readable instructions represented by the flowcharts of FIGS. 19, 20A, and 20B but whose interconnections and logic circuitry are fixed once fabricated), the FPGA circuitry 2300 of the example of FIG. 23 includes interconnections and logic circuitry that may be configured and/or interconnected in different ways after fabrication to instantiate, for example, some or all of the machine readable instructions represented by the flowcharts of FIGS. 19, 20A, and 20B. In particular, the FPGA 2300 may be thought of as an array of logic gates, interconnections, and switches. The switches can be programmed to change how the logic gates are interconnected by the interconnections, effectively forming one or more dedicated logic circuits (unless and until the FPGA circuitry 2300 is reprogrammed). The configured logic circuits enable the logic gates to cooperate in different ways to perform different operations on data received by input circuitry. Those operations may correspond to some or all of the software represented by the flowcharts of FIGS. 19, 20A, and 20B. As such, the FPGA circuitry 2300 may be structured to effectively instantiate some or all of the machine readable instructions of the flowcharts of FIGS. 19, 20A, and 20B as dedicated logic circuits to perform the operations corresponding to those software instructions in a dedicated manner analogous to an ASIC. Therefore, the FPGA circuitry 2300 may perform the operations corresponding to the some or all of the machine readable instructions of FIGS. 19, 20A, and 20B faster than the general purpose microprocessor can execute the same.

In the example of FIG. 23, the FPGA circuitry 2300 is structured to be programmed (and/or reprogrammed one or more times) by an end user by a hardware description language (HDL) such as Verilog. The FPGA circuitry 2300 of FIG. 23, includes example input/output (I/O) circuitry 2302 to obtain and/or output data to/from example configuration circuitry 2304 and/or external hardware (e.g., external hardware circuitry) 2306. For example, the configuration circuitry 2304 may implement interface circuitry that may obtain machine readable instructions to configure the FPGA circuitry 2300, or portion(s) thereof. In some such examples, the configuration circuitry 2304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2306 may implement the microprocessor 2200 of FIG. 22. The FPGA circuitry 2300 also includes an array of example logic gate circuitry 2308, a plurality of example configurable interconnections 2310, and example storage circuitry 2312. The logic gate circuitry 2308 and interconnections 2310 are configurable to instantiate one or more operations that may correspond to at least some of the machine readable instructions of FIGS. 19, 20A, and 20B and/or other desired operations. The logic gate circuitry 2308 shown in FIG. 23 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2308 to enable configuration of the electrical structures and/or the logic gates to form circuits to perform desired operations. The logic gate circuitry 2308 may include other electrical structures such as look-up tables (LUTs), registers (e.g., flip-flops or latches), multiplexers, etc.

The interconnections 2310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2308 to program desired logic circuits.

The storage circuitry 2312 of the illustrated example is structured to store result(s) of the one or more of the operations performed by corresponding logic gates. The storage circuitry 2312 may be implemented by registers or the like. In the illustrated example, the storage circuitry 2312 is distributed amongst the logic gate circuitry 2308 to facilitate access and increase execution speed.

The example FPGA circuitry 2300 of FIG. 23 also includes example Dedicated Operations Circuitry 2314. In this example, the Dedicated Operations Circuitry 2314 includes special purpose circuitry 2316 that may be invoked to implement commonly used functions to avoid the need to program those functions in the field. Examples of such special purpose circuitry 2316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2300 may also include example general purpose programmable circuitry 2318 such as an example CPU 2320 and/or an example DSP 2322. Other general purpose programmable circuitry 2318 may additionally or alternatively be present such as a GPU, an XPU, etc., that can be programmed to perform other operations.

Although FIGS. 22 and 23 illustrate two example implementations of the processor circuitry 2112 of FIG. 21, many other approaches are contemplated. For example, as mentioned above, modern FPGA circuitry may include an on-board CPU, such as one or more of the example CPU 2320 of FIG. 23. Therefore, the processor circuitry 2112 of FIG. 21 may additionally be implemented by combining the example microprocessor 2200 of FIG. 22 and the example FPGA circuitry 2300 of FIG. 23. In some such hybrid examples, a first portion of the machine readable instructions represented by the flowcharts of FIGS. 19, 20A, and 20B may be executed by one or more of the cores 2202 of FIG. 22, a second portion of the machine readable instructions represented by the flowcharts of FIGS. 19, 20A, and 20B may be executed by the FPGA circuitry 2300 of FIG. 23, and/or a third portion of the machine readable instructions represented by the flowcharts of FIGS. 19, 20A, and 20B may be executed by an ASIC. It should be understood that some or all of the circuitry of FIGS. 1-3 may, thus, be instantiated at the same or different times. Some or all of the circuitry may be instantiated, for example, in one or more threads executing concurrently and/or in series. Moreover, in some examples, some or all of the circuitry of FIGS. 1-3 may be implemented within one or more virtual machines and/or containers executing on the microprocessor.

In some examples, the processor circuitry 2112 of FIG. 21 may be in one or more packages. For example, the processor circuitry 2200 of FIG. 22 and/or the FPGA circuitry 2300 of FIG. 23 may be in one or more packages. In some examples, an XPU may be implemented by the processor circuitry 2112 of FIG. 21, which may be in one or more packages. For example, the XPU may include a CPU in one package, a DSP in another package, a GPU in yet another package, and an FPGA in still yet another package.

Figure 24:
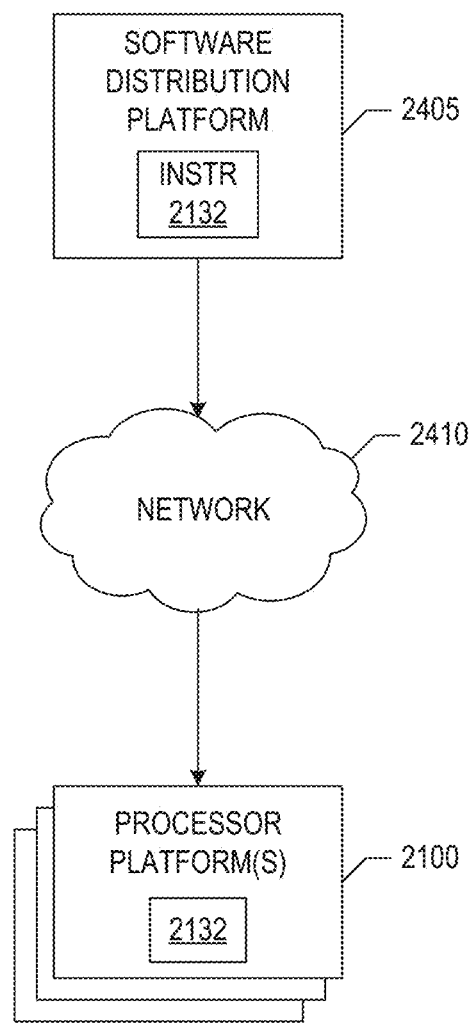
FIG. 24 is a block diagram of an example software distribution platform (e.g., one or more servers) to distribute software (e.g., software corresponding to the example machine readable instructions of FIGS. 19, 20A, and 20B) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2405 to distribute software such as the example machine readable instructions 2132 of FIG. 21 to hardware devices owned and/or operated by third parties is illustrated in FIG. 24. The example software distribution platform 2405 may be implemented by any computer server, data facility, cloud service, etc., capable of storing and transmitting software to other computing devices. The third parties may be customers of the entity owning and/or operating the software distribution platform 2405. For example, the entity that owns and/or operates the software distribution platform 2405 may be a developer, a seller, and/or a licensor of software such as the example machine readable instructions 2132 of FIG. 21. The third parties may be consumers, users, retailers, OEMs, etc., who purchase and/or license the software for use and/or re-sale and/or sub-licensing. In the illustrated example, the software distribution platform 2405 includes one or more servers and one or more storage devices. The storage devices store the machine readable instructions 2132, which may correspond to the example machine readable instructions 1900 of FIG. 19 and the example machine readable instructions 1906 of FIGS. 20A and 20B, as described above. The one or more servers of the example software distribution platform 2405 are in communication with a network 2410, which may correspond to any one or more of the Internet and/or any of the example networks 2126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2132 from the software distribution platform 2405. For example, the software, which may correspond to the example machine readable instructions 1900 of FIG. 19 and the example machine readable instructions 1906 of FIGS. 20A and 20B, may be downloaded to the example processor platform 2100, which is to execute the machine readable instructions 2132 to implement the example audience metrics generator circuitry 112 of FIGS. 1 and 2 and the example deduplicated audience size calculator circuitry 204 of FIGS. 2 and 3. In some example, one or more servers of the software distribution platform 2405 periodically offer, transmit, and/or force updates to the software (e.g., the example machine readable instructions 2132 of FIG. 21) to ensure improvements, patches, updates, etc., are distributed and applied to the software at the end user devices.

From the foregoing, it will be appreciated that example systems, methods, apparatus, and articles of manufacture have been disclosed that estimate intermediate level unions using information theory. Disclosed systems, methods, apparatus, and articles of manufacture improve the efficiency of using a computing device by using known panel audience sizes information and known census audience sizes information to estimate deduplicated audience sizes for intermediate unions in the census hierarchy information. The disclosed methods, apparatus and articles of manufacture determine threshold/sufficient statistics using panel hierarchy audience sizes information to estimate test values for deduplicated audience sizes of intermediate unions in the census hierarchy. The disclosed methods, apparatus and articles of manufacture are accordingly directed to one or more improvement(s) in the operation of a machine such as a computer or other electronic and/or mechanical device.

Example methods, apparatus, systems, and articles of manufacture to perform computer-based monitoring of audiences of network-based media using information theory to estimate intermediate level unions are disclosed herein. Further examples and combinations thereof include the following:

Example 1 includes an apparatus comprising panel union calculator circuitry to calculate a threshold statistic corresponding to an intermediate union of a panel hierarchy, and census union calculator circuitry to calculate a deduplicated audience value corresponding to the intermediate union of a census hierarchy based on the threshold statistic, the deduplicated audience value representative of accesses to media by audience members via network-connected devices.

Example 2 includes the apparatus of example 1, wherein the media is at least one of a webpage, an advertisement, or video.

Example 3 includes the apparatus of example 1, wherein the panel union calculator circuitry is to calculate the threshold statistic based on a plurality of audience metrics corresponding to bottom unions of the panel hierarchy.

Example 4 includes the apparatus of example 1, wherein the threshold statistic is an invariant quantity between the panel hierarchy and the census hierarchy.

Example 5 includes the apparatus of example 1, wherein the census union calculator circuitry is to calculate a test value for a universe audience value corresponding to the intermediate union of the census hierarchy based on the threshold statistic.

Example 6 includes the apparatus of example 5, wherein the census union calculator circuitry is to calculate the deduplicated audience value corresponding to the intermediate union of the census hierarchy based on the threshold statistic and the test value.

Example 7 includes the apparatus of example 6, wherein the census union calculator circuitry is to determine whether the deduplicated audience value satisfies a known census audience size from the census hierarchy.

Example 8 includes the apparatus of example 7, wherein, in response to the census union calculator circuitry determining the deduplicated audience value does not satisfy the known census audience size, the census union calculator circuitry is to calculate a new test value for the universe audience value corresponding to the intermediate union of the census hierarchy based on the threshold statistic.

Example 9 includes the apparatus of example 1, wherein the deduplicated audience value is a first deduplicated audience value, and further including partial union calculator circuitry to calculate a second deduplicated audience value corresponding to a partial union of the census hierarchy when a structure of the census hierarchy is different than a structure of the panel hierarchy, the partial union not included in the panel hierarchy.

Example 10 includes a non-transitory computer readable storage medium comprising instructions that, when executed, cause at least one processor to at least calculate a threshold statistic corresponding to an intermediate union of a panel hierarchy, and calculate a deduplicated audience value corresponding to the intermediate union of a census hierarchy based on the threshold statistic, the deduplicated audience value representative of accesses to media by audience members via network-connected devices.

Example 11 includes the non-transitory computer readable storage medium of example 10, wherein the instructions are further to cause the at least one processor to calculate the threshold statistic based on a plurality of audience metrics corresponding to bottom unions of the panel hierarchy.

Example 12 includes the non-transitory computer readable storage medium of example 10, wherein the threshold statistic is an invariant quantity between the panel hierarchy and the census hierarchy.

Example 13 includes the non-transitory computer readable storage medium of example 10, wherein the instructions are further to cause the at least one processor to calculate a test value for a universe audience value corresponding to the intermediate union of the census hierarchy based on the threshold statistic.

Example 14 includes the non-transitory computer readable storage medium of example 13, wherein the instructions are further to cause the at least one processor to calculates the deduplicated audience value corresponding to the intermediate union of the census hierarchy based on the threshold statistic and the test value.

Example 15 includes the non-transitory computer readable storage medium of example 14, wherein the instructions are further to cause the at least one processor to determine whether the deduplicated audience value satisfies a known census audience size from the census hierarchy.

Example 16 includes the non-transitory computer readable storage medium of example 15, wherein, in response to determining the deduplicated audience value does not satisfy the known census audience size, the instructions are further to cause the at least one processor to calculate a new test value for the universe audience value corresponding to the intermediate union of the census hierarchy based on the threshold statistic.

Example 17 includes the non-transitory computer readable storage medium of example 10, wherein the deduplicated audience value is a first deduplicated audience value, and the instructions are further to cause the at least one processor to calculate a second deduplicated audience value corresponding to a partial union of the census hierarchy when a structure of the census hierarchy is different than a structure of the panel hierarchy, the partial union not included in the panel hierarchy.

Example 18 includes a method comprising calculating, by executing an instruction with a processor, a threshold statistic corresponding to an intermediate union of a panel hierarchy, and calculating, by executing an instruction with the processor, a deduplicated audience value corresponding to the intermediate union of a census hierarchy based on the threshold statistic, the deduplicated audience value representative of accesses to media by audience members via network-connected devices.

Example 19 includes the method of example 18, wherein the media is at least one of a webpage, an advertisement, or video.

Example 20 includes the method of example 18, further including calculating the threshold statistic based on a plurality of audience metrics corresponding to bottom unions of the panel hierarchy.

Example 21 includes the method of example 18, wherein the threshold statistic is an invariant quantity between the panel hierarchy and the census hierarchy.

Example 22 includes the method of example 18, further including calculating a test value for a universe audience value corresponding to the intermediate union of the census hierarchy based on the threshold statistic.

Example 23 includes the method of example 22, further including calculating the deduplicated audience value corresponding to the intermediate union of the census hierarchy based on the threshold statistic and the test value.

Example 24 includes the method of example 23, further including determining whether the deduplicated audience value satisfies a known census audience size from the census hierarchy.

Example 25 includes the method of example 24, wherein, in response to the determining the deduplicated audience value does not satisfy the known census audience size, calculating a new test value for the universe audience value corresponding to the intermediate union of the census hierarchy based on the threshold statistic.

Example 26 includes the method of example 18, wherein the deduplicated audience value is a first deduplicated audience value, and further including calculating a second deduplicated audience value corresponding to a partial union of the census hierarchy when a structure of the census hierarchy is different than a structure of the panel hierarchy, the partial union not included in the panel hierarchy.

Example 27 includes an apparatus comprising at least one memory, instructions in the apparatus, and processor circuitry to execute the instructions to calculate a threshold statistic corresponding to an intermediate union of a panel hierarchy, and calculate a deduplicated audience value corresponding to the intermediate union of a census hierarchy based on the threshold statistic, the deduplicated audience value representative of accesses to media by audience members via network-connected devices.

Example 28 includes the apparatus of example 27, wherein the media is at least one of a webpage, an advertisement, or video.

Example 29 includes the apparatus of example 27, wherein the processor circuitry is to execute the instructions to calculate the threshold statistic based on a plurality of audience metrics corresponding to bottom unions of the panel hierarchy.

Example 30 includes the apparatus of example 27, wherein the threshold statistic is an invariant quantity between the panel hierarchy and the census hierarchy.

Example 31 includes the apparatus of example 27, wherein the processor circuitry is to execute the instructions to calculate a test value for a universe audience value corresponding to the intermediate union of the census hierarchy based on the threshold statistic.

Example 32 includes the apparatus of example 31, wherein the processor circuitry is to execute the instructions to calculate the deduplicated audience value corresponding to the intermediate union of the census hierarchy based on the threshold statistic and test value.

Example 33 includes the apparatus of example 32, wherein the processor circuitry is to execute the instructions to determine whether the deduplicated audience value satisfies a known census audience size from the census hierarchy.

Example 34 includes the apparatus of example 33, wherein, in response to determining the deduplicated audience value does not satisfy the known census audience size, wherein the processor circuitry is to execute the instructions to calculate a new test value for the universe audience value corresponding to the intermediate union of the census hierarchy based on the threshold statistic.

Example 35 includes the apparatus of example 27, wherein the deduplicated audience value is a first deduplicated audience value, and the processor circuitry is to execute the instructions to calculate a second deduplicated audience value corresponding to a partial union of the census hierarchy when a structure of the census hierarchy is different than a structure of the panel hierarchy, the partial union not included in the panel hierarchy.

Example 36 includes an apparatus comprising at least one memory, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate panel union calculator circuitry to calculate a threshold statistic corresponding to an intermediate union of a panel hierarchy, and census union calculator circuitry to calculate a deduplicated audience value corresponding to the intermediate union of a census hierarchy based on the threshold statistic, the deduplicated audience value representative of accesses to media by audience members via network-connected devices.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The invention claimed is:

1. A computing system comprising a processor and a memory, the computing system configured to perform a set of acts comprising:
calculating a threshold statistic corresponding to an intermediate union of a panel hierarchy; and
calculating a deduplicated audience value corresponding to the intermediate union of a census hierarchy based on the threshold statistic, the deduplicated audience value representative of accesses to media by audience members via network-connected devices.

2. The computing system of claim 1, wherein:
the panel hierarchy comprises bottom nodes that are connected to and below the intermediate union of the panel hierarchy, each bottom node representing a respective audience that accesses a respective media content item, and the intermediate union of the panel hierarchy represents a deduplicated audience of the bottom nodes.

3. The computing system of claim 2, wherein the respective media content items are respective websites.

4. The computing system of claim 2, wherein the threshold statistic is a pseudo-universe estimate that is derived from the respective audiences of each bottom node and a deduplicated audience of the intermediate union of the panel hierarchy.

5. The computing system of claim 1, wherein the set of acts further comprises calculating a sufficient statistic corresponding to the intermediate union of a panel hierarchy based on the threshold statistic,
wherein the deduplicated audience value is further based on the sufficient statistic.

6. The computing system of claim 5, wherein the sufficient statistic is derived from the threshold statistic and a universe estimate.

7. The computing system of claim 1, wherein the set of acts further comprises reporting the deduplicated audience value using a communication interface.

8. A method comprising:
calculating, by a computing system, a threshold statistic corresponding to an intermediate union of a panel hierarchy; and
calculating, by the computing system, a deduplicated audience value corresponding to the intermediate union of a census hierarchy based on the threshold statistic, the deduplicated audience value representative of accesses to media by audience members via network-connected devices.

9. The method of claim 8, wherein:
the panel hierarchy comprises bottom nodes that are connected to and below the intermediate union of the panel hierarchy, each bottom node representing a respective audience that accesses a respective media content item, and
the intermediate union of the panel hierarchy represents a deduplicated audience of the bottom nodes.

10. The method of claim 9, wherein the respective media content items are respective websites.

11. The method of claim 9, wherein the threshold statistic is a pseudo-universe estimate that is derived from the respective audiences of each bottom node and a deduplicated audience of the intermediate union of the panel hierarchy.

12. The method of claim 8, further comprising calculating a sufficient statistic corresponding to the intermediate union of a panel hierarchy based on the threshold statistic,
wherein the deduplicated audience value is further based on the sufficient statistic.

13. The method of claim 12, wherein the sufficient statistic is derived from the threshold statistic and a universe estimate.

14. The method of claim 8, further comprising reporting the deduplicated audience value using a communication interface.

15. A non-transitory computer-readable medium having stored therein instructions that, upon execution by one or more processors, cause a computing system to perform a set of acts comprising:
calculating a threshold statistic corresponding to an intermediate union of a panel hierarchy; and
calculating a deduplicated audience value corresponding to the intermediate union of a census hierarchy based on the threshold statistic, the deduplicated audience value representative of accesses to media by audience members via network-connected devices.

16. The non-transitory computer-readable medium of claim 15, wherein:
the panel hierarchy comprises bottom nodes that are connected to and below the intermediate union of the panel hierarchy, each bottom node representing a respective audience that accesses a respective media content item, and
the intermediate union of the panel hierarchy represents a deduplicated audience of the bottom nodes.

17. The non-transitory computer-readable medium of claim 16, wherein the respective media content items are respective websites.

18. The non-transitory computer-readable medium of claim 16, wherein the threshold statistic is a pseudo-universe estimate that is derived from the respective audiences of each bottom node and a deduplicated audience of the intermediate union of the panel hierarchy.

19. The non-transitory computer-readable medium of claim 15, wherein the set of acts further comprises calculating a sufficient statistic corresponding to the intermediate union of a panel hierarchy based on the threshold statistic,
wherein the deduplicated audience value is further based on the sufficient statistic.

20. The non-transitory computer-readable medium of claim 19, wherein the sufficient statistic is derived from the threshold statistic and a universe estimate.

* * * * *